(12) United States Patent
Ikeda

(10) Patent No.: US 12,196,935 B2
(45) Date of Patent: Jan. 14, 2025

(54) IMAGING OPTICAL SYSTEM

(71) Applicant: SIGMA CORPORATION, Kanagawa (JP)

(72) Inventor: Keigo Ikeda, Kanagawa (JP)

(73) Assignee: SIGMA CORPORATION, Kanagawa (JP)

( * ) Notice: Subject to any disclaimer, the term of this patent is extended or adjusted under 35 U.S.C. 154(b) by 313 days.

(21) Appl. No.: 17/975,956

(22) Filed: Oct. 28, 2022

(65) Prior Publication Data
US 2023/0393377 A1 Dec. 7, 2023

(30) Foreign Application Priority Data
Jun. 7, 2022 (JP) .................................. 2022-092558

(51) Int. Cl.
*G02B 15/14* (2006.01)
*G02B 13/02* (2006.01)
*G02B 15/20* (2006.01)

(52) U.S. Cl.
CPC ......... *G02B 15/1461* (2019.08); *G02B 13/02* (2013.01); *G02B 15/20* (2013.01)

(58) Field of Classification Search
None
See application file for complete search history.

(56) References Cited

U.S. PATENT DOCUMENTS

| | | | |
|---|---|---|---|
| 10,877,241 B2 | 12/2020 | Iwamoto | |
| 2012/0242887 A1* | 9/2012 | Matsumura | H04N 23/60 |
| | | | 359/557 |
| 2013/0002934 A1* | 1/2013 | Bito | G02B 15/145121 |
| | | | 359/683 |
| 2014/0368913 A1* | 12/2014 | Kawamura | G02B 27/646 |
| | | | 359/557 |
| 2018/0259754 A1* | 9/2018 | Miyagishima | G02B 13/0045 |
| 2018/0267281 A1* | 9/2018 | Shibata | G02B 27/646 |
| 2019/0293906 A1* | 9/2019 | Nakazawa | G02B 13/02 |
| 2023/0038734 A1* | 2/2023 | Ohtake | G02B 15/1461 |

FOREIGN PATENT DOCUMENTS

| | | |
|---|---|---|
| JP | 6779936 B2 | 11/2020 |
| JP | 2021-76830 A | 5/2021 |

* cited by examiner

*Primary Examiner* — Darryl J Collins

(74) *Attorney, Agent, or Firm* — Greenblum & Bernstein, P.L.C.

(57) ABSTRACT

An imaging optical system includes: sequentially from an object side, a first lens group G1 having a positive refractive power, a front lens group GF having a negative refractive power, and a rear lens group GR having a positive refractive power; wherein for zooming from a wide-angle end to a telephoto end, a distance between G1 and GF increases, a distance between GF and GR decreases, and G1 monotonously moves to an object side, G1 has at least one negative lens, GF includes a lens group having a negative refractive power of 1 or more, GR has a final lens group GL arranged closest to an image plane I side, and is fixed to I, and does not move for zooming and focusing, GL has a vibration reduction lens group movable in a direction including a perpendicular component with respect to an optical axis, and prescribed conditional expressions are satisfied.

10 Claims, 80 Drawing Sheets

IMAGING OPTICAL SYSTEM

TECHNICAL FIELD

The present invention relates to an imaging optical system preferable for a shooting lens for use in a digital camera, a video camera, or the like.

BACKGROUND ART

In recent years, a so-called mirror-less camera has found widespread use, in which a quick return mirror for guiding a light beam to a finder optical system, arranged between an imaging optical system and an image pick-up element, is eliminated.

The mirror-less camera has eliminated a mirror therefrom, and thereby is reduced in size of the housing. For this reason, downsizing of the imaging optical system has been accordingly demanded. Further, there has been a demand for a large aperture zoom lens mounting a camera shake correction mechanism, and having a small open F number in the entire zoom range.

SUMMARY OF THE INVENTION

Japanese Patent Application Publication No. 2021-076830 discloses a positive lead type zoom lens as bright as an open F number of about 2.8, and having the lens group which is closest to the object side and is fixed to the image plane, for zooming. Although the zoom lens disclosed in Japanese Patent Application Publication No. 2021-076830 has advantages of high convenience and robustness resulting from no change in total optical length, this zoom lens is undesirably large in size of the imaging optical system.

Japanese Patent No. 6779936 discloses a positive lead type zoom lens as bright as an open F number of 2.8, and shortened in total optical length at the wide-angle end. In the zoom lens disclosed in Japanese Patent No. 6779936, a large number of lens groups with a large diameter moving for zooming are arranged closer to the image side than the aperture stop. For this reason, the mechanism required for zooming increases in size, undesirably resulting in a large size in the radial direction of the lens barrel.

The present invention has been completed in view of such circumstances. It is an object of the present invention to provide an imaging optical system mounting a camera shake correction mechanism thereon, having a small open F number in the entire zoom range, and having implemented downsizing.

A first invention in accordance with the present invention is characterized by including: sequentially from an object side, a first lens group G1 having a positive refractive power, a front lens group GF having a negative refractive power, and a rear lens group GR having a positive refractive power, wherein, for zooming from a wide-angle end to a telephoto end, a distance between the first lens group G1 and the front lens group GF increases, a distance between the front lens group GF and the rear lens group GR decreases, and the first lens group G1 monotonously moves to the object side; the first lens group G1 has at least one negative lens; the front lens group GF includes a lens group having a negative refractive power of 1 or more; the rear lens group GR has a final lens group GL arranged closest to the image plane side, and is fixed to an image plane I, and moreover, does not move for zooming and focusing; and the final lens group GL has a vibration reduction lens group GS movable in a direction including a perpendicular component with respect to an optical axis; and the first invention satisfies following conditional expressions, $$0.30 < f1/fT < 1.50 \tag{1}$$

$$0.80 < |f1n|/f1 < 4.00 \tag{2}$$

$$20.0 < LTT \times FnoT/Y\max < 50.0 \tag{3}$$

where f1: focal length of the first lens group G1 fT: focal length at a time of focusing on infinity of the imaging optical system at the telephoto end;

f1n: focal length of at least one negative lens of negative lenses included in the first lens group G1;

LTT: total optical length of the imaging optical system at the telephoto end;

FnoT: open F number at a time of focusing on infinity of the imaging optical system at the telephoto end; and Ymax: maximum image height at the imaging optical system.

A second invention in accordance with the present invention is characterized in that the front lens group GF has positive lenses, and the positive lens positioned closest to the object side thereof satisfies a following conditional expression:

$$PgFFp + 0.0022 \times vdFp < 0.678 \tag{4}$$

where

PgFFp: a partial dispersion ratio regarding a g line and an F line of the positive lens positioned closest to the object side of the positive lenses included in the front lens group GF; and vdFp: an abbe number regarding a d line of the positive lens positioned closest to the object side of the positive lenses included in the front lens group GF.

A third invention in accordance with the present invention is characterized in that the final lens group GL has negative lenses, and at least one negative lens thereof satisfies a following conditional expression:

$$PgFLn + 0.0021 \times vdLn > 0.658 \tag{5}$$

where

PgFLn: a partial dispersion ratio regarding a g line and an F line of at least one negative lens of the negative lenses included in the final lens group GL, and vdLn: an abbe number regarding a d line of at least one negative lens of the negative lenses included in the final lens group GL.

A fourth invention in accordance with the present invention is characterized in that the rear lens group GR has an object side lens group GO having a positive refractive power closest to the object side, and has at least one focusing lens group GFcs moving, along the optical axis, for focusing from an infinite distance object to a close distance object closer to the image plane side than the object side lens group GO.

A fifth invention in accordance with the present invention is characterized in that the rear lens group GR has an aperture stop S, the aperture stop S is fixed to the image plane I for zooming from the wide-angle end to the telephoto end, and of the lens groups positioned closer to the image side than the aperture stop S, all the lens groups moving along the optical axis, for zooming from the wide-angle end to the telephoto end are the focusing lens groups GFcs moving along the optical axis, for focusing from the infinite distance object to the close distance object.

A sixth invention in accordance with the present invention is characterized by satisfying a following conditional expression:

$$2.50 < f1/|fFW| < 5.00 \quad (6)$$

where f1: focal length of the first lens group G1; and
fFW: focal length of the front lens group GF at the wide-angle end.

A seventh invention in accordance with the present invention is characterized by satisfying a following conditional expression:

$$L1/LTW < 0.17 \quad (7)$$

where

L1: length on the optical axis from a lens surface closest to the object side to a lens surface closest to the image side of the first lens group G1; and
LTW: total optical length of the imaging optical system at the wide-angle end.

An eighth invention in accordance with the present invention is characterized in that at least one negative lens of the negative lenses included in the first lens group G1 satisfies following conditional expressions:

$$vd1n < 50.0 \quad (8)$$

$$PgF1n + 0.0024 \times vd1n < 0.677 \quad (9)$$

where vd1n: an abbe number regarding a d line of at least one negative lens of the negative lenses included in the first lens group G1, and
PgF1n: a partial dispersion ratio regarding a g line and an F line of at least one negative lens of the negative lenses included in the first lens group G1.

A ninth invention in accordance with the present invention is characterized by satisfying a following conditional expression:

$$0.55 < |fS|/fW < 1.20 \quad (10)$$

where fS: focal length of the vibration reduction lens group GS, and
fW: focal length at a time of focusing on infinity of the imaging optical system at the wide-angle end.

A tenth invention in accordance with the present invention is characterized by satisfying a following conditional expression:

$$BF/Y\max < 3.00 \quad (11)$$

where

BF: back focus at the imaging optical system; and
Ymax: maximum image height at the imaging optical system.

The present invention can provide an imaging optical system mounting a camera shake correction mechanism therein, and having a small open F number in the entire zoom range, and having implemented downsizing.

DESCRIPTION OF THE PREFERRED EMBODIMENTS

Figure 1:
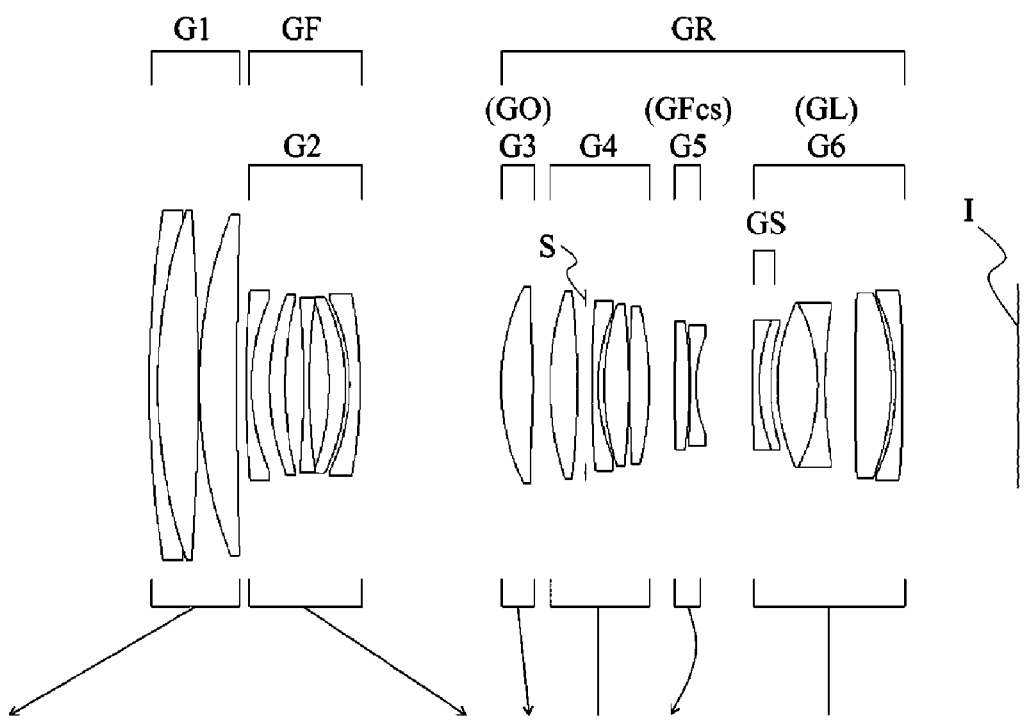
FIG. 1 is a lens block view at the infinite photographing distance at the wide-angle end in accordance with Example 1 of an imaging optical system of the present invention.
Figure 2:
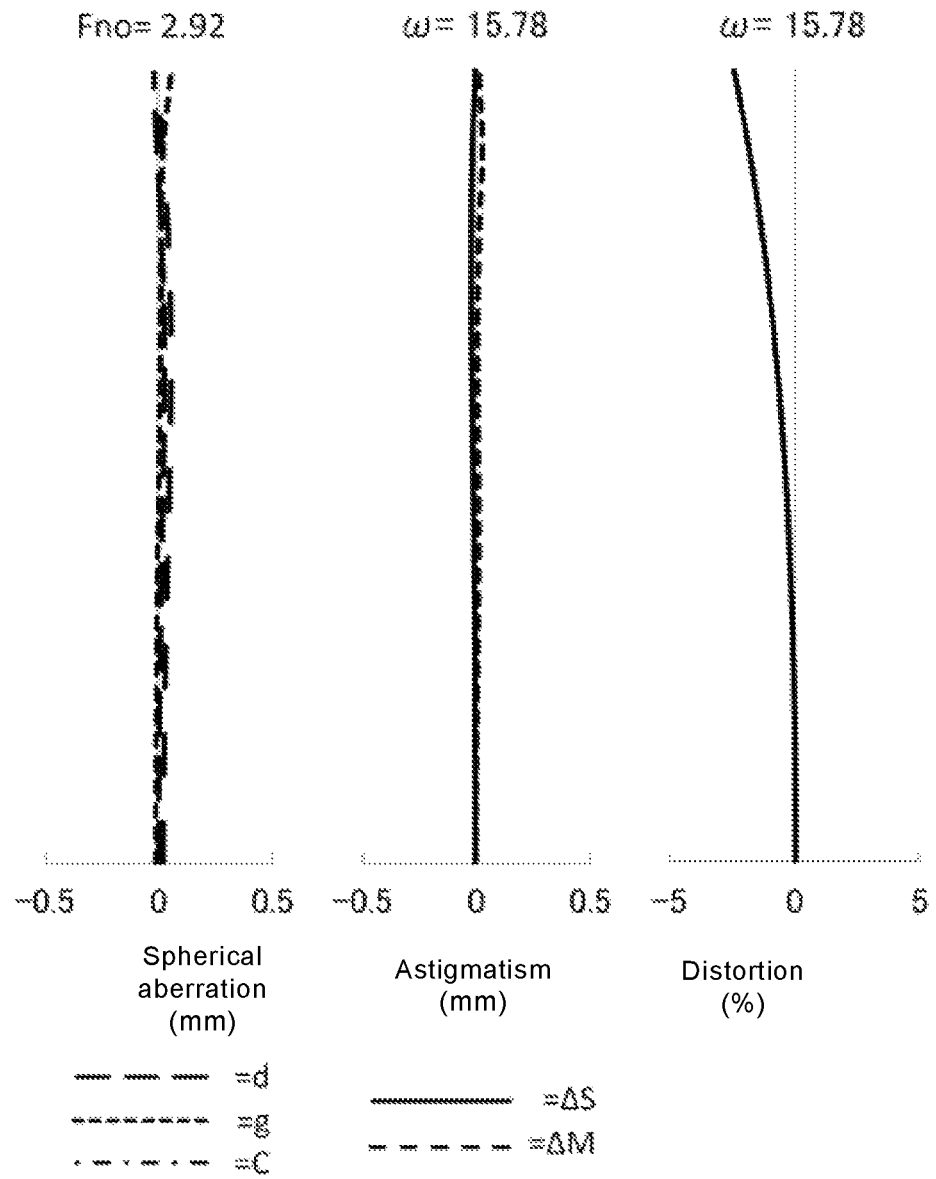
FIG. 2 is a longitudinal aberration diagram at the infinite photographing distance at the wide-angle end of the imaging optical system of Example 1.
Figure 3:
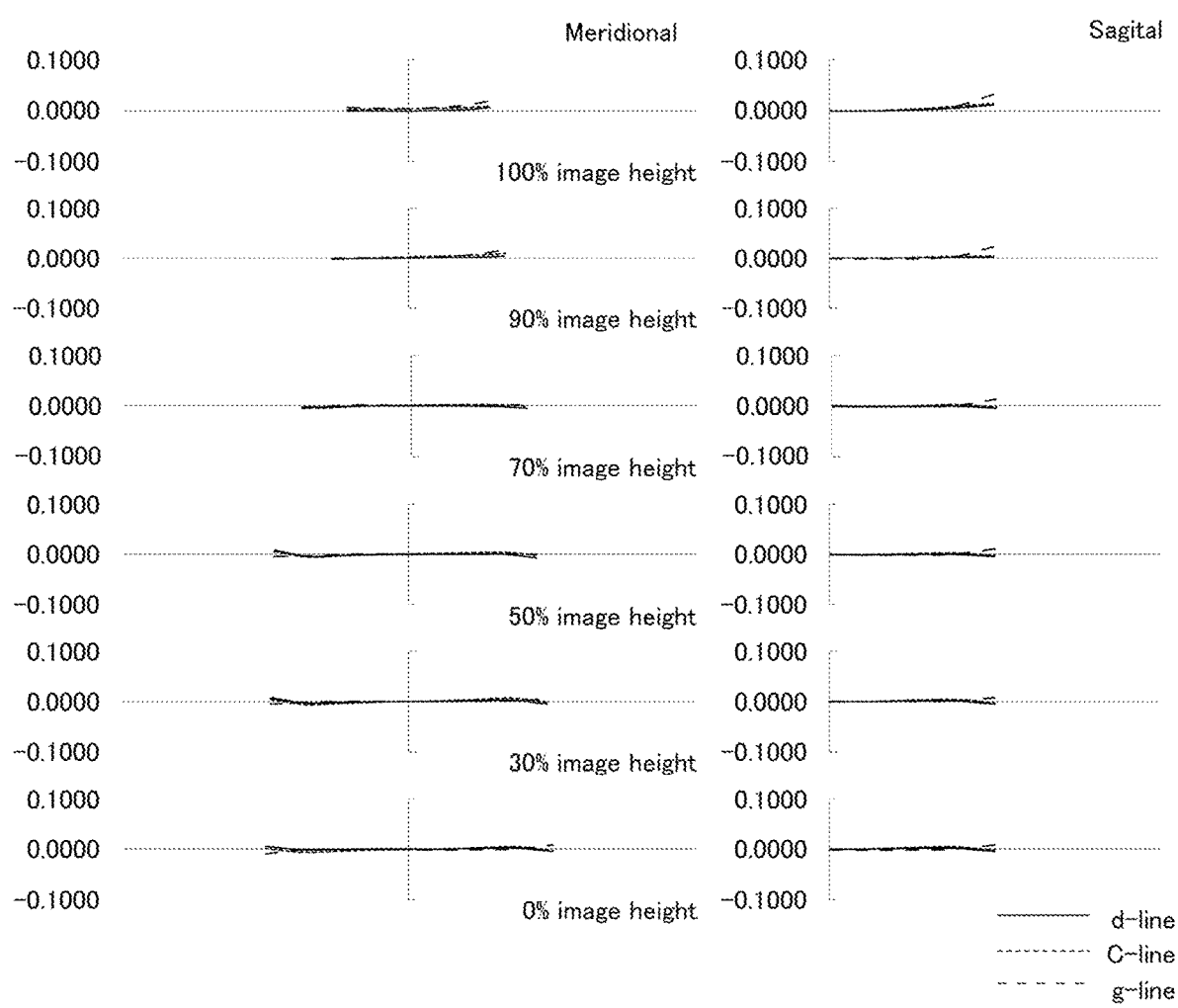
FIG. 3 is a lateral aberration diagram at the infinite photographing distance at the wide-angle end of the imaging optical system of Example 1.
Figure 4:
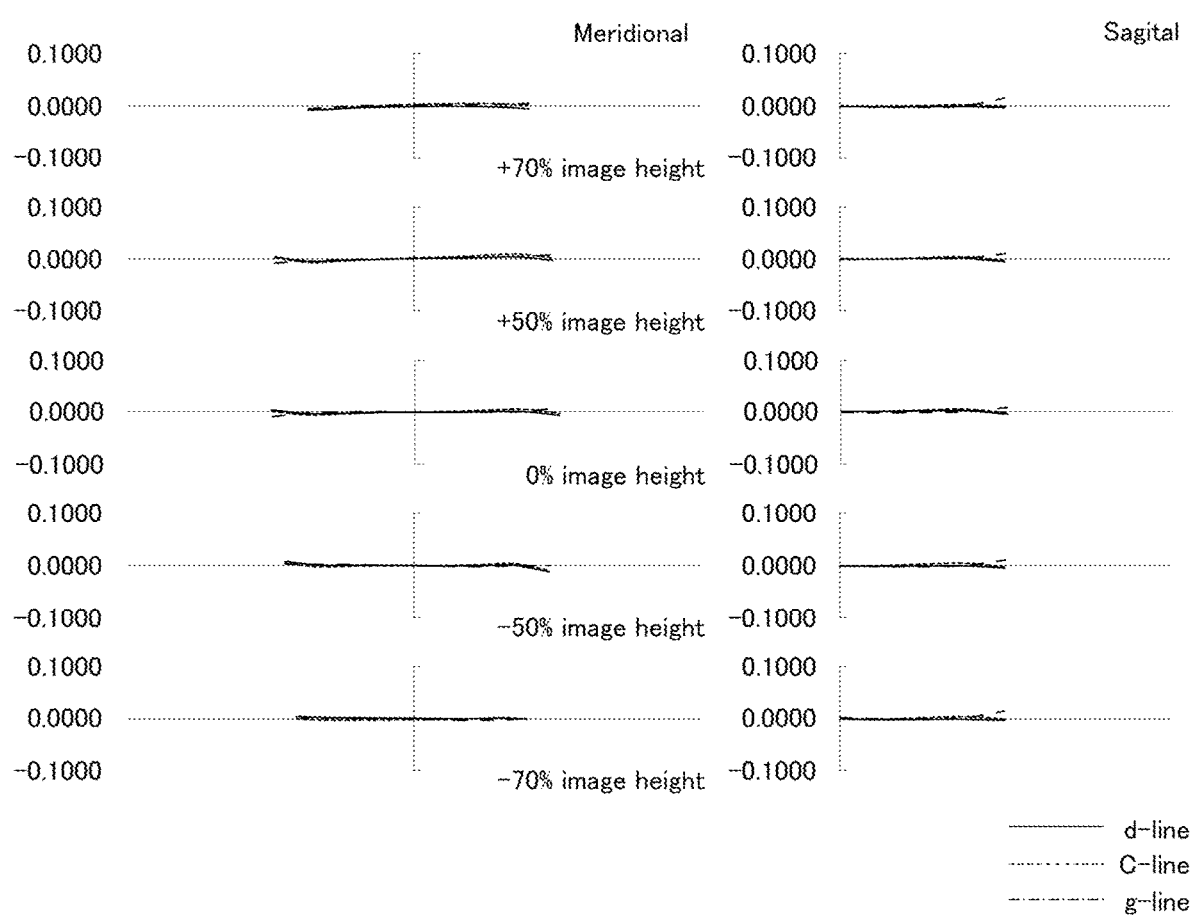
FIG. 4 is a lateral aberration diagram at the time of 0.3° vibration reduction at the infinite photographing distance at the wide-angle end of the imaging optical system of Example 1.
Figure 5:
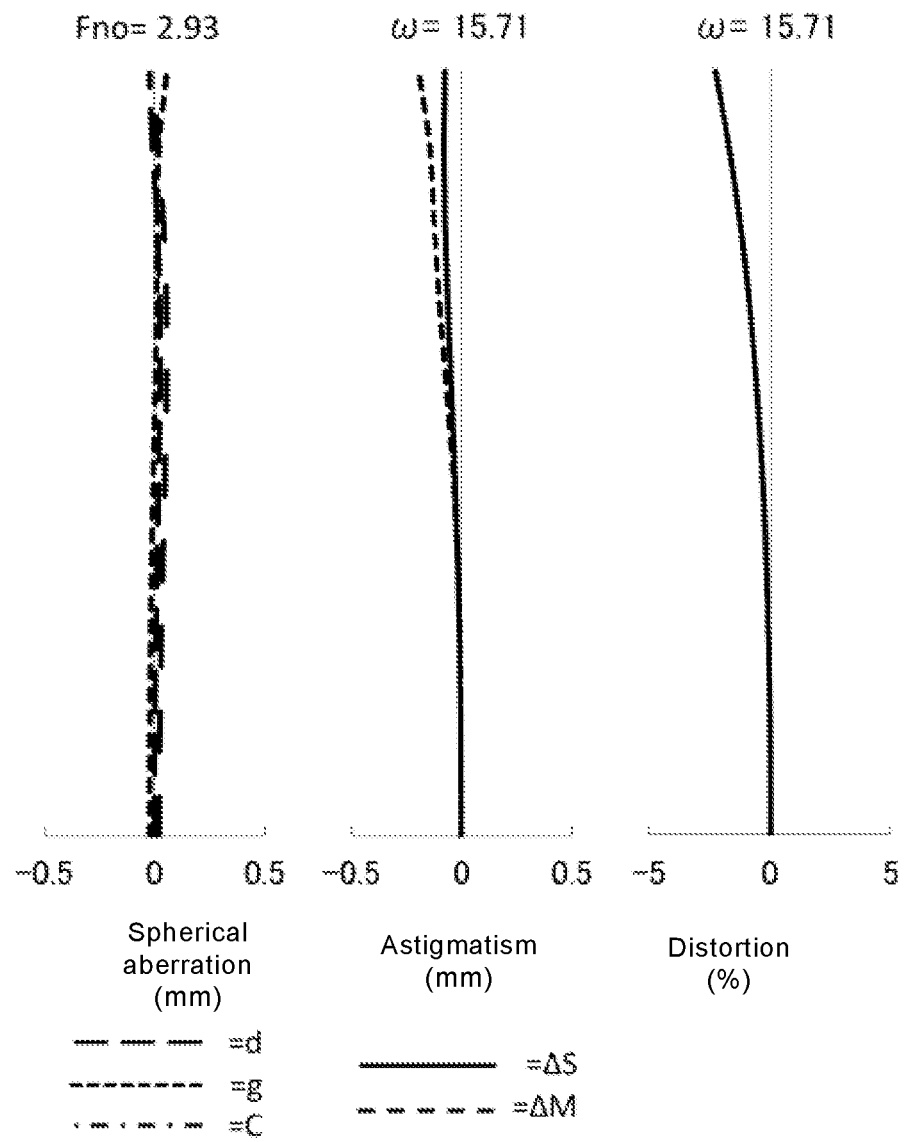
FIG. 5 is a longitudinal aberration diagram at an object distance of 2260 mm at the wide-angle end of the imaging optical system of Example 1.
Figure 6:
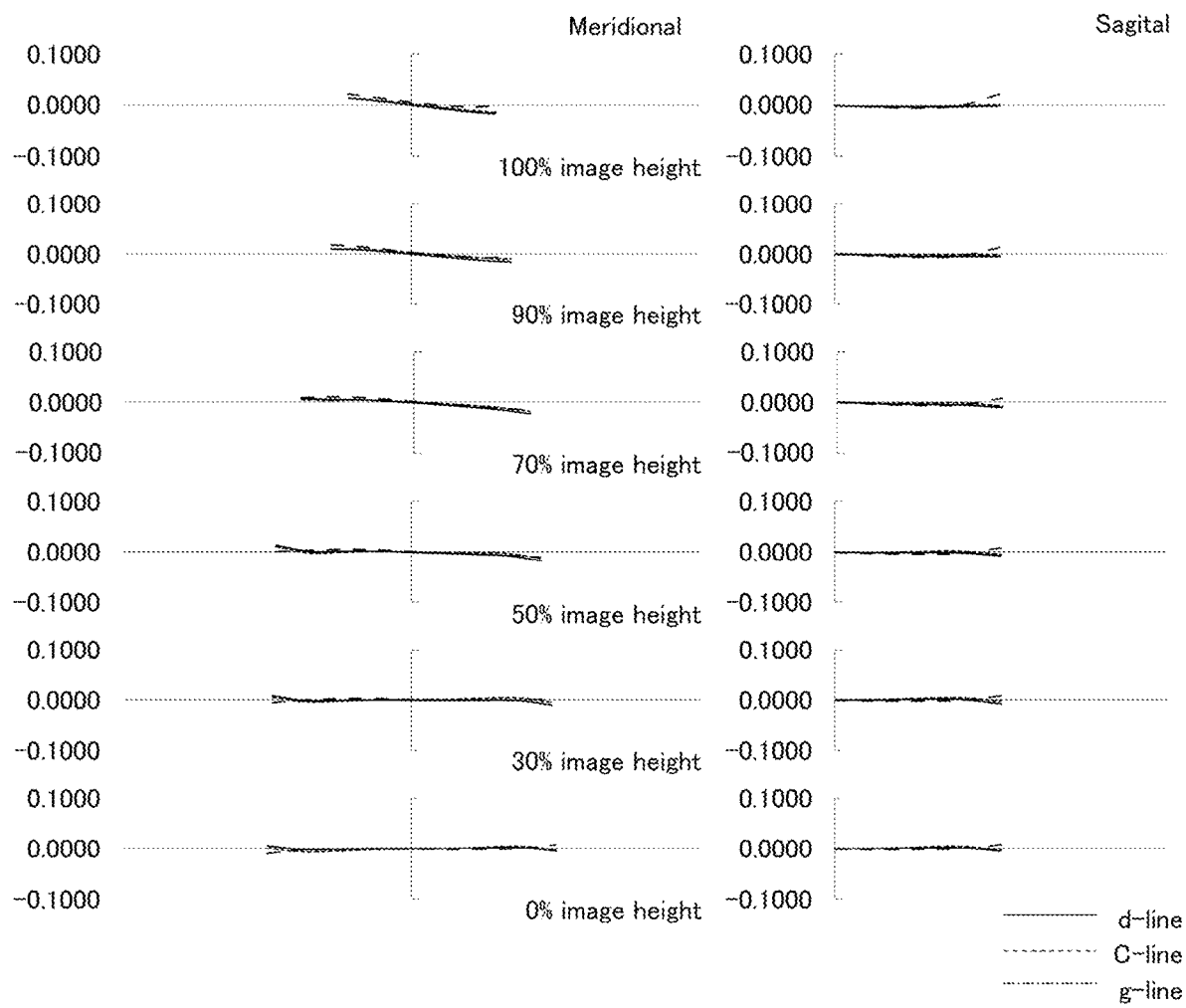
FIG. 6 is a lateral aberration diagram at an object distance of 2260 mm at the wide-angle end of the imaging optical system of Example 1.
Figure 7:
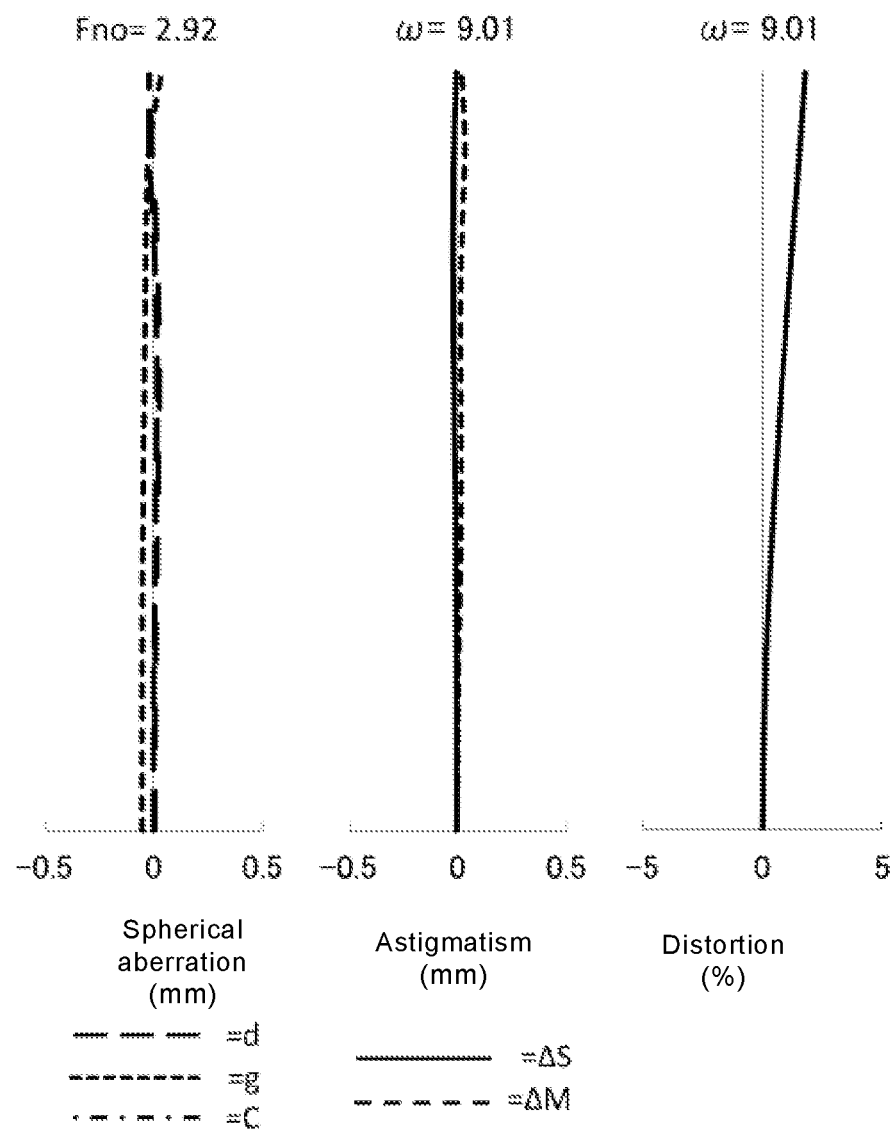
FIG. 7 is a longitudinal aberration diagram at the infinite photographing distance at the zoom center of the imaging optical system of Example 1.
Figure 8:
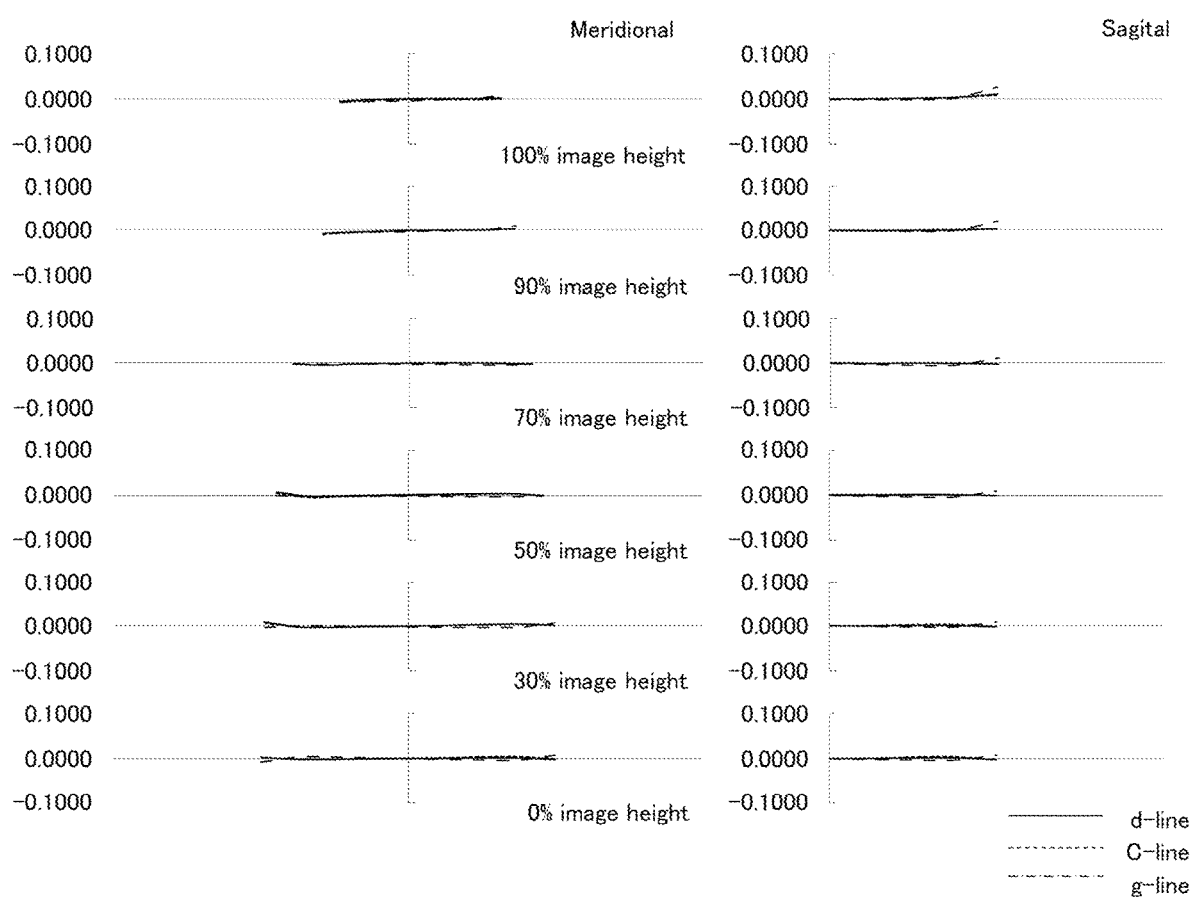
FIG. 8 is a lateral aberration diagram at the infinite photographing distance at the zoom center of the imaging optical system of Example 1.
Figure 9:
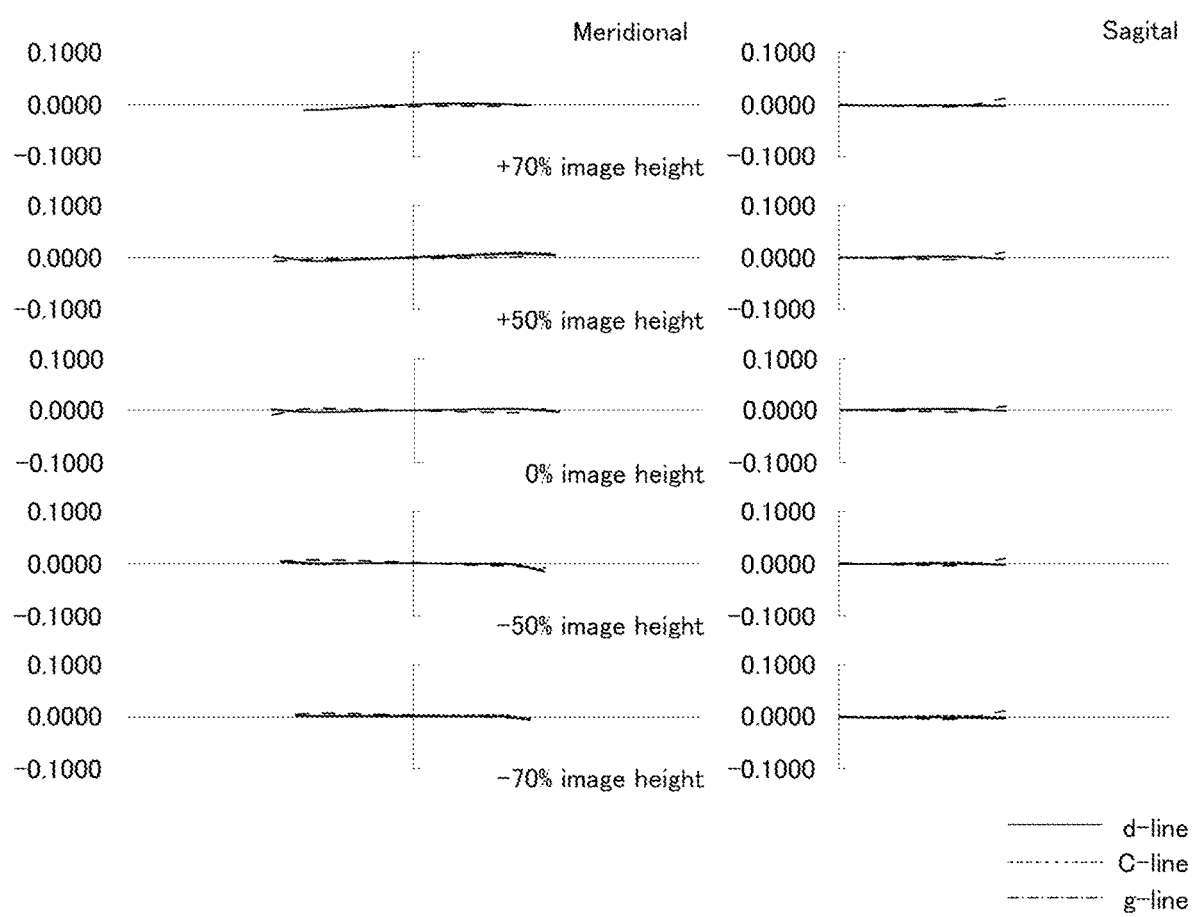
FIG. 9 is a lateral aberration diagram at the time of 0.3° vibration reduction at the infinite photographing distance at the zoom center of the imaging optical system of Example 1.
Figure 10:
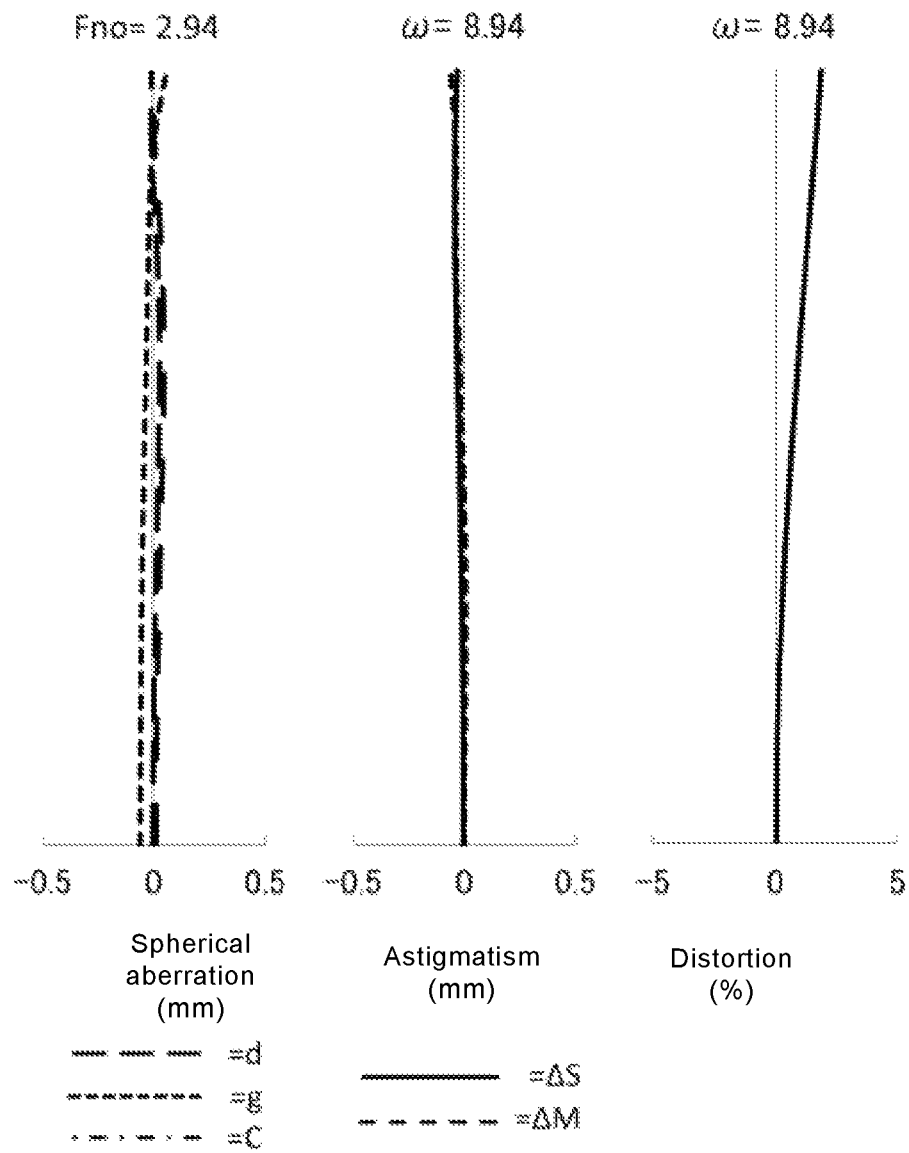
FIG. 10 is a longitudinal aberration diagram at an object distance of 3588 mm at the zoom center of the imaging optical system of Example 1.
Figure 11:
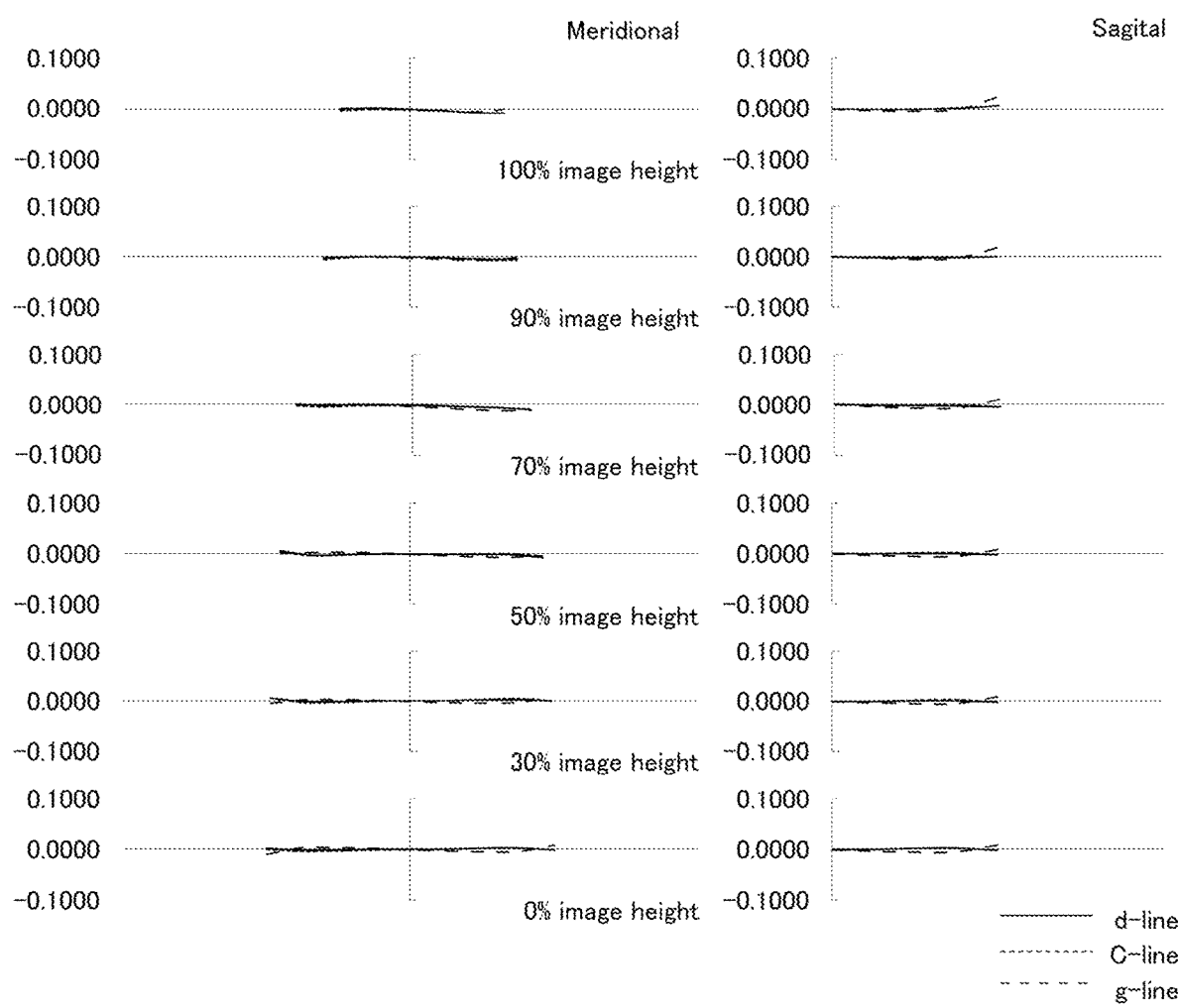
FIG. 11 is a lateral aberration diagram at an object distance of 3588 mm at the zoom center of the imaging optical system of Example 1.
Figure 12:
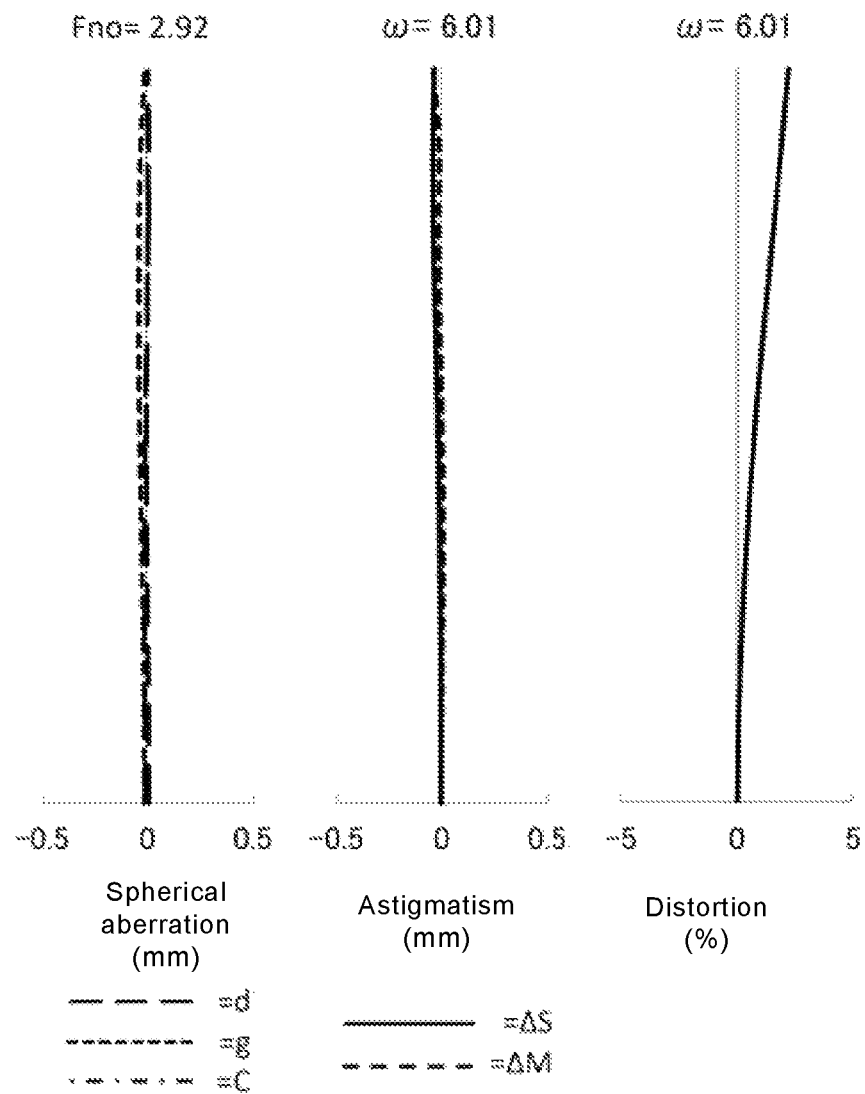
FIG. 12 is a longitudinal aberration diagram at the infinite photographing distance at the telephoto end of the imaging optical system of Example 1.
Figure 13:
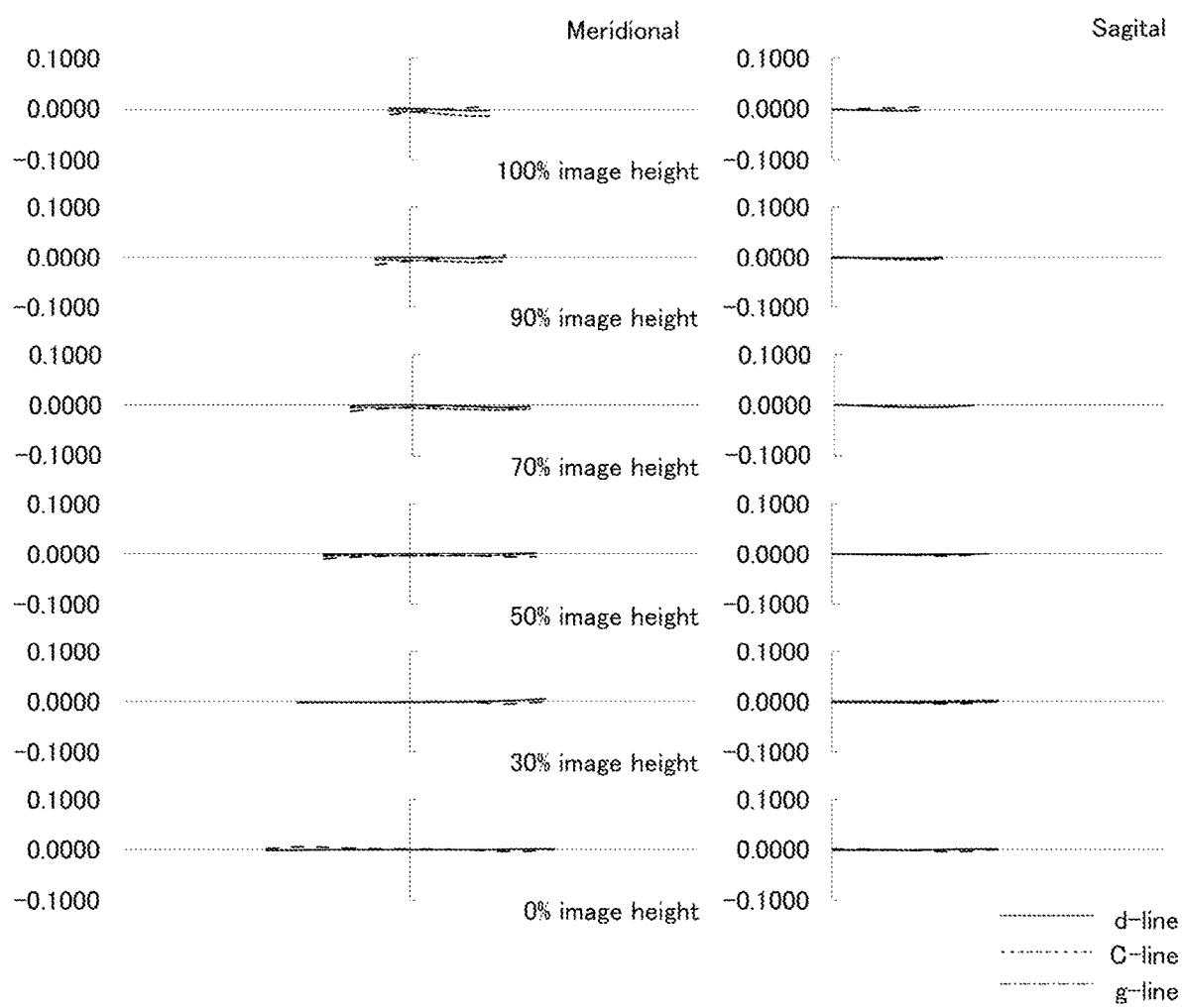
FIG. 13 is a lateral aberration diagram at the infinite photographing distance at the telephoto end of the imaging optical system of Example 1.
Figure 14:
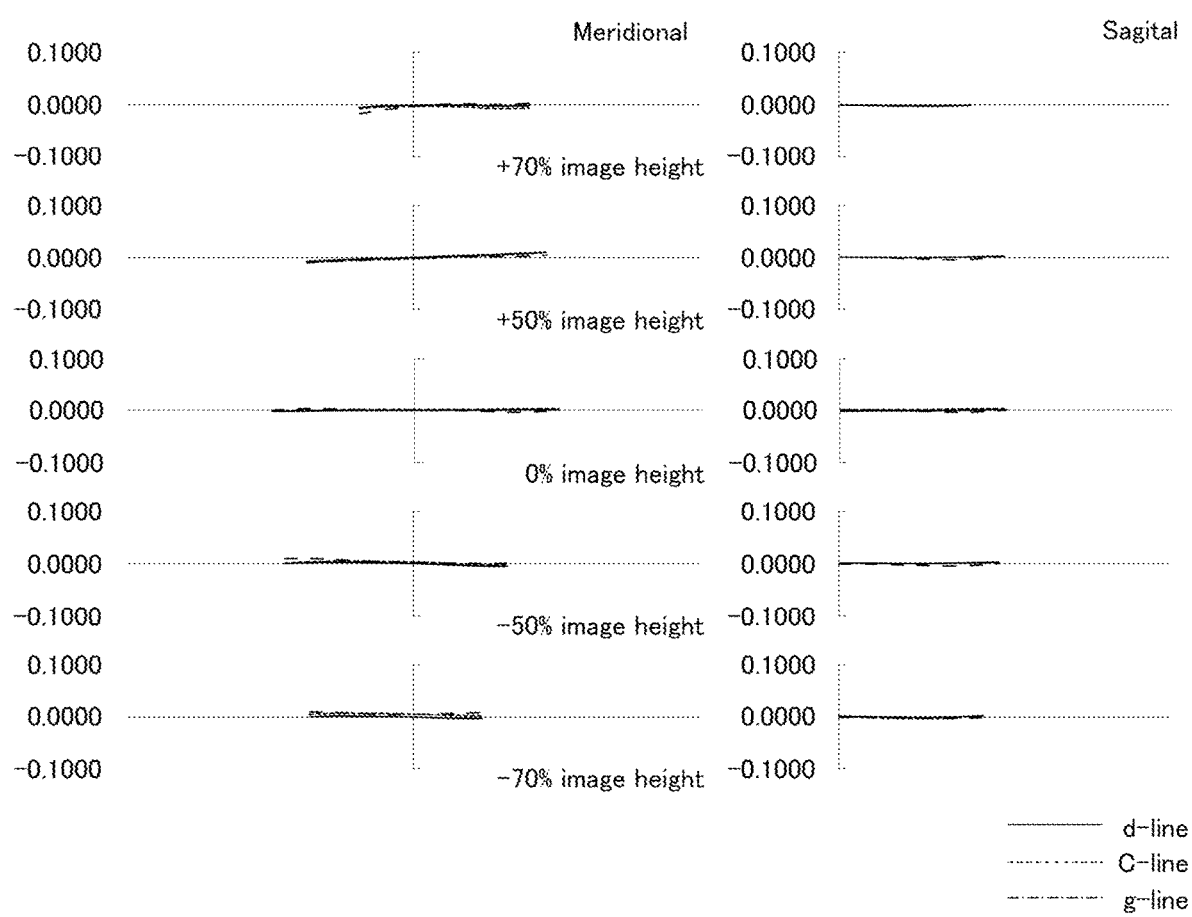
FIG. 14 is a lateral aberration diagram at the time of 0.3° vibration reduction system of Example 1.
Figure 15:
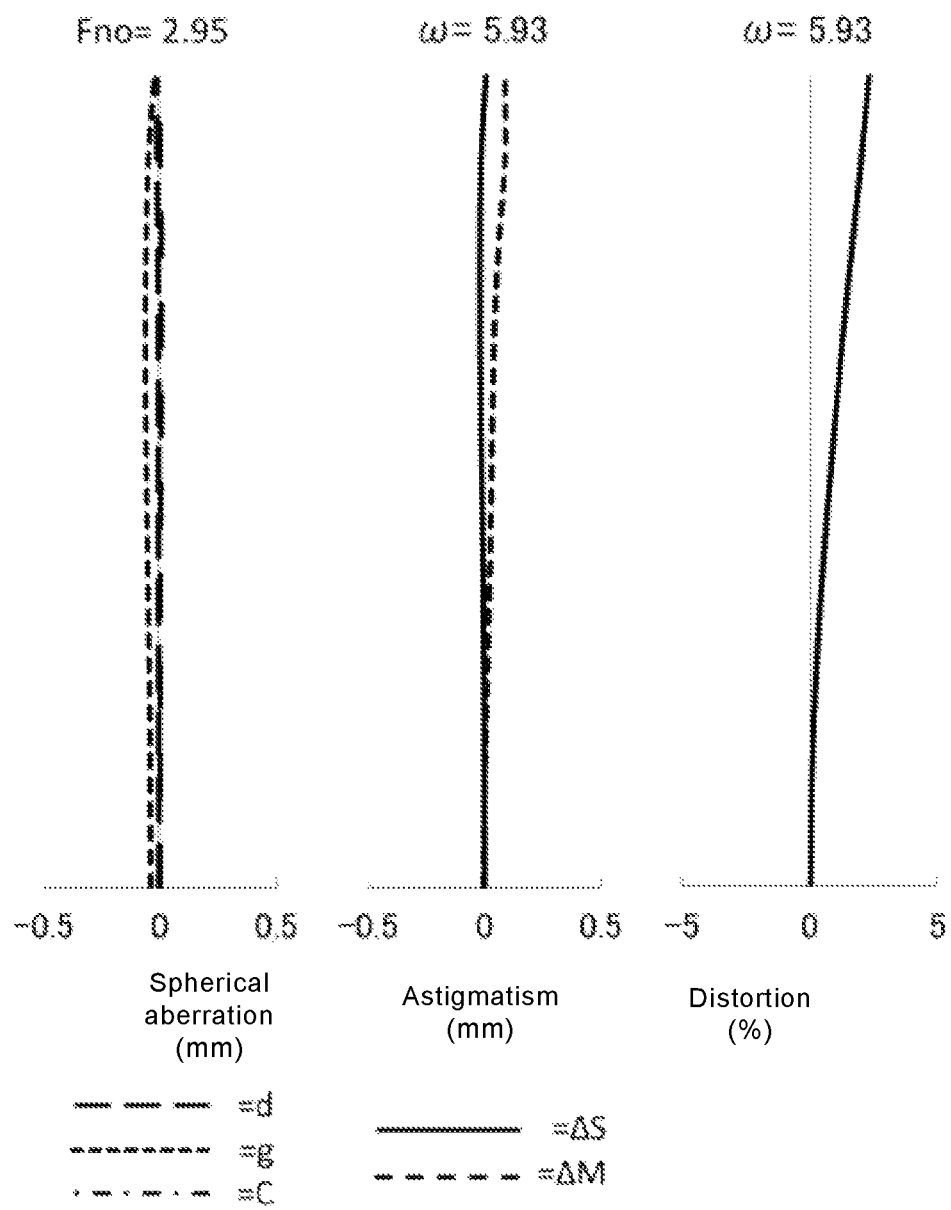
FIG. 15 is a longitudinal aberration diagram at an object distance of 5348 mm at the telephoto end of the imaging optical system of Example 1.
Figure 16:
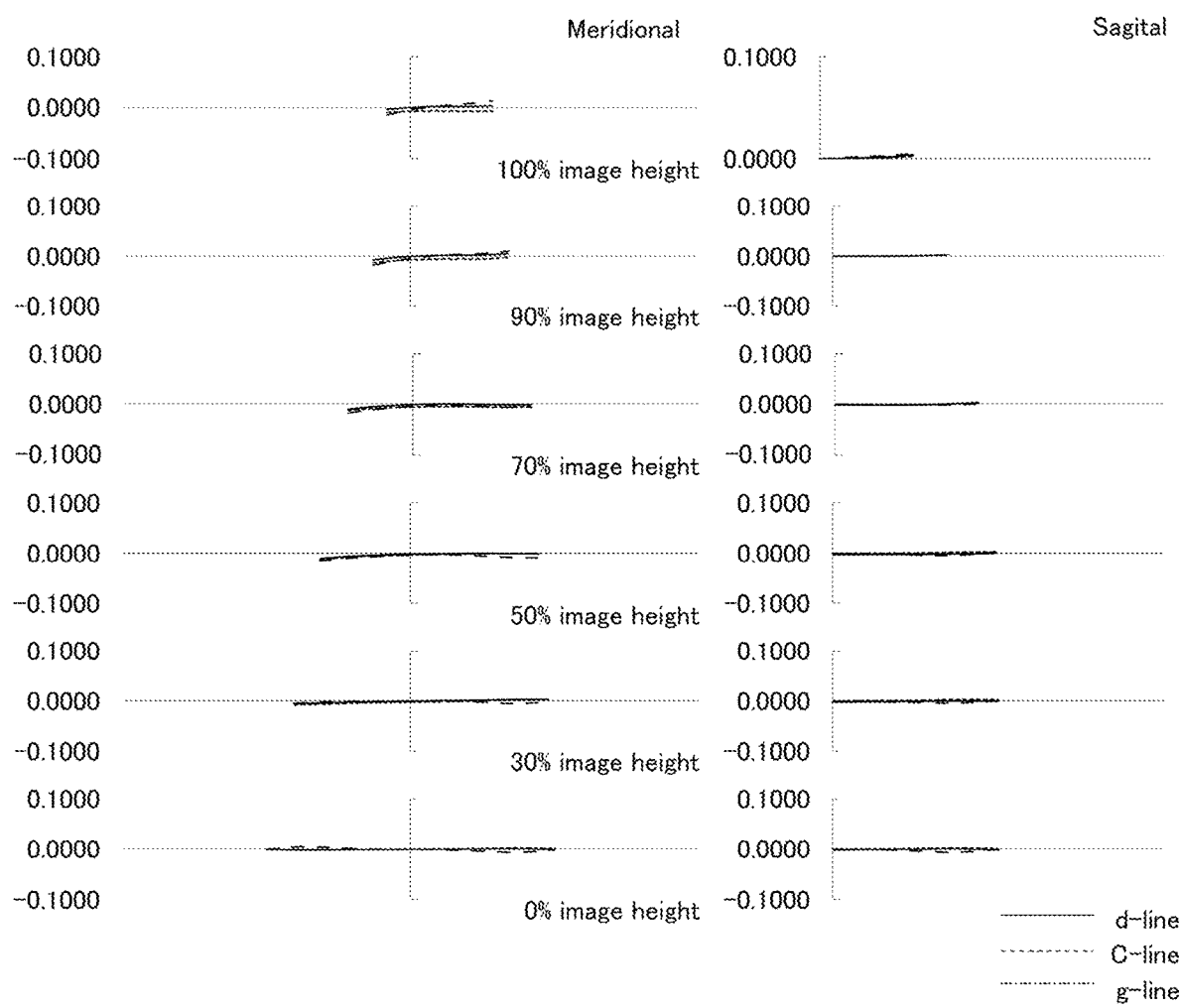
FIG. 16 is a lateral aberration diagram at an object distance of 5348 mm at the telephoto end of the imaging optical system of Example 1.

Below, the embodiments of the present invention will be described.

Incidentally, when ng, nF, nd, and nC represent the refractive indices for a g line (wavelength 435.8 nm), an F line (wavelength 486.1 nm), a d line (wavelength 587.6 nm), and a C line (wavelength 656.3 nm), respectively, the abbe number vd for the d line and the partial dispersion ratio PgF for the g line and the F line are expressed by the following expressions.

$$vd=(nd-1)/(nF-nC); \text{ and}$$

$$PgF=(ng-nF)/(nF-nC)$$

The imaging optical system of the present invention is characterized by including, as shown in FIGS. 1, 17, 33, 49, and 65, sequentially from the object side, a first lens group G1 having a positive refractive power, a front lens group GF having a negative refractive power, and a rear lens group GR having a positive refractive power; and is characterized in that, for zooming from a wide-angle end to a telephoto end, a distance between the first lens group G1 and the front lens group GF increases, a distance between the front lens group GF and the rear lens group GR decreases, and the first lens group G1 monotonously moving to an object side, the first lens group G1 has at least one negative lens, the front lens group GF includes a lens group having a negative refractive power of 1 or more, the rear lens group GR has a final lens group GL arranged closest to the image plane side, fixed with respect to the image plane I, and not moving for zooming and focusing, the final lens group GL has a vibration reduction lens group GS movable in a direction including a perpendicular component with respect to the optical axis, and the imaging optical system satisfies following conditional expressions, $$0.30 < f1/fT < 1.50 \qquad (1)$$

$$0.80 < |f1n|/f1 < 4.00 \qquad (2)$$

$$20.0 < LTT \times FnoT/Y\max < 50.0 \qquad (3)$$

where f1: focal length of the first lens group G1;

if: focal length for focusing on infinity of the imaging optical system at the telephoto end;

f1n: focal length of at least one negative lens of negative lenses included in the first lens group G1;

LTT: total optical length of the imaging optical system at the telephoto end;

FnoT: open F number at the time of focusing on infinity of the imaging optical system at the telephoto end; and Ymax: maximum image height at the imaging optical system.

For the imaging optical system of the present invention, sequentially from the side closest to the object, the first lens group G1 having a positive refractive power, the front lens group GF having a negative refractive power, and the rear lens group GR having a positive refractive power are arranged; the first lens group G1 and the front lens group GF are brought closer to each other at the wide-angle end, so that a lens group with a negative synthetic refractive power is arranged on the object side, and a retrofocus type lens arrangement is accomplished as a whole. As a result, the peripheral illumination ratio at the wide-angle end is ensured. Further, at the telephoto end, the distance between the first lens group G1 and the front lens group GF increases, and the distance between the front lens group GF and the rear lens group GR decreases. This results in the telephoto type lens arrangement as a whole. Thus, the total optical length of the imaging optical system at the telephoto end is shortened, and the peripheral illumination ratio is ensured.

The imaging optical system of the present invention is configured such that the first lens group G1 is monotonously moved to the object side for zooming from the wide-angle end to the telephoto end, and is configured such that the distance between the front lens group GF and the rear lens group GR becomes smaller as compared with the zoom with the first lens group G1 fixed for zooming as in Japanese Patent Application Publication No. 2021-076830 at the wide-angle end. As a result, a larger aperture and shortening of the total optical length of the imaging optical system at the wide-angle end are achieved. Further, by moving the first lens group G1 monotonously, it becomes possible to perform zooming with efficiency. Furthermore, the vibration reduction lens group GS is arranged at the final lens group GL fixed with respect to the image plane I, thereby avoiding the coexistence of a camera shake correction mechanism, a zooming mechanism, and a focus mechanism, and simultaneously achieving mounting of the camera shake correction mechanism and downsizing of a lens barrel.

The conditional expression (1) specifies the ratio of the focal length of the first lens group G1 and the focal length at the time of focusing on infinity of the imaging optical system at the telephoto end. By satisfying the conditional expression (1), the image optical system of the present invention combines the downsizing and the correction of various aberrations.

When the upper limit value of the conditional expression (1) is exceeded, and the refractive power of the first lens group G1 is weakened, the movement amount for zooming of the first lens group G1 increases. For this reason, the number of mechanisms required for the movement of the first lens group G1 increases, thereby causing an increase in size of the lens barrel. Further, when the movement amount for zooming of the first lens group G1 increases, resulting in an increase in total optical length of the imaging optical system at the telephoto end, it becomes difficult to ensure the peripheral illumination ratio at the telephoto end. In this case, in order to ensure the peripheral illumination ratio, the diameter of the first lens group G1 is required to increase, which entails an increase in size of the imaging optical system.

When the lower limit value of the conditional expression (1) is exceeded downward, and the refractive power of the first lens group G1 is strengthened, it becomes difficult to suppress the spherical aberration and astigmatism caused at the first lens group G1.

Incidentally, by desirably limiting the lower limit value to 0.50, or the upper limit value to 1.00 for the conditional expression (1), the foregoing effects can be more ensured.

The conditional expression (2) specifies the ratio of the absolute value of the focal length of at least one negative lens of the negative lenses included in the first lens group G1, and the focal length of the first lens group G1. By satisfying the conditional expression (2), the imaging optical system of the present invention combines the downsizing and correction of various aberrations.

When the upper limit value of the conditional expression (2) is exceeded, and the refractive power of the negative lens included in the first lens group G1 is reduced, the effect of correcting various aberrations at the first lens group G1, particularly, the effect of correcting the magnification chromatic aberration at the telephoto end is reduced, which is not preferable.

When the lower limit value of the conditional expression (2) is exceeded downward, and the refractive power of the negative lens included in the first lens group G1 increases, the refractive power of each lens forming the first lens group G1 increases, which entails an increase in size of the first lens group G1, which is not preferable.

Incidentally, by desirably limiting the lower limit value to 1.30, or the upper limit value to 3.30 for the conditional expression (2), the foregoing effects can be more ensured.

The conditional expression (3) specifies the ratio of the total optical length of the imaging optical system at the telephoto end, the open F number at the time of focusing on infinity of the imaging optical system at the telephoto end, and the maximum image height at the imaging optical system. By satisfying the conditional expression (3), the imaging optical system of the present invention combines ensuring of the brightness of the imaging optical system, the downsizing, and correction of various aberrations.

Generally, the smaller the F value of the imaging optical system becomes, the higher the axial light beam passing through the imaging optical system becomes. Further, the larger the maximum image height becomes, the higher the off-axis light beam passing through the group closest to the object side or closest to the image plane side becomes. These correspond to the reduction of the FnoT/Ymax component of the conditional expression (3). In order to correct various aberrations under such circumstances, it is effective to increase the total optical length of the imaging optical system, and to lessen the incident light beam upon each lens surface of the imaging optical system. However, combination with downsizing requires proper setting of the total optical length of the imaging optical system according to the F value at the telephoto end and the maximum image height.

When the upper limit value of the conditional expression (3) is exceeded, and the total optical length of the imaging optical system at the telephoto end becomes larger relative to the ratio of the open F number at the time of focusing on infinity of the imaging optical system at the telephoto end and the maximum image height at the imaging optical system, various aberrations caused at the entire system of the imaging optical system becomes more likely to be suppressed. However, the total optical length of the imaging optical system increases. Alternatively, the F value at the telephoto end increases, so that it becomes difficult to attain a bright imaging optical system.

When the lower limit value of the conditional expression (3) is exceeded downward, and the total optical length of the imaging optical system at the telephoto end becomes smaller relative to the ratio of the open F number at the time of focusing on infinity of the imaging optical system at the telephoto end and the maximum image height at the imaging optical system, the total optical length of the imaging optical system can be suppressed small. However, the refraction of a light beam at the imaging optical system is intensified. For this reason, the aberration caused at each lens group increases. Thus, it becomes difficult to favorably correct the fluctuations mainly in astigmatism, spherical aberration, coma aberration, or the like, for zooming.

Incidentally, by desirably limiting the lower limit value to 23.0, or the upper limit value to 40.0 for the conditional expression (3), the foregoing effects can be more ensured.

Further, for the imaging optical system of the present invention, desirably, the front lens group GF has positive lenses, and the positive lens positioned closest to the object side thereof satisfies the following conditional expression:

$$PgFFp + 0.0022 \times vdFp < 0.678 \qquad (4)$$

where
PgFFp: partial dispersion ratio regarding the g line and the F line of the positive lens positioned closest to the object side of the positive lenses included in the front lens group GF; and
vdFp: abbe number regarding the d line of the positive lens positioned closest to the object side of the positive lenses included in the front lens group GF.

The conditional expression (4) specifies the preferable optical characteristic for favorably correcting the chromatic aberration for the material for the positive lens positioned closest to the object side of the positive lenses included in the front lens group GF.

When an optical material with a large positive anomalous partial dispersion is used as the material for the positive lens positioned closest to the object side of the positive lenses included in the front lens group GF, the magnification chromatic aberration of the g line in the over direction at the wide-angle end increases. Thus, it becomes difficult to correct the magnification chromatic aberration including the secondary spectrum.

When the upper limit value of the conditional expression (4) is exceeded, and the positive anomalous partial dispersion of the positive lens positioned closest to the object side of the positive lenses included in the front lens group GF increases, the effect of correction of the magnification chromatic aberration including the secondary spectrum at the front lens group GF at the wide-angle end becomes too large. Thus, it becomes difficult to suppress the magnification chromatic aberration.

Incidentally, by desirably limiting the higher limit value to 0.675 for the conditional expression (4), the foregoing effect can be more ensured.

Further, for the imaging optical system of the present invention, desirably, the final lens group GL has negative lenses, and at least one negative lens thereof satisfies the following conditional expression:

$$0.658 < PgFLn + 0.0021 \times vdLn \quad (5)$$

where

PgFLn; the partial dispersion ratio regarding the g line and the F line of at least one negative lens of the negative lenses included in the final lens group GL; and vdLn: the abbe number regarding the d line of at least one negative lens of the negative lenses included the final lens group GL.

The conditional expression (5) specifies the preferable optical characteristics for favorably correcting the chromatic aberration for the materials for at least one negative lens of the negative lenses included in the final lens group GL. By using an optical material with a large positive anomalous partial dispersion as the material for the negative lens included in the final lens group GL, it becomes possible to correct the magnification chromatic aberration of the g line at the peripheral part in the over direction.

For the correction of the magnification chromatic aberration in a positive lead type zooming optical system, it becomes the object how to combine the correction of the magnification chromatic aberration of the g line in the over direction caused at the wide-angle end and the correction of the magnification chromatic aberration of the g line in the under direction caused at the telephoto end.

In order to correct the magnification chromatic aberration in the entire zooming range, desirably, the magnification chromatic aberration at the telephoto end is corrected by the first lens group G1 to which a peripheral light flux is made incident at a high position with respect to the optical axis at the telephoto end, and the magnification chromatic aberration at the wide-angle end is corrected by the front lens group GF to which a peripheral light flux is made incident at a high position with respect to the optical axis at the wide-angle end.

However, with the imaging optical system of the present invention, downsizing is the object. For this reason, the radius of curvature of each lens surface forming the first lens group G1 cannot be reduced, so that the magnification chromatic aberration at the telephoto end by the first lens group G1 cannot be corrected sufficiently.

On the other hand, for the final lens group GL, the position through which a peripheral light flux passes is high with respect to the optical axis. For this reason, the effect of correcting the magnification chromatic aberration is large. Further, the final lens group GL is fixed with respect to the image plane I for zooming. For this reason, the change in effect of correcting the magnification chromatic aberration by zooming can be reduced.

Under such circumstances, with the imaging optical system of the present invention, a high-dispersion optical material with a large positive anomalous partial dispersion is used for the negative lenses included in the final lens group GL. Accordingly, the magnification chromatic aberration of the g line is corrected in the over direction so as to reduce the magnification chromatic aberration at the telephoto end. As a result, the magnification chromatic aberration in the over direction of the g line increasing at the wide-angle end is corrected by the front lens group GF. This enables suppression of fluctuations in magnification chromatic aberration caused for zooming.

When the lower limit value of the conditional expression (5) is exceeded downward, and the positive anomalous partial dispersion of at least one negative lens of the negative lenses included in the final lens group GL is reduced, the effect of correcting the magnification chromatic aberration including the secondary spectrum at the final lens group GL at the telephoto end is reduced, so that it becomes difficult to suppress the magnification chromatic aberration.

Incidentally, by desirably limiting the lower limit value to 0.665 for the conditional expression (5), the foregoing effect can be more ensured.

Further, for the imaging optical system of the present invention, desirably, the rear lens group GR has an object side lens group GO having a positive refractive power closest to the object side, and has at least one focusing lens group GFcs moving along the optical axis in focusing from the infinite distance object to the close distance object closer to the image plane side than the object side lens group GO.

In order to attain higher-speed focusing, the lens group moving in focusing is required to be downsized. Due to the arrangement of the focusing lens group GFcs closer to the image plane side than the object side lens group GO having a positive refractive power, the light beam magnified by the front lens group GF is converged by the object side lens group GO to be made incident upon the focusing lens group GFcs. As a result, the lens diameter of the focusing lens group GFcs can be reduced, which enables an increase in speed of focusing.

Further, for the imaging optical system of the present invention, desirably, the rear lens group GR has an aperture stop S, and the aperture stop S is fixed with respect to the image plane I for zooming from the wide-angle end to the telephoto end. All the lens groups moving along the optical axis for zooming from the wide-angle end to the telephoto end of the lens groups positioned closer to the image side than the aperture stop S are desirably the focusing lens groups GFcs moving along the optical axis for focusing from the infinite distance object to the close distance object.

The aperture stop S is changed in diameter for changing the F value, and hence the diameter of the whole mechanism tends to be larger relative to the diameter of the aperture stop S. In order to move the mechanism with a large-diameter aperture stop S for zooming, a still larger mechanism becomes necessary, undesirably resulting in an increase in size of the lens barrel. Further, when all the lens groups moving for zooming and focusing of the lens groups positioned closer to the image plane side than the aperture stop S are focus groups, they can be moved by an actuator. For this reason, a complicated mechanism is not necessary. As a result, the mechanism for moving the aperture stop S and the lens groups becomes unnecessary from the aperture stop S to the image plane side. This enables downsizing of the lens barrel.

Further, the imaging optical system of the present invention desirably satisfies the following conditional expression:

$$2.50<f1/|fFW|<5.00 \quad (6)$$

where
f1: focal length of the first lens group G1; and
fFW: focal length of the front lens group GF at the wide-angle end The conditional expression (6) specifies the ratio of the focal length of the first lens group G1 and the focal length of the front lens group GF at the wide-angle end. By satisfying the conditional expression (6), the imaging optical system of the present invention combines downsizing and correction of various aberrations.

When the upper limit value of the conditional expression (6) is exceeded, and the refractive power of the first lens group G1 is weakened, the effect of correcting various aberrations at the first lens group G1 in the imaging optical system, particularly, the effect of correcting the magnification chromatic aberration at the telephoto end is reduced, which is not preferable. Whereas, when the refractive power of the front lens group GF at the wide-angle end is strengthened, it becomes difficult to suppress the coma aberration and the astigmatism caused at the front lens group GF.

When the lower limit value of the conditional expression (6) is exceeded downward, and the refractive power of the first lens group G1 is strengthened, the refractive power of each lens forming the first lens group G1 increases, entailing an increase in size of the first lens group G1, which is not preferable. Whereas, when the refractive power of the front lens group GF at the wide-angle end is weakened, the zooming action of the front lens group GF is reduced. For this reason, the distance between the front lens group GF and the rear lens group GR at the wide-angle end increases. As a result, the total optical length of the imaging optical system at the wide-angle end increases, which is not preferable.

Incidentally, by desirably limiting the lower limit value to 3.00 or the upper limit value to 4.20 for the conditional expression (6), the foregoing effect can be more ensured.

Further, the imaging optical system of the present invention desirably satisfies the following conditional expression:

$$L1/LTW<0.17 \quad (7)$$

where
L1: length on the optical axis from the lens surface closest to object side to the lens surface closest to image side of the first lens group G1; and
LTW: total optical length of the imaging optical system at the wide-angle end.

The conditional expression (7) specifies the ratio of the length on the optical axis from the surface closest to the object side to the surface closest to the image side of the first lens group G1, and the total optical length of the imaging optical system at the wide-angle end. By satisfying the conditional expression (7), downsizing of the imaging optical system of the present invention is enabled.

When the upper limit value of the conditional expression (7) is exceeded, and the length on the optical axis of the first lens group G1 increases, the weight of the first lens group G1 increases, resulting in an increase in total weight of the imaging optical system, which is not preferable. Further, the first lens group G1 increased in weight moves to the object side for zooming from the wide-angle end to the telephoto end. This results in an increase in movement of the center of gravity of the imaging optical system, which is not preferable.

Incidentally, by desirably limiting the upper limit value to 0.13 for the conditional expression (7), the foregoing effect can be more ensured.

Further, for the imaging optical system of the present invention, desirably, at least one negative lens of the negative lenses included in the first lens group G1 satisfies the following conditional expressions:

$$vd1n<50.0 \quad (8)$$

$$PgF1n+0.0024\times vd1n<0.677 \quad (9)$$

where
vd1n: abbe number regarding a d line of at least one negative lens of negative lenses included in first lens group G1; and
PgF1n: partial dispersion ratio regarding a g line and an F line of at least one negative lens of the negative lenses included in first lens group G1.

The conditional expressions (8) and (9) specify the preferable optical characteristics for favorably correcting the chromatic aberration for the materials for at least one negative lens of the negative lenses included in the first lens group G1. By using an optical material having negative anomalous partial dispersion, and to be highly dispersed as the material for the negative lens included in the first lens group G1, it becomes possible to suppress the fluctuations in magnification chromatic aberration including the secondary spectrum for zooming.

When the upper limit value of the conditional expression (8) is exceeded, and the abbe number of the negative lens included in the first lens group G1 increases, the achromatic effect at the first lens group G1 is reduced, so that it becomes difficult to suppress the chromatic aberration.

Incidentally, by desirably limiting the upper limit value to 41.0 for the conditional expression (8), the foregoing effects can be more ensured.

When the upper limit value of the conditional expression (9) is exceeded, and the negative anomalous partial dispersion of the negative lens included in the first lens group G1 is reduced, the achromatic effect including the secondary spectrum at the first lens group G1 is reduced, so that it becomes difficult to suppress the chromatic aberration.

Incidentally, by desirably limiting the upper limit value to 0.672 for the conditional expression (9), the foregoing effect can be more ensured.

Further, the imaging optical system of the present invention desirably satisfies the following conditional expression:

$$0.55<|fS|/fW<1.20 \quad (10)$$

where
fS: focal length of the vibration reduction lens group GS; and
fW: focal length at the time of focusing on infinity of the imaging optical system at the wide-angle end.

The conditional expression (10) specifies the ratio of the focal length of the vibration reduction lens group GS and the focal length at the time of focusing on infinity of the imaging optical system at the wide-angle end. By satisfying the conditional expression (10), the imaging optical system of the present invention combines the high vibration reduction effect and the favorable imaging performance.

When the upper limit value of the conditional expression (10) is exceeded, and the refractive power of the vibration reduction lens group GS is reduced, the amount of movement at the time of vibration reduction increases. This entails the reduction of the responsiveness of the vibration reduction operation and an increase in size of the lens barrel.

When the lower limit value of the conditional expression (10) is exceeded downward, and the refractive power of the vibration reduction lens group GS increases, the fluctuations in aberration at the time of vibration reduction increase.

Incidentally, by desirably limiting the lower limit value to 0.65, or the upper limit value to 0.95 for the conditional expression (10), the effect can be more ensured.

Further, the imaging optical system of the present invention desirably satisfies the following conditional expression:

$$BF/Y\max < 3.00 \tag{11}$$

where

BF: back focus at the imaging optical system; and

Ymax: maximum image height at the imaging optical system.

The conditional expression (11) specifies the ratio of the back focus at the imaging optical system and the maximum image height at the imaging optical system. By satisfying the conditional expression (11), the imaging optical system of the present invention enables downsizing. Herein, the back focus of the present invention represents the air equivalent length on the optical axis from the lens surface closest to the image side of the final lens group GL to the image plane I.

When the upper limit value of the conditional expression (11) is exceeded, and the back focus increases, the total optical length of the imaging optical system increases, which is not preferable.

Incidentally, by desirably limiting the upper limit value to 2.30 for the conditional expression (11), the effect can be more ensured.

Below, a description will be given to the lens configuration, the numerical value examples, and the conditional expression corresponding values of each Example in accordance with the imaging optical system of the present invention. Incidentally, in the following description, the lens configuration will be described in the order from the object side to the image plane side. Further, the expression of Ln in Example represents the n-th lens from the object side.

In [Surface data], the surface number represents the number of the lens surface or the aperture stop counted from the object side; r, the radius of curvature of each lens surface; d, the distance between respective lens surfaces; nd, the refractive index for the d line (wavelength 587.56 nm); vd, the abbe number for the d line; PgF, the partial dispersion ratio of the g line (wavelength 435.84 nm) and the F line (wavelength 486.13 nm).

The * (asterisk) affixed to the surface number indicates that the lens surface shape is an aspherical surface. Further, BF represents the back focus, the distance from the subject surface represents the distance from the subject to the lens first surface.

The (stop) affixed to the surface number indicates that the aperture stop is positioned at that position. A reference sign ∞ (infinity) is described to the radius of curvature for the plane or the aperture stop.

For the [Aspherical surface data], the value of each coefficient giving the aspherical surface shape of the lens surface affixed with * in the [Surface data]. The shape of the aspherical surface is expressed by the following expression. In the following expression, y represents the displacement from the optical axis in the direction orthogonal to the optical axis; z, the displacement (SAG amount) in the optical axis direction from the point of intersection between the aspherical surface and the optical axis; r, the radius of curvature of the reference spherical surface; and K, the conic coefficient. Further, the fourth, sixth, eighth, and tenth aspherical surface coefficients represent A4, A6, A8, and A10, respectively.

$$z = \frac{(1/r)y^2}{1+\sqrt{1-(1+K)(y/r)^2}} + A4y^4 + A6y^6 + A8y^8 + A10y^{10}$$

For the [Various data], the values of the focal length in each focal length state, and the like are shown.

For the [Variable distance data], the values of the variable distance and BF in each object distance focus state are shown.

For the [Lens group data], the surface number closest to the object side forming each lens group and the synthetic focal length of the whole group are shown.

Further, in an aberration view corresponding to each Example, d, g, and C represent, the d line, the g line, and the C line, respectively, and ΔS and ΔM represent the sagittal image plane and the meridional image plane, respectively.

Incidentally, in the values of all the following specification values, as the unit of each length of the focal length f, the radius of curvature r, the lens surface distance d, and other lengths, millimeter (mm) is used unless otherwise specified. However, with the optical system, the equal optical performances can be obtained even in proportional magnification and proportional reduction. For this reason, the present invention is not limited thereto.

Example 1

FIG. 1 is a lens block view of an imaging optical system of Example 1 of the present invention.

The imaging optical system of Example 1 includes a first lens group G1 having a positive refractive power, a second lens group G2 having a negative refractive power, a third lens group G3 having a positive refractive power, a fourth lens group G4 having a positive refractive power, a fifth lens group G5 having a negative refractive power, and a sixth lens group G6 having a positive refractive power. The aperture stop S is positioned in the fourth lens group G4. For zooming from the wide-angle end to the telephoto end, the distance between the first lens group G1 and the second lens group G2 increases, the distance between the second lens group G2 and the third lens group G3 decreases, the distance between the third lens group G3 and the fourth lens group G4 decreases, the distance between the fourth lens group G4 and the fifth lens group G5 is changed, the distance between the fifth lens group G5 and the sixth lens group G6 is changed, the first lens group G1 monotonously moves to the object side, and the fourth lens group G4 and the sixth lens group G6 are fixed with respect to the image plane I.

The front lens group GF corresponds to the second lens group G2, the rear lens group GR corresponds to the third lens group G3, the fourth lens group G4, the fifth lens group G5, and the sixth lens group G6. The object side lens group GO corresponds to the third lens group G3, and the final lens group GL corresponds to the sixth lens group G6.

The fifth lens group G5 is the focusing lens group GFcs, and moves along the optical axis for focusing from the infinite distance object to the close distance object.

The first lens group G1 includes a cemented lens of a negative meniscus lens L1 with the convex surface pointing to the object side and a double convex lens L2, and a positive meniscus lens L3 with the convex surface pointing to the object side.

The second lens group G2 includes a negative meniscus lens L4 with the convex surface pointing to the object side, a positive meniscus lens L5 with the convex surface pointing to the object side, a double concave lens L6, a positive meniscus lens L7 with the convex surface pointing to the image plane side, and a negative meniscus lens L8 with the convex surface pointing to the image plane side.

The third lens group G3 includes a double convex lens L9 with both the R1 surface and the R2 surface being aspherical surfaces.

The fourth lens group G4 includes a double convex lens L10, an aperture stop S, a negative meniscus lens L11 with the convex surface pointing to the object side, a double convex lens L12, and a double convex lens L13.

The fifth lens group G5 includes a double convex lens L14, and a double concave lens L15 with both the R1 surface and the R2 surface being aspherical surfaces.

The sixth lens group G6 includes a cemented lens of a negative meniscus lens L16 with the convex surface pointing to the object side and a positive meniscus lens L17 with the convex surface pointing to the object side, a cemented lens of a double convex lens L18 and a double concave lens L19, a double convex lens L20, and a negative meniscus lens L21 with the R1 surface and the R2 surface being aspherical surfaces, and with the convex surface pointing to the image plane side. The cemented lens of L16 and L17 is a vibration reduction lens group GS, and moves including a perpendicular component at the optical axis for vibration reduction.

Below, specification values of an optical system in accordance with Example 1 will be shown.

Numerical Value Example 1

Unit: mm

[Surface data]

| Surface number | r | d | nd | vd | PgF |
|---|---|---|---|---|---|
| Object surface | ∞ | (d0) | | | |
| 1 | 157.1970 | 1.2000 | 1.76634 | 35.82 | 0.5792 |
| 2 | 74.7404 | 6.0850 | 1.49700 | 81.61 | 0.5389 |
| 3 | −330.0940 | 0.1500 | | | |
| 4 | 65.6434 | 5.6418 | 1.43700 | 95.10 | 0.5336 |
| 5 | 763.5059 | (d5) | | | |
| 6 | 133.3397 | 0.9000 | 1.55032 | 75.50 | 0.5401 |
| 7 | 30.3907 | 2.7345 | | | |
| 8 | 34.8642 | 2.2357 | 1.92119 | 23.96 | 0.6202 |
| 9 | 47.8947 | 2.7765 | | | |
| 10 | −150.3110 | 0.9000 | 1.71300 | 53.94 | 0.5442 |
| 11 | 83.6988 | 2.9085 | | | |
| 12 | −35.8560 | 2.4679 | 1.92286 | 20.88 | 0.6390 |
| 13 | −27.1997 | 0.6217 | | | |
| 14 | −27.0761 | 1.5746 | 1.83481 | 42.72 | 0.5647 |
| 15 | −70.8673 | (d15) | | | |
| 16* | 30.0653 | 4.8350 | 1.59271 | 66.97 | 0.5367 |
| 17* | −101.9800 | (d17) | | | |
| 18 | 41.5917 | 4.0604 | 1.49700 | 81.61 | 0.5389 |
| 19 | −114.1310 | 1.2019 | | | |
| 20 (stop) | ∞ | 1.0000 | | | |
| 21 | 159.2466 | 0.9000 | 1.95375 | 32.32 | 0.5901 |
| 22 | 25.9136 | 0.8774 | | | |
| 23 | 34.2602 | 3.6878 | 1.49700 | 81.61 | 0.5389 |
| 24 | −107.8400 | 0.1500 | | | |
| 25 | 170.3157 | 2.8945 | 1.61997 | 63.88 | 0.5426 |
| 26 | −48.2637 | (d26) | | | |
| 27 | 403.5897 | 2.0487 | 2.05090 | 26.94 | 0.6052 |
| 28 | −70.9652 | 0.2034 | | | |
| 29* | −183.0700 | 0.9000 | 1.76802 | 49.24 | 0.5516 |
| 30* | 17.9524 | (d30) | | | |
| 31 | 245.6632 | 0.9000 | 1.77250 | 49.63 | 0.5504 |
| 32 | 24.0758 | 1.7130 | 1.92286 | 20.88 | 0.6390 |
| 33 | 27.8057 | 1.0000 | | | |
| 34 | 26.1342 | 6.0947 | 1.77250 | 49.63 | 0.5504 |
| 35 | −24.5197 | 1.0129 | 1.86966 | 20.02 | 0.6435 |
| 36 | 61.4764 | 4.5104 | | | |
| 37 | 280.6612 | 5.3975 | 1.95906 | 17.47 | 0.6598 |
| 38 | −34.0926 | 0.7340 | | | |
| 39* | −33.1651 | 0.9000 | 1.59201 | 67.02 | 0.5358 |
| 40* | 368.7869 | (BF) | | | |
| Image plane | ∞ | | | | |

[Aspherical surface data]

| | Surface 16 | Surface 17 | Surface 29 | Surface 30 |
|---|---|---|---|---|
| K | 0.0000 | 0.0000 | 0.0000 | 0.0000 |
| A4 | −3.70287E−06 | 1.42522E−05 | −1.76572E−05 | −1.00061E−05 |
| A6 | 9.04389E−09 | 4.26214E−09 | 1.34110E−08 | −3.79049E−08 |
| A8 | −3.88102E−13 | 5.06609E−12 | 5.32156E−11 | 1.68284E−12 |
| A10 | 0.00000E+00 | 0.00000E+00 | 0.00000E+00 | 0.00000E+00 |

-continued

Unit: mm

| | Surface 39 | Surface 40 |
|---|---|---|
| K | 0.0000 | 0.0000 |
| A4 | −2.78280E−05 | −3.40099E−05 |
| A6 | 1.60355E−07 | 1.31472E−07 |
| A8 | −5.11466E−10 | −3.70121E−10 |
| A10 | 0.00000E+00 | 0.00000E+00 |

[Various data]
Zoom ratio 2.56

| | Wide-angle | Center | Telephoto |
|---|---|---|---|
| Focal length | 51.50 | 88.04 | 132.00 |
| F number | 2.92 | 2.92 | 2.92 |
| Whole angle of view 2ω | 31.56 | 18.01 | 12.01 |
| Image height Y | 14.20 | 14.20 | 14.20 |
| Lens full length | 130.00 | 141.02 | 154.13 |

[Variable distance data]

| | Wide-angle | Center | Telephoto |
|---|---|---|---|
| d0 | ∞ | ∞ | ∞ |
| d5 | 1.3000 | 27.3382 | 46.7040 |
| d15 | 21.0911 | 7.0107 | 1.0000 |
| d17 | 2.5443 | 1.6015 | 1.3583 |
| d26 | 3.8978 | 5.2254 | 1.8284 |
| d30 | 8.5482 | 7.2206 | 10.6176 |
| BF | 17.4008 | 17.4008 | 17.4008 |
| d0 | 2129.9983 | 3446.8854 | 5194.3676 |
| d5 | 1.3000 | 27.3382 | 46.7040 |
| d15 | 21.0911 | 7.0107 | 1.0000 |
| d17 | 2.5443 | 1.6015 | 1.3583 |
| d26 | 4.2348 | 5.8633 | 2.6752 |
| d30 | 8.2113 | 6.5828 | 9.7708 |
| BF | 17.4008 | 17.4008 | 17.4008 |

[Lens group data]

| Group | Initial surface | Focal length |
|---|---|---|
| G1 | 1 | 113.28 |
| G2 | 6 | −32.59 |
| G3 | 16 | 39.72 |
| G4 | 18 | 48.25 |
| G5 | 27 | −34.45 |
| G6 | 31 | 606.42 |

Example 2

Figure 17:
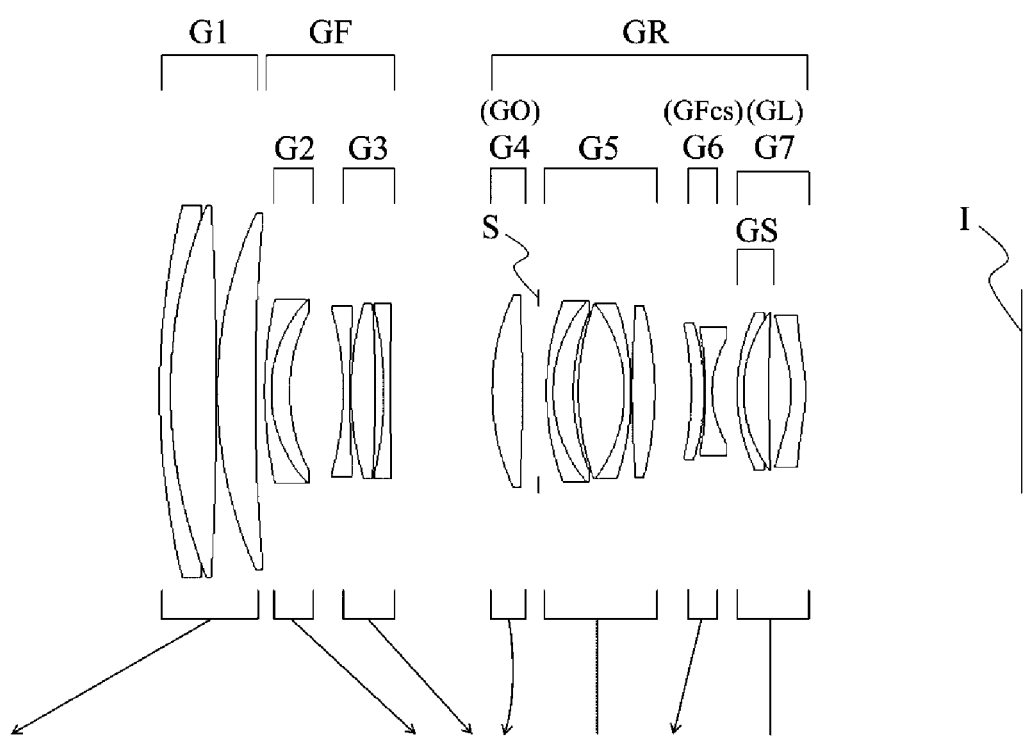
FIG. 17 is a lens block view at the infinite photographing distance at the wide-angle end in accordance with Example 2 of an imaging optical system of the present invention.
Figure 18:
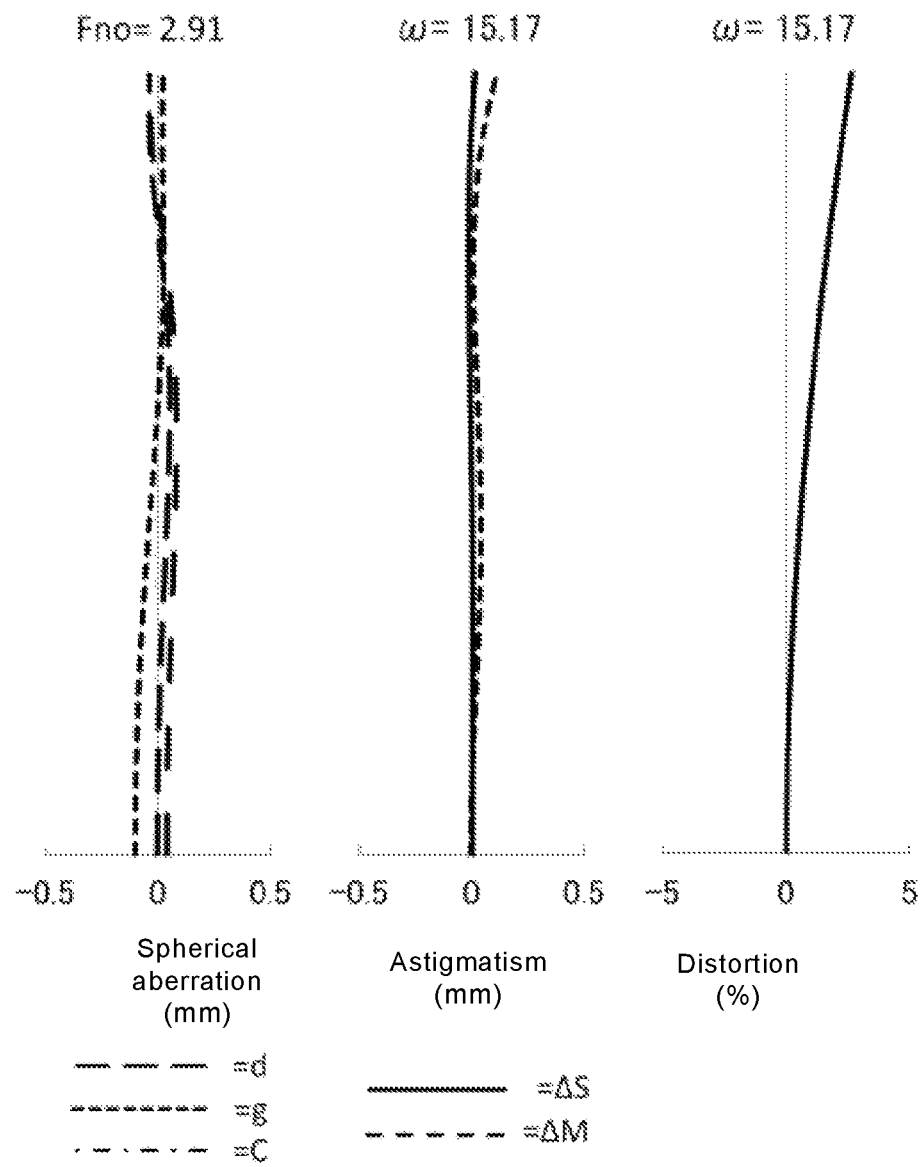
FIG. 18 is a longitudinal aberration diagram at the infinite photographing distance at the wide-angle end of the imaging optical system of Example 2.
Figure 19:
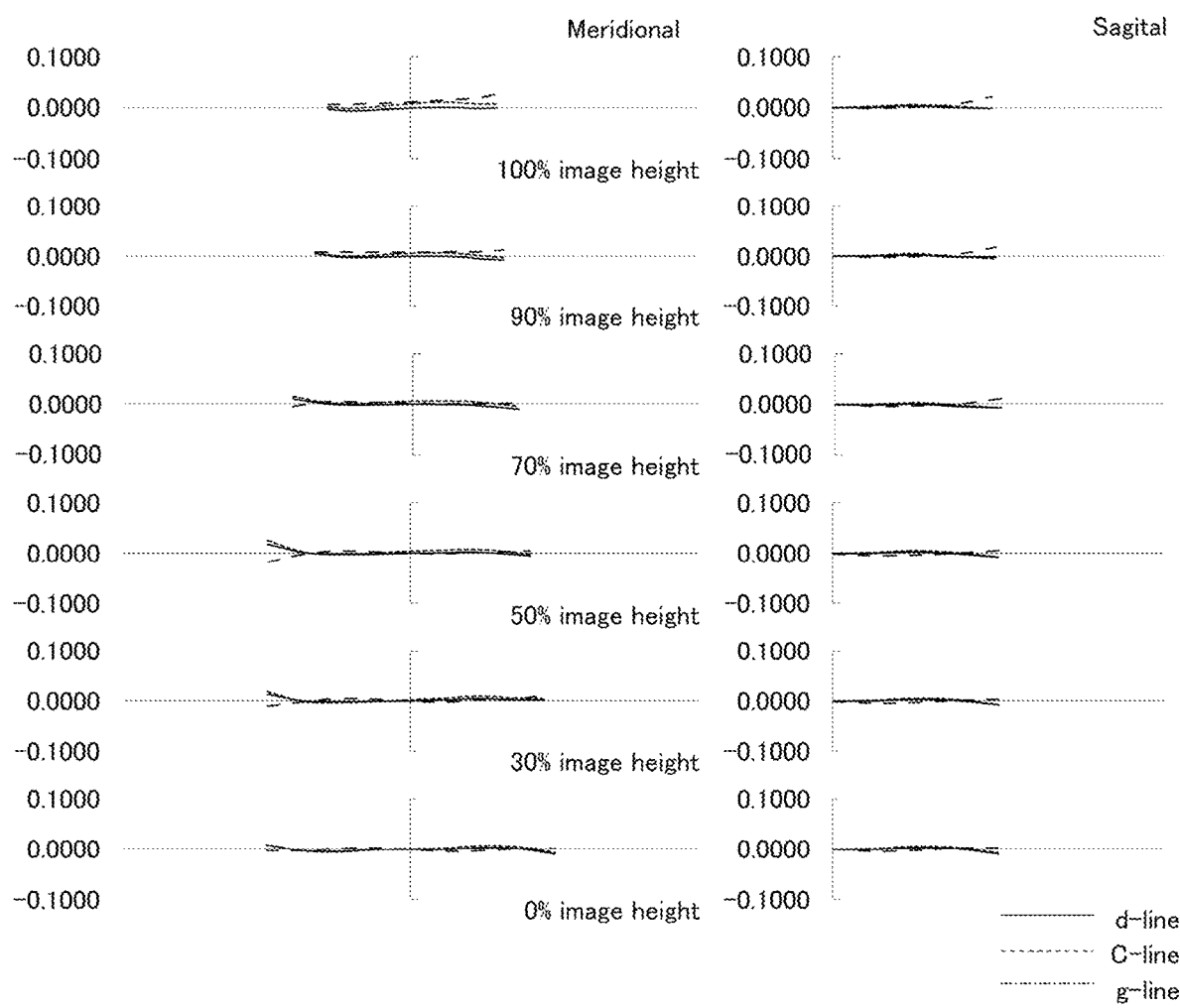
FIG. 19 is a lateral aberration diagram at the infinite photographing distance at the wide-angle end of the imaging optical system of Example 2.
Figure 20:
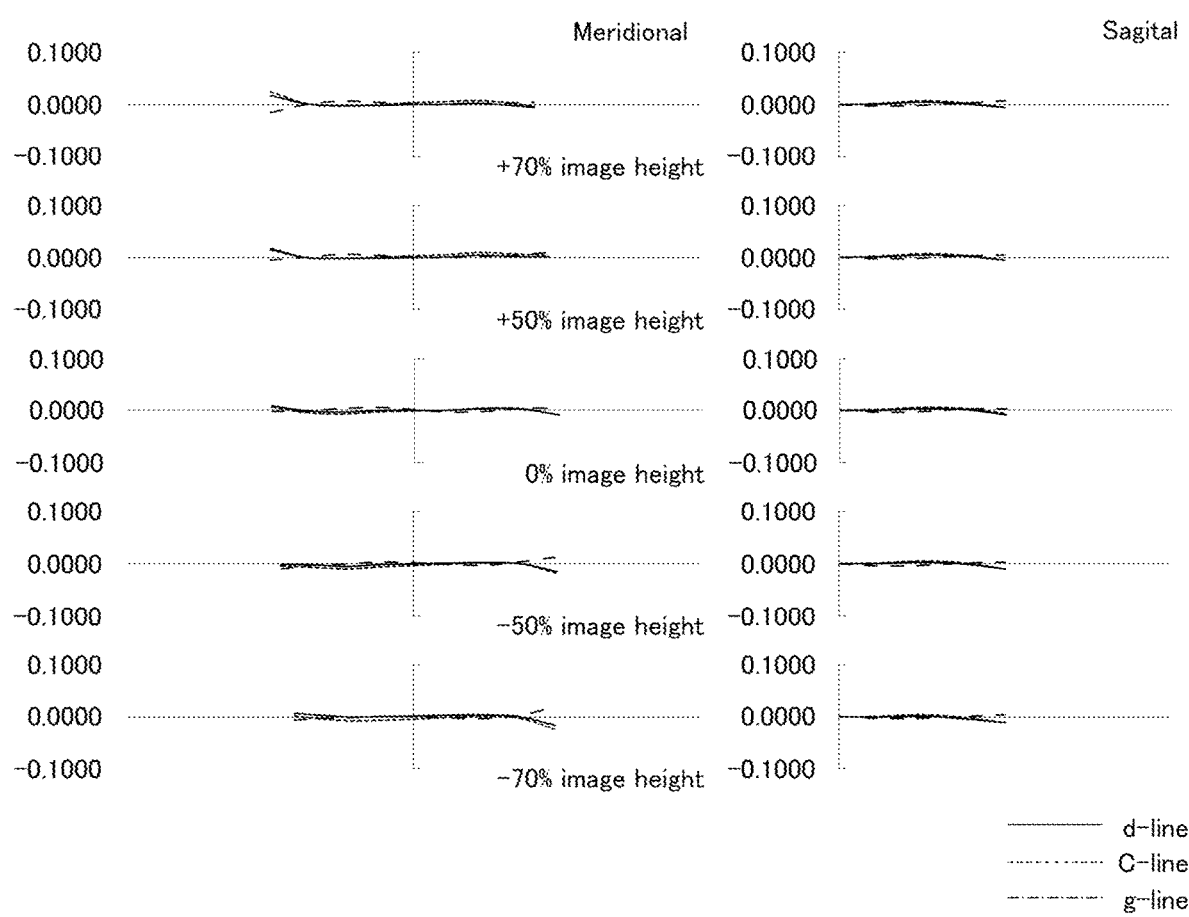
FIG. 20 is a lateral aberration diagram at the time of 0.3° vibration reduction at the infinite photographing distance at the wide-angle end of the imaging optical system of Example 2.
Figure 21:
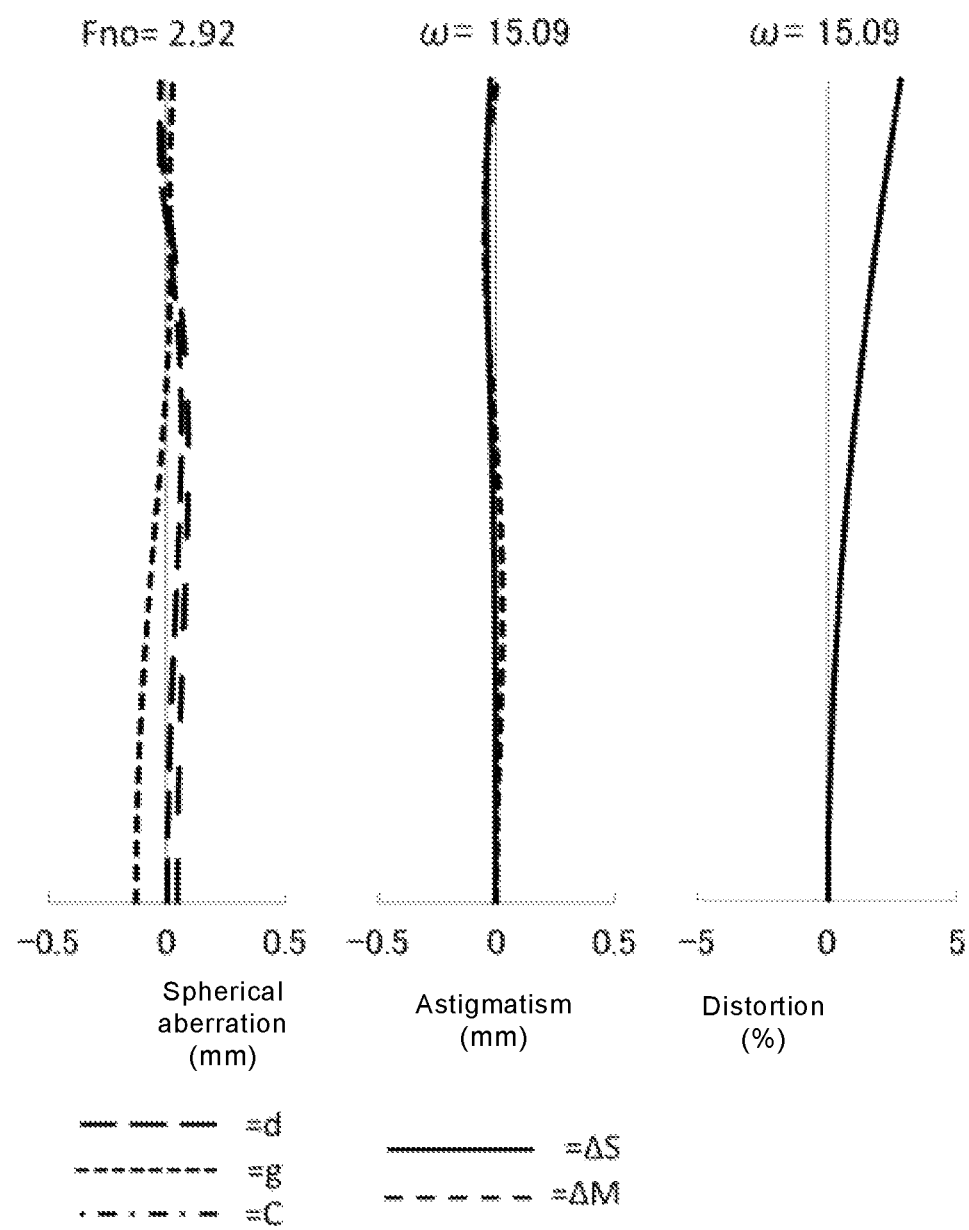
FIG. 21 is a longitudinal aberration diagram at an object distance of 2142 mm at the wide-angle end of the imaging optical system of Example 2.
Figure 22:
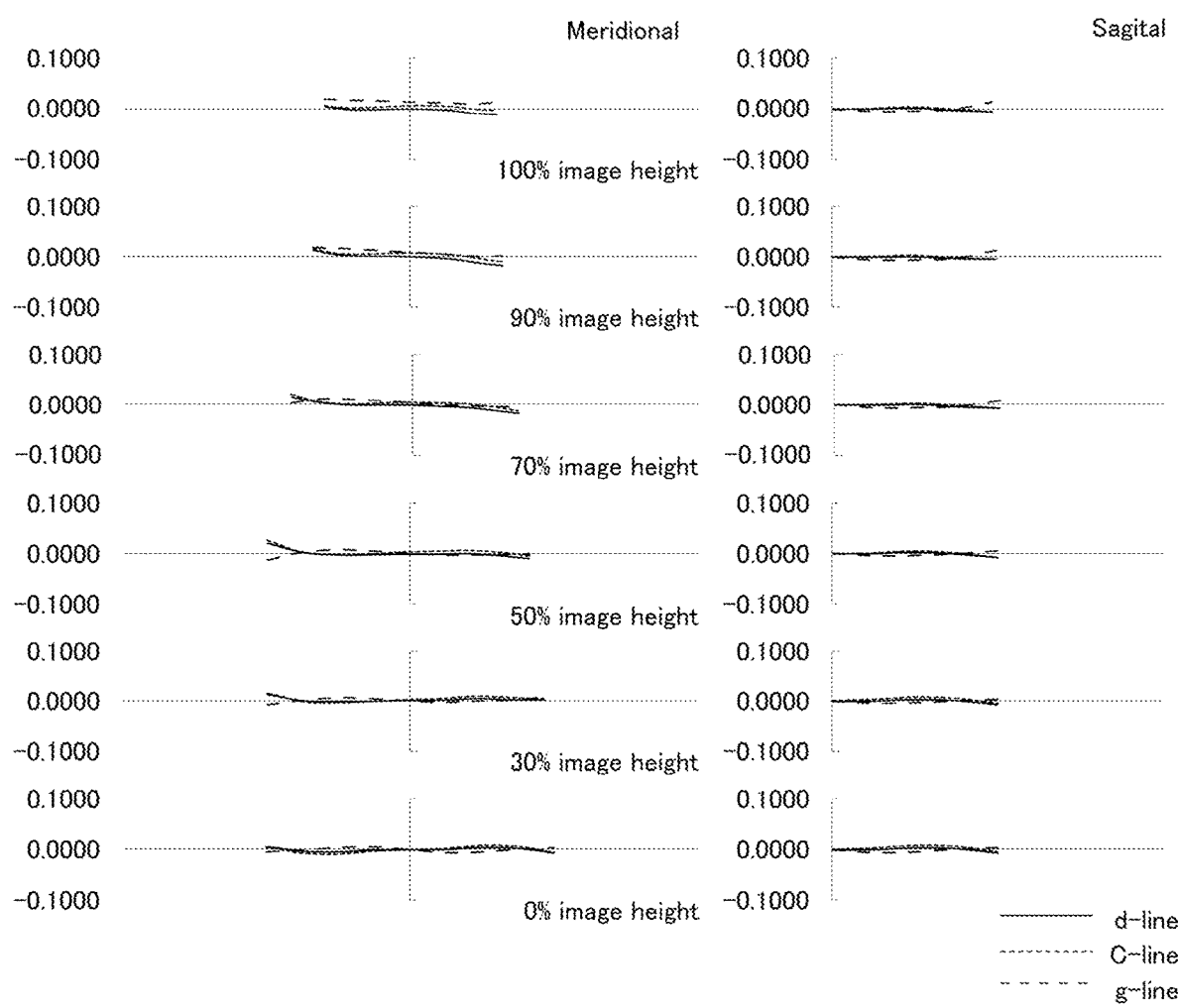
FIG. 22 is a lateral aberration diagram at an object distance of 2142 mm at the wide-angle end of the imaging optical system of Example 2.
Figure 23:
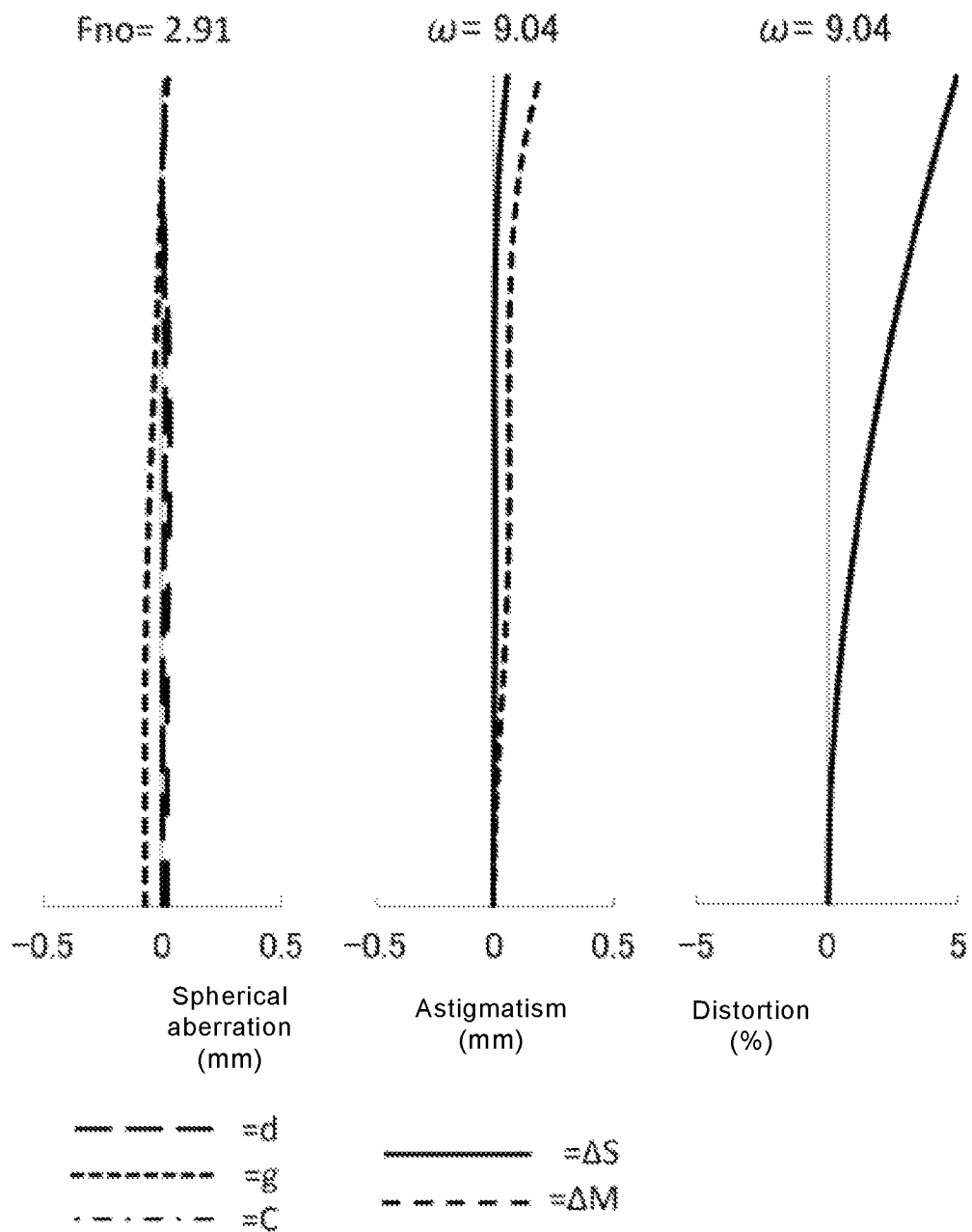
FIG. 23 is a longitudinal aberration diagram at the infinite photographing distance at the zoom center of the imaging optical system of Example 2.
Figure 24:
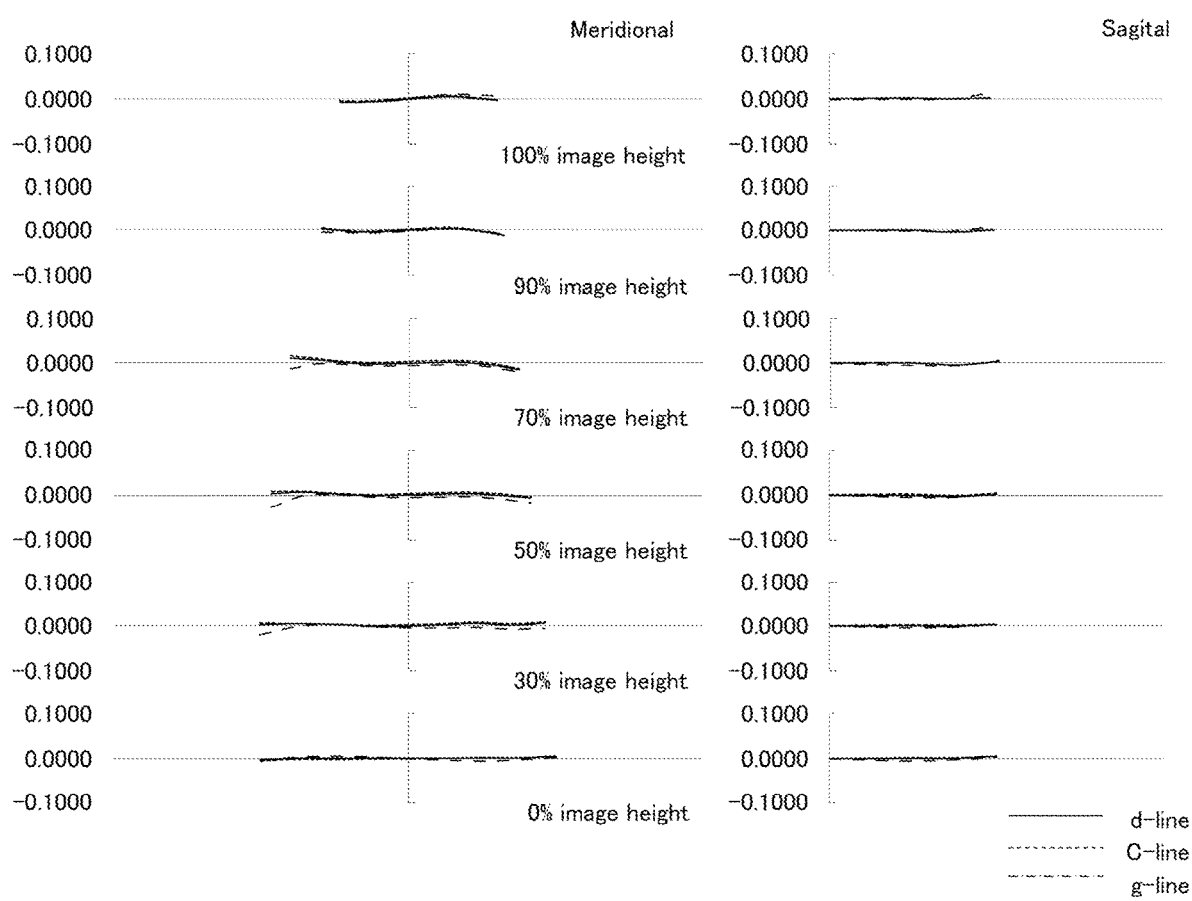
FIG. 24 is a lateral aberration diagram at the infinite photographing distance at the zoom center of the imaging optical system of Example 2.
Figure 25:
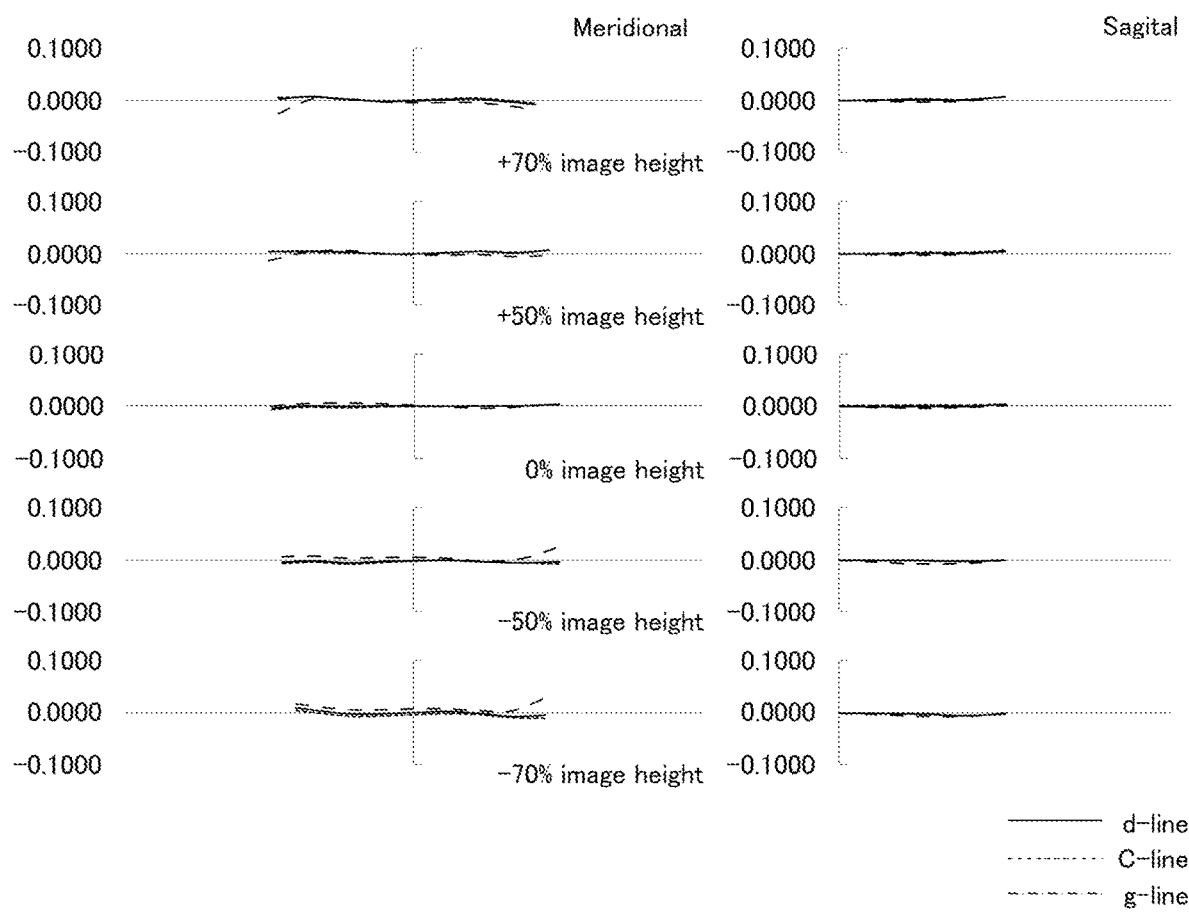
FIG. 25 is a lateral aberration diagram at the time of 0.3° vibration reduction at the infinite photographing distance at the zoom center of the imaging optical system of Example 2.
Figure 26:
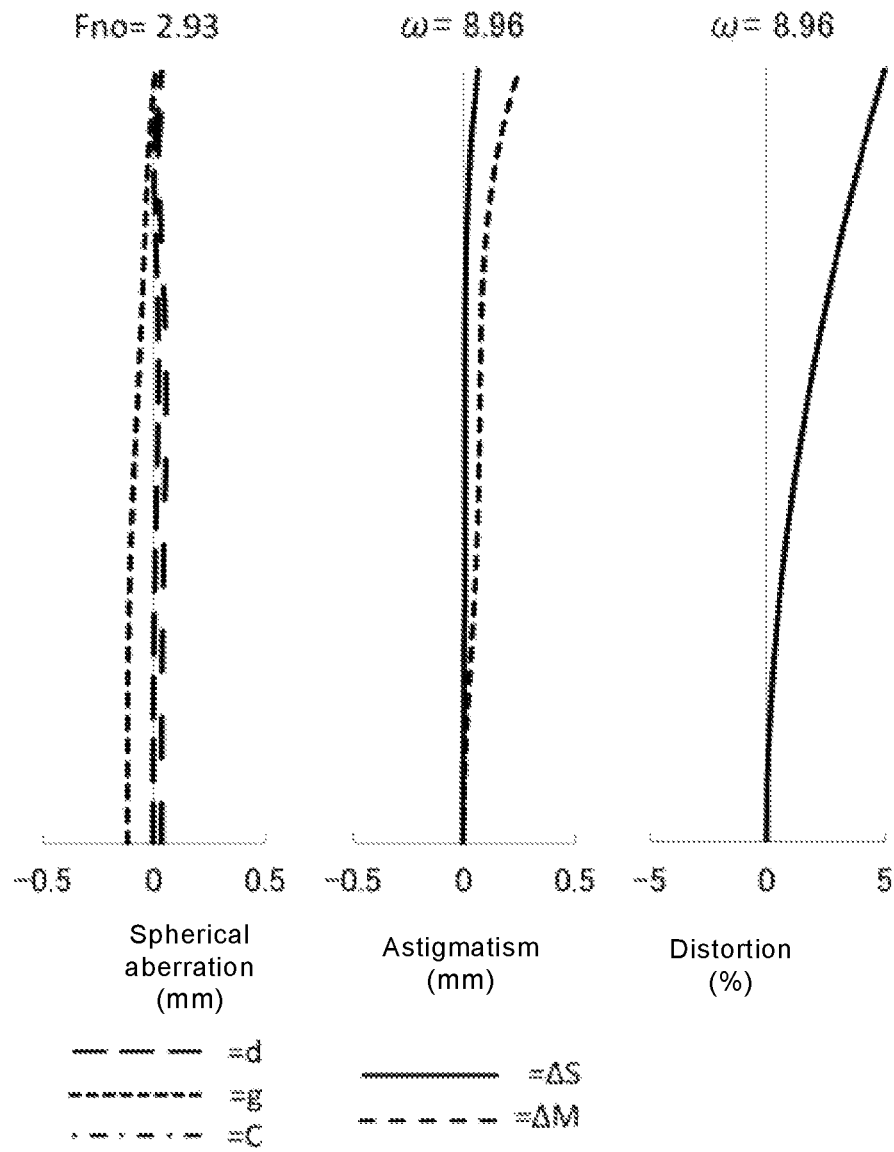
FIG. 26 is a longitudinal aberration diagram at an object distance of 3460 mm at the zoom center of the imaging optical system of Example 2.
Figure 27:
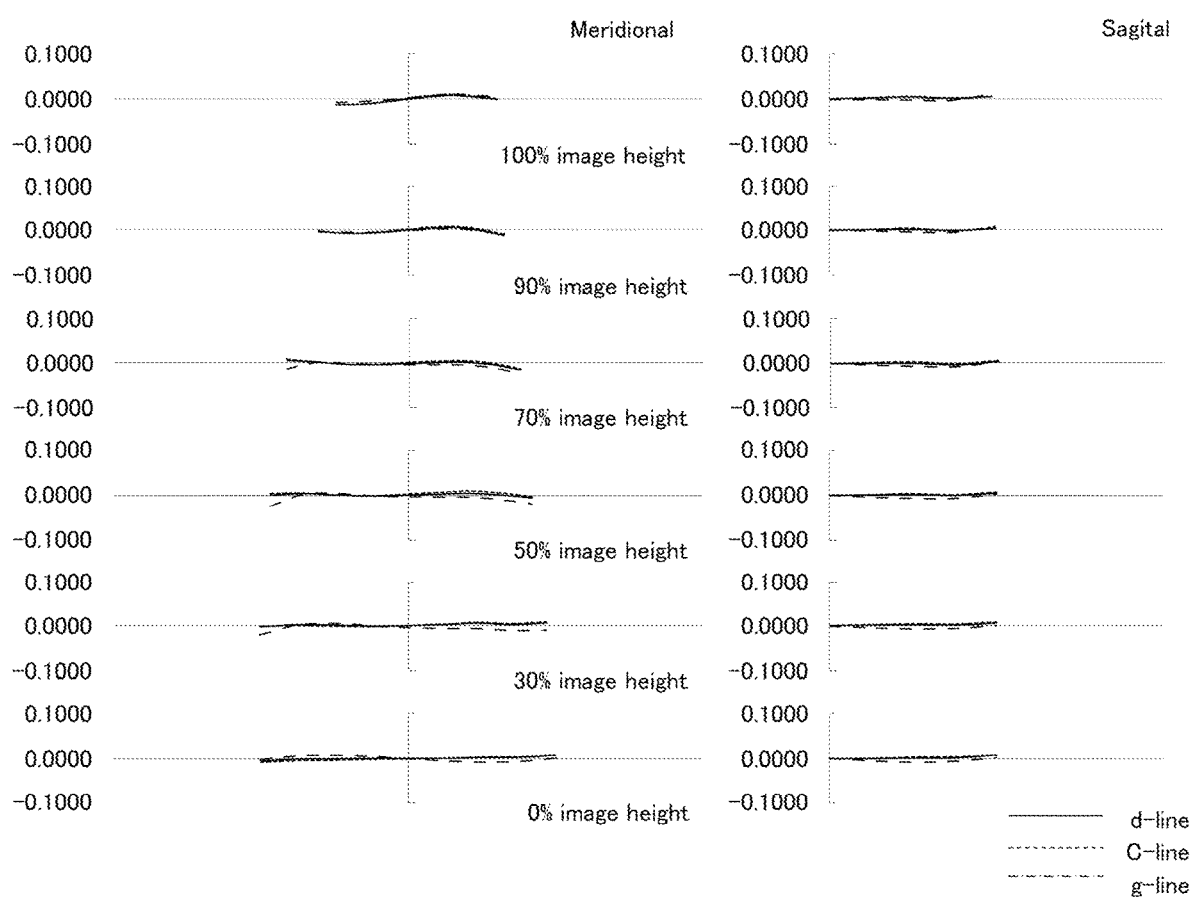
FIG. 27 is a lateral aberration diagram at an object distance of 3460 mm at the zoom center of the imaging optical system of Example 2.
Figure 28:
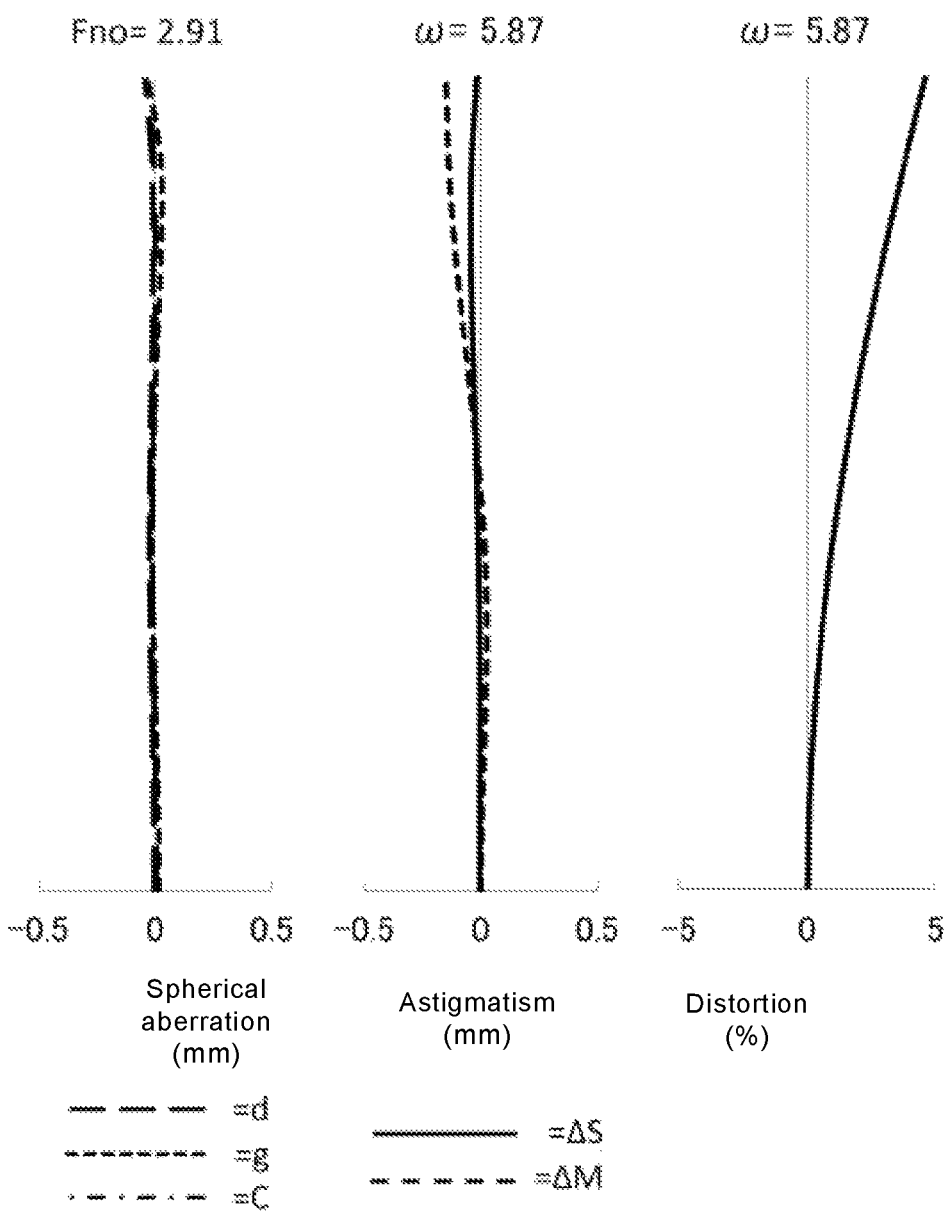
FIG. 28 is a longitudinal aberration diagram at the infinite photographing distance at the telephoto end of the imaging optical system of Example 2.
Figure 29:
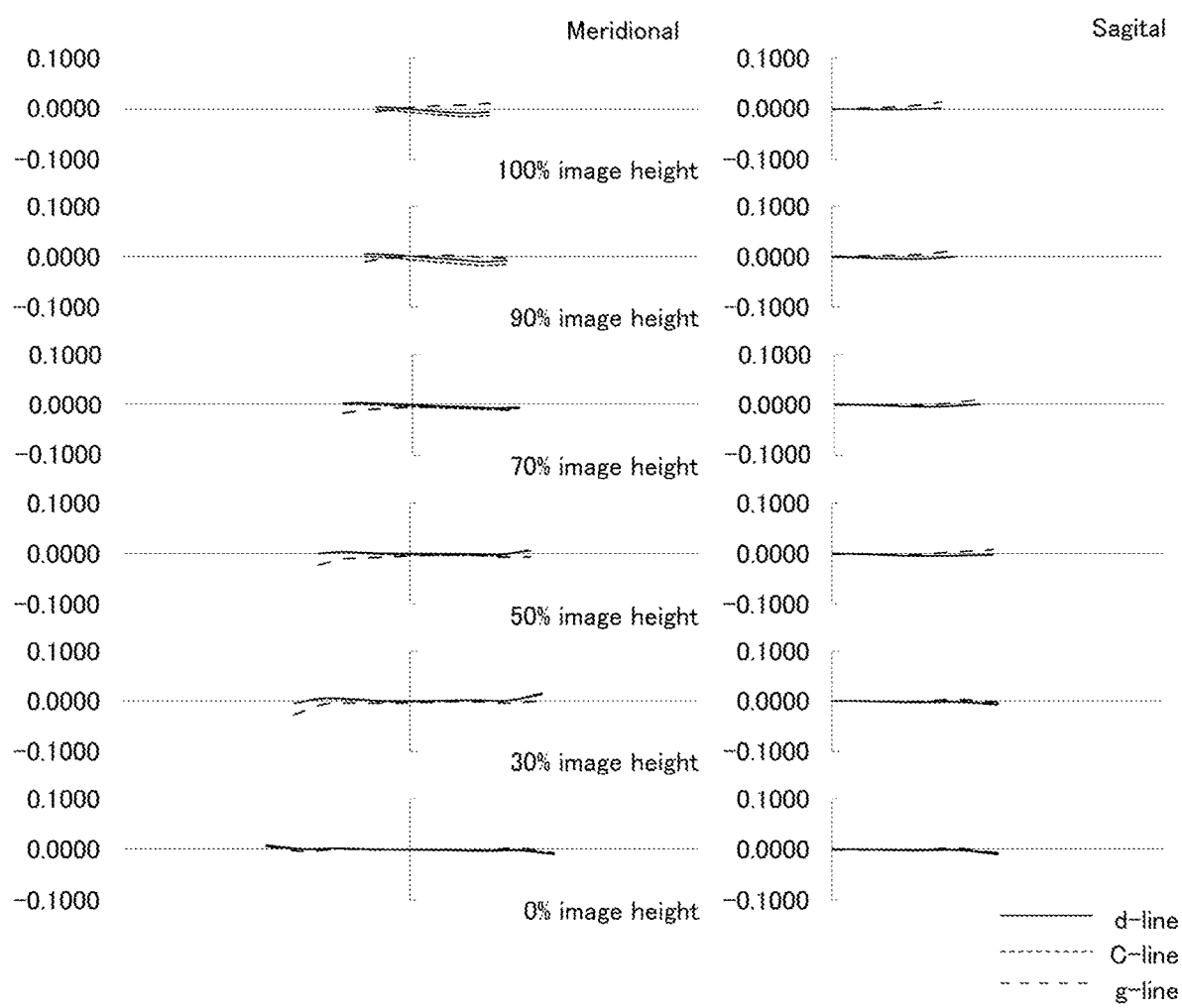
FIG. 29 is a lateral aberration diagram at the infinite photographing distance at the telephoto end of the imaging optical system of Example 2.
Figure 30:
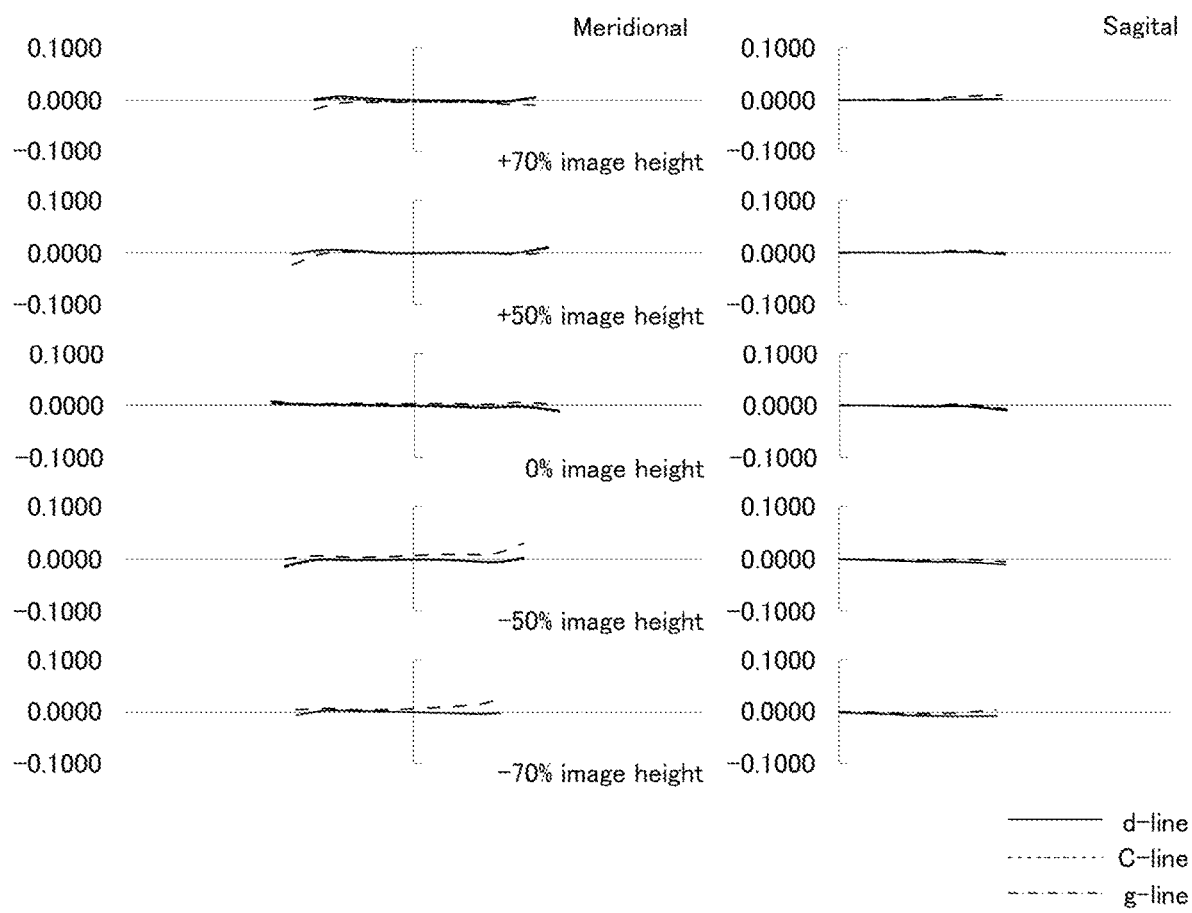
FIG. 30 is a lateral aberration diagram at the time of 0.3° vibration reduction system of Example 2.
Figure 31:
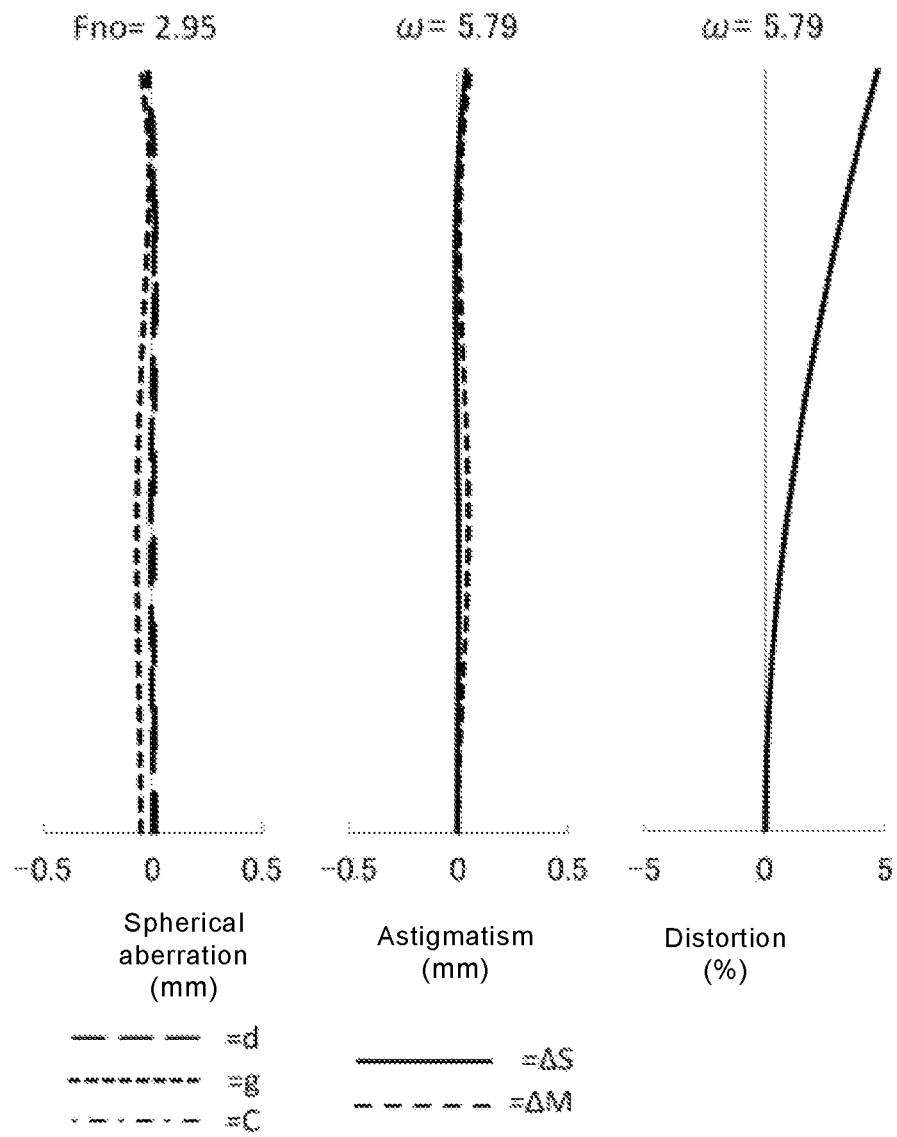
FIG. 31 is a longitudinal aberration diagram at an object distance of 5325 mm at the telephoto end of the imaging optical system of Example 2.
Figure 32:
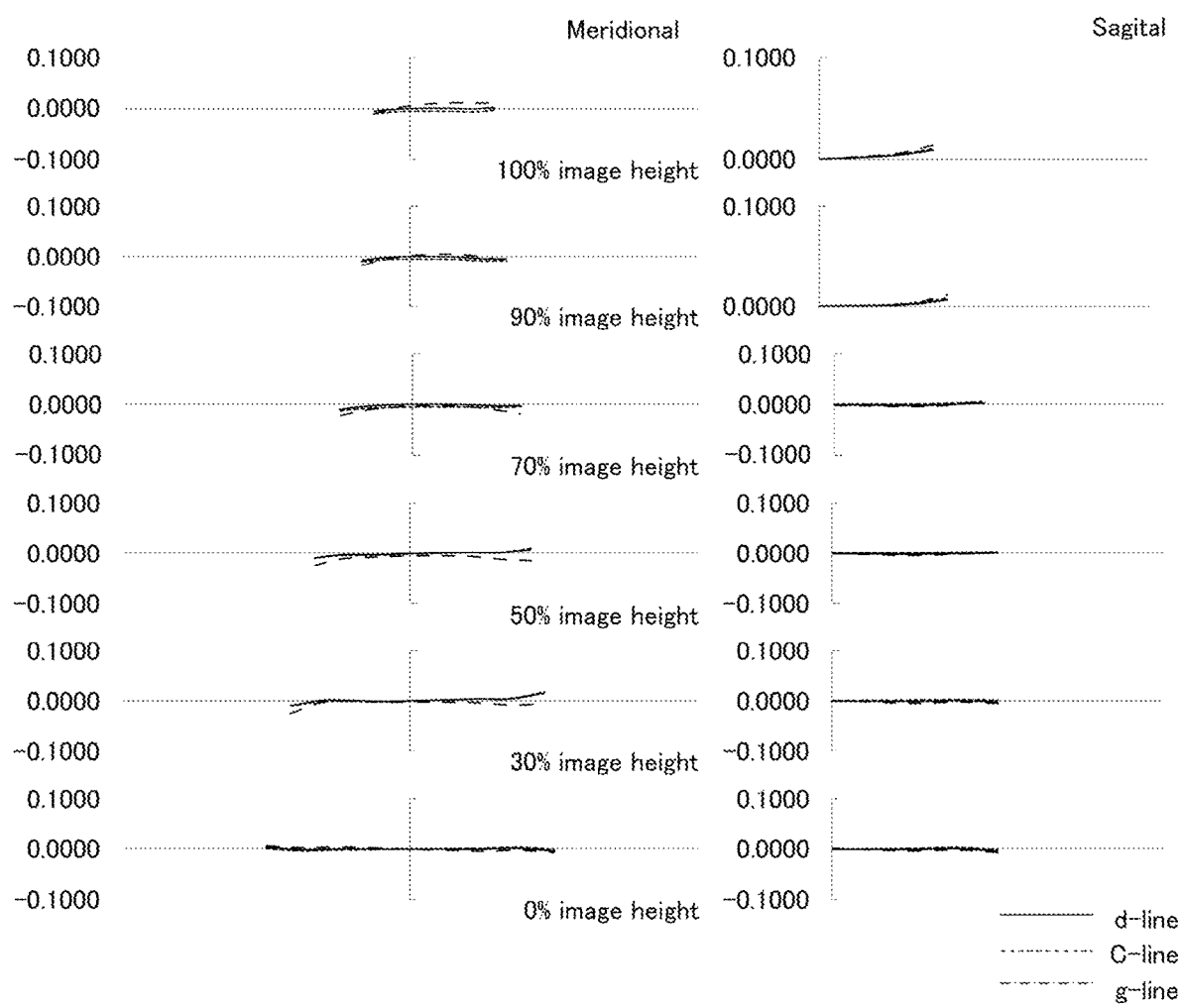
FIG. 32 is a lateral aberration diagram at an object distance of 5325 mm at the telephoto end of the imaging optical system of Example 2.

FIG. 17 is a lens block view of an imaging optical system of Example 2 of the present invention.

The imaging optical system of Example 2 includes a first lens group G1 having a positive refractive power, a second lens group G2 having a negative refractive power, a third lens group G3 having a negative refractive power, a fourth lens group G4 having a positive refractive power, an aperture stop S, a fifth lens group G5 having a positive refractive power, a sixth lens group G6 having a negative refractive power, and a seventh lens group G7 having a positive refractive power. For zooming from the wide-angle end to the telephoto end, the distance between the first lens group G1 and the second lens group G2 increases, the distance between the second lens group G2 and the third lens group G3 decreases, the distance between the third lens group G3 and the fourth lens group G4 decreases, the distance between the fourth lens group G4 and the fifth lens group G5 is changed, the distance between the fifth lens group G5 and the sixth lens group G6 decreases, the distance between the sixth lens group G6 and the seventh lens group G7 increases, the first lens group G1 monotonously moves to the object side, and the fifth lens group G5 and the seventh lens group G7 are fixed with respect to the image plane I.

The front lens group GF corresponds to the second lens group G2 and the third lens group G3, the rear lens group GR corresponds to the fourth lens group G4, the fifth lens group G5, the sixth lens group G6, and the seventh lens group G7. The object side lens group GO corresponds to the fourth lens group G4, and the final lens group GL corresponds to the seventh lens group G7.

The sixth lens group G6 is a focusing lens group GFcs, and moves along the optical axis for focusing from the infinite distance object to the close distance object.

The first lens group G1 includes a cemented lens of a negative meniscus lens L1 with the convex surface pointing to the object side and a double convex lens L2, and a positive meniscus lens L3 with the convex surface pointing to the object side.

The second lens group G2 includes a cemented lens of a negative meniscus lens L4 with the convex surface pointing to the object side and a positive meniscus lens L5 with the convex surface pointing to the object side.

The third lens group G3 includes a double concave lens L6, a double convex lens L7, and a double concave lens L8.

The fourth lens group G4 includes a double convex lens L9 with both the R1 surface and the R2 surface being aspherical surfaces.

The fifth lens group G5 includes a cemented lens of a negative meniscus lens L10 with the convex surface pointing to the object side and a positive meniscus lens L11 with the convex surface pointing to the object side, a cemented lens of a double convex lens L12 and a negative meniscus lens L13 with the convex surface pointing to the image plane side, and a double convex lens L14.

The sixth lens group G6 includes a positive meniscus lens L15 with the convex surface pointing to the image plane side, and a double concave lens L16 with both the R1 surface and the R2 surface being aspherical surfaces.

The seventh lens group G7 includes a cemented lens of a negative meniscus lens L17 with the convex surface pointing to the object side and a positive meniscus lens L18 with the convex surface pointing to the object side, and a negative meniscus lens L19 with the convex surface pointing to the image plane side, and with the R1 surface and the R2 surface being aspherical surfaces. The cemented lens of L17 and L18 belongs to the vibration reduction lens group G S and moves including a perpendicular component at the optical axis for vibration reduction.

Below, the specification values of an optical system in accordance with Example 2 will be shown.

Numerical Value Example 2

| Unit: mm | | | | | |
|---|---|---|---|---|---|
| [Surface data] | | | | | |
| Surface number | r | d | nd | νd | PgF |
| Object surface | ∞ | (d0) | | | |
| 1 | 101.9606 | 1.5000 | 1.78880 | 28.43 | 0.6009 |
| 2 | 66.0186 | 6.3941 | 1.49700 | 81.61 | 0.5389 |
| 3 | −462.6850 | 0.1500 | | | |
| 4 | 57.1433 | 5.2783 | 1.43700 | 95.10 | 0.5336 |
| 5 | 274.8881 | (d5) | | | |
| 6 | 55.0778 | 0.9000 | 1.87070 | 40.73 | 0.5682 |
| 7 | 17.8699 | 2.5917 | 1.67300 | 38.26 | 0.5757 |
| 8 | 23.1108 | (d8) | | | |
| 9 | −38.2877 | 0.9000 | 1.55032 | 75.50 | 0.5401 |
| 10 | 181.8696 | 0.1500 | | | |
| 11 | 39.5096 | 3.4083 | 1.92286 | 20.88 | 0.6390 |
| 12 | −156.0450 | 1.2173 | | | |
| 13 | −45.7125 | 0.9000 | 1.91082 | 35.25 | 0.5822 |
| 14 | 560.6244 | (d14) | | | |
| 15* | 31.0289 | 4.3028 | 1.61881 | 63.85 | 0.5417 |
| 16* | −102.0810 | (d16) | | | |
| 17 (stop) | ∞ | 1.0000 | | | |
| 18 | 34.2989 | 0.9000 | 1.92119 | 23.96 | 0.6202 |
| 19 | 18.4243 | 2.8303 | 1.49700 | 81.61 | 0.5389 |
| 20 | 27.5000 | 0.7203 | | | |
| 21 | 33.8891 | 6.4167 | 1.49700 | 81.61 | 0.5389 |
| 22 | −19.1838 | 0.9000 | 1.92286 | 20.88 | 0.6390 |
| 23 | −36.1468 | 0.1500 | | | |
| 24 | 154.2758 | 3.1400 | 1.92286 | 20.88 | 0.6390 |
| 25 | −44.5275 | (d25) | | | |
| 26 | −41.1448 | 1.8158 | 1.92286 | 20.88 | 0.6390 |
| 27 | −29.4968 | 0.1500 | | | |
| 28* | −55.4120 | 0.9391 | 1.61881 | 63.85 | 0.5417 |
| 29* | 12.6232 | (d29) | | | |
| 30 | 24.5124 | 0.8500 | 1.92286 | 20.88 | 0.6390 |
| 31 | 17.4778 | 3.5164 | 1.77250 | 49.63 | 0.5504 |
| 32 | 222.0324 | 3.1493 | | | |
| 33* | −13.5181 | 2.0064 | 1.49710 | 81.56 | 0.5385 |
| 34* | −19.4535 | (BF) | | | |
| Image plane | ∞ | | | | |

| [Aspherical surface data] | | | | |
|---|---|---|---|---|
| | Surface 15 | Surface 16 | Surface 28 | Surface 29 |
| K | 0.0000 | 0.0000 | 0.0000 | 0.0000 |
| A4 | 1.94080E−06 | 1.98221E−05 | −3.79758E−05 | −7.26383E−05 |
| A6 | 1.54463E−08 | −6.19918E−09 | 1.58714E−07 | −1.22650E−07 |
| A8 | −7.12289E−11 | −5.80620E−11 | −6.67702E−10 | −1.80017E−09 |
| A10 | 0.00000E+00 | 0.00000E+00 | 0.00000E+00 | 0.00000E+00 |

| | Surface 33 | Surface 34 |
|---|---|---|
| K | 0.0000 | 0.0000 |
| A4 | 3.08634E−04 | 2.47981E−04 |
| A6 | −1.46504E−06 | −1.18744E−06 |
| A8 | 5.78815E−09 | 3.32949E−09 |
| A10 | 0.00000E+00 | 0.00000E+00 |

-continued

Unit: mm

[Various data]
Zoom ratio 2.59

|  | Wide-angle | Center | Telephoto |
|---|---|---|---|
| Focal length | 51.00 | 84.98 | 132.00 |
| F number | 2.91 | 2.91 | 2.91 |
| Whole angle of view 2ω | 30.33 | 18.08 | 11.74 |
| Image height Y | 14.20 | 14.20 | 14.20 |
| Lens full length | 120.00 | 137.13 | 145.00 |

[Variable distance data]

|  | Wide-angle | Center | Telephoto |
|---|---|---|---|
| d0 | ∞ | ∞ | ∞ |
| d5 | 1.3000 | 26.4143 | 41.9795 |
| d8 | 7.4491 | 6.3225 | 4.9644 |
| d14 | 14.1504 | 8.0511 | 1.0000 |
| d16 | 2.2547 | 1.5000 | 2.2103 |
| d25 | 5.0932 | 4.1731 | 1.6537 |
| d29 | 3.4991 | 4.4192 | 6.9386 |
| BF | 30.0768 | 30.0768 | 30.0768 |
| d0 | 2021.6393 | 3323.1259 | 5180.2512 |
| d5 | 1.3000 | 26.4143 | 41.9795 |
| d8 | 7.4491 | 6.3225 | 4.9644 |
| d14 | 14.1504 | 8.0511 | 1.0000 |
| d16 | 2.2547 | 1.5000 | 2.2103 |
| d25 | 5.3163 | 4.5420 | 2.2052 |
| d29 | 3.2760 | 4.0503 | 6.3871 |
| BF | 30.0768 | 30.0768 | 30.0768 |

[Lens group data]

| Group | Initial surface | Focal length |
|---|---|---|
| G1 | 1 | 96.21 |
| G2 | 6 | −41.93 |
| G3 | 9 | −109.48 |
| G4 | 15 | 38.94 |
| G5 | 17 | 32.60 |
| G6 | 26 | −19.26 |
| G7 | 30 | 59.96 |

Example 3

Figure 33:
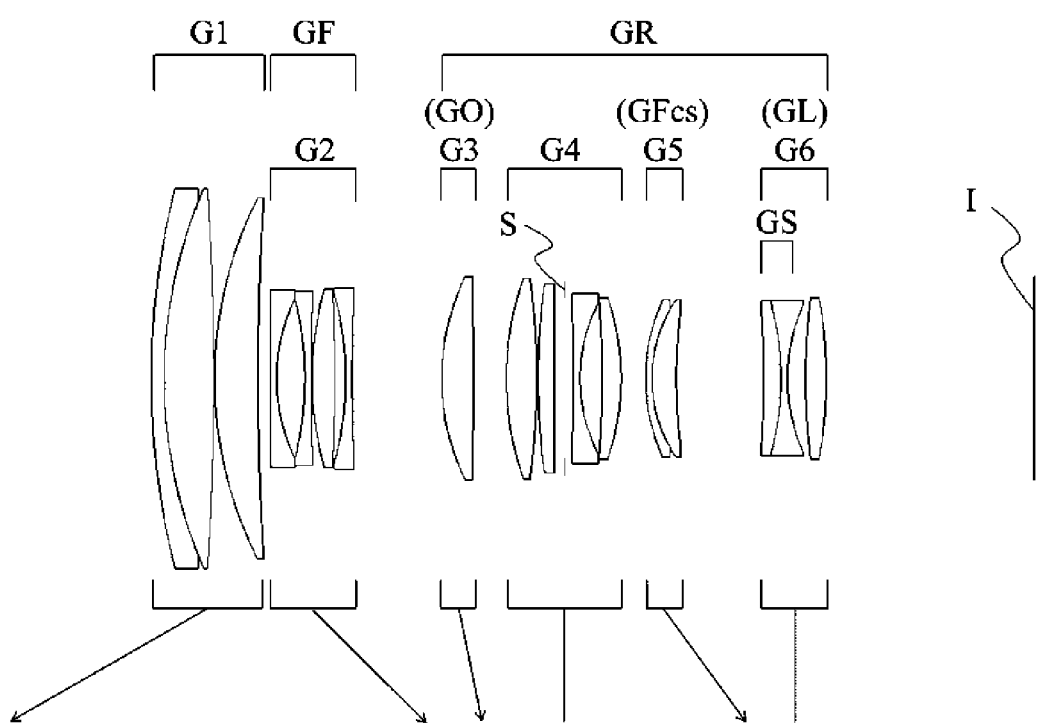
FIG. 33 is a lens block view at the infinite photographing distance at the wide-angle end in accordance with Example 3 of an imaging optical system of the present invention.
Figure 34:
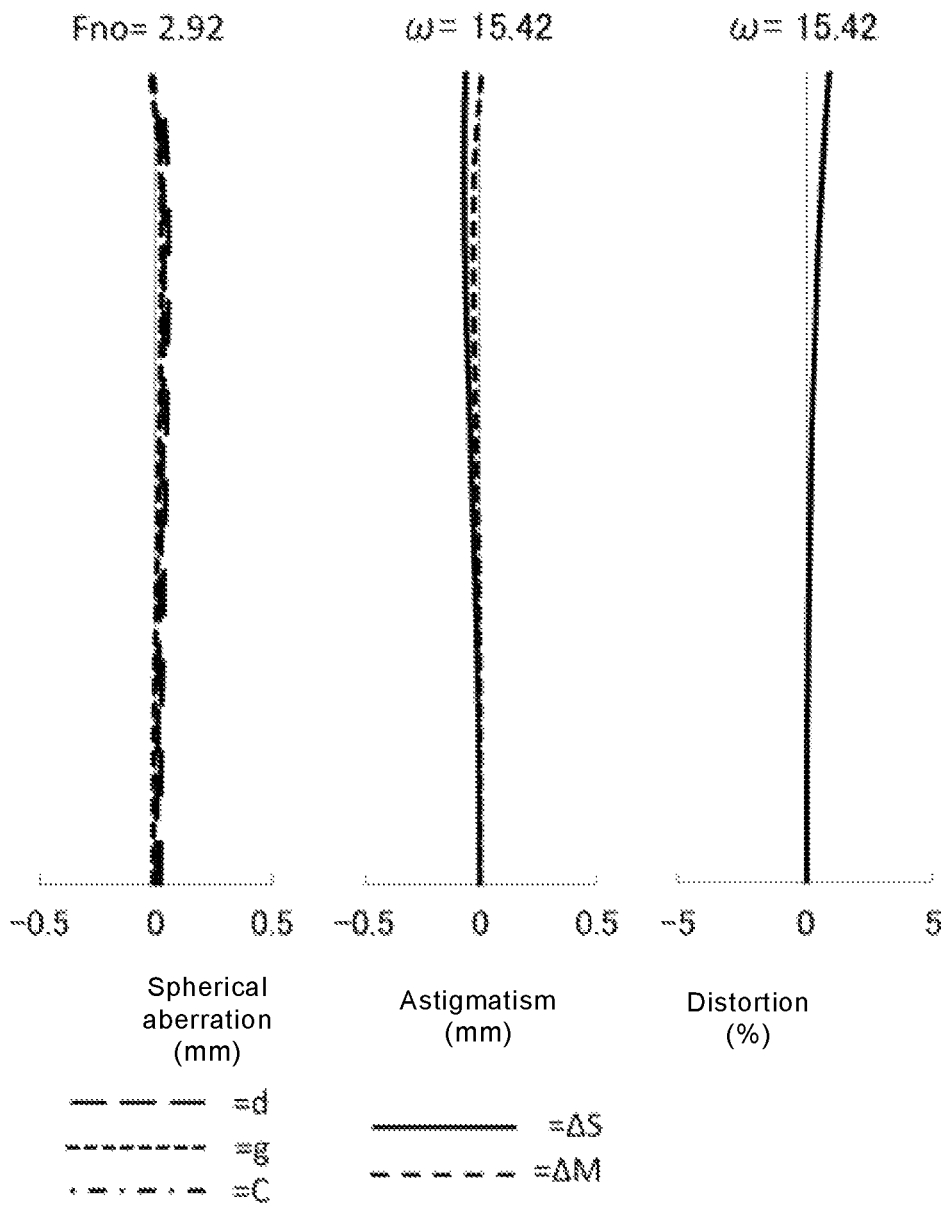
FIG. 34 is a longitudinal aberration diagram at the infinite photographing distance at the wide-angle end of the imaging optical system of Example 3.
Figure 35:
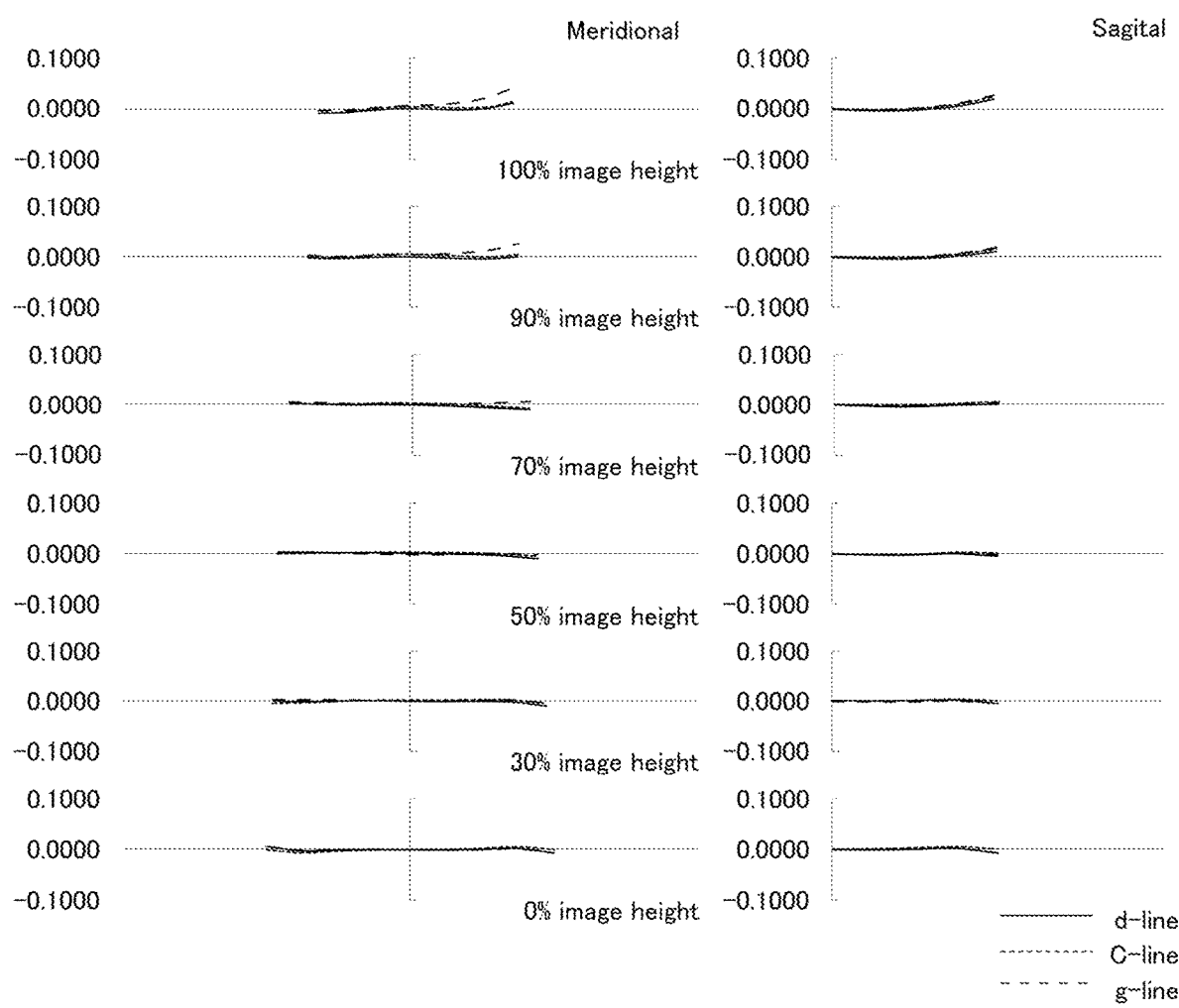
FIG. 35 is a lateral aberration diagram at the infinite photographing distance at the wide-angle end of the imaging optical system of Example 3.
Figure 36:
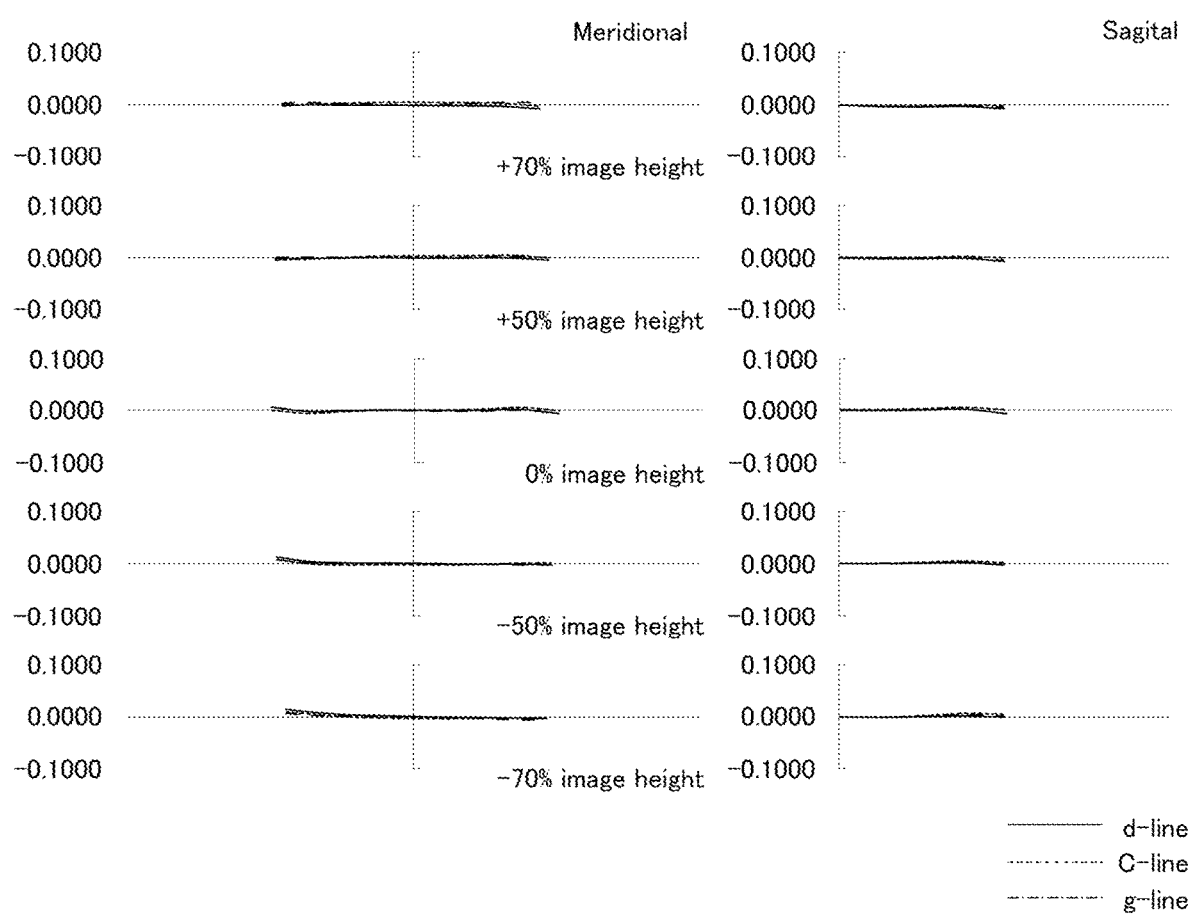
FIG. 36 is a lateral aberration diagram at the time of 0.3° vibration reduction at the infinite photographing distance at the wide-angle end of the imaging optical system of Example 3.
Figure 37:
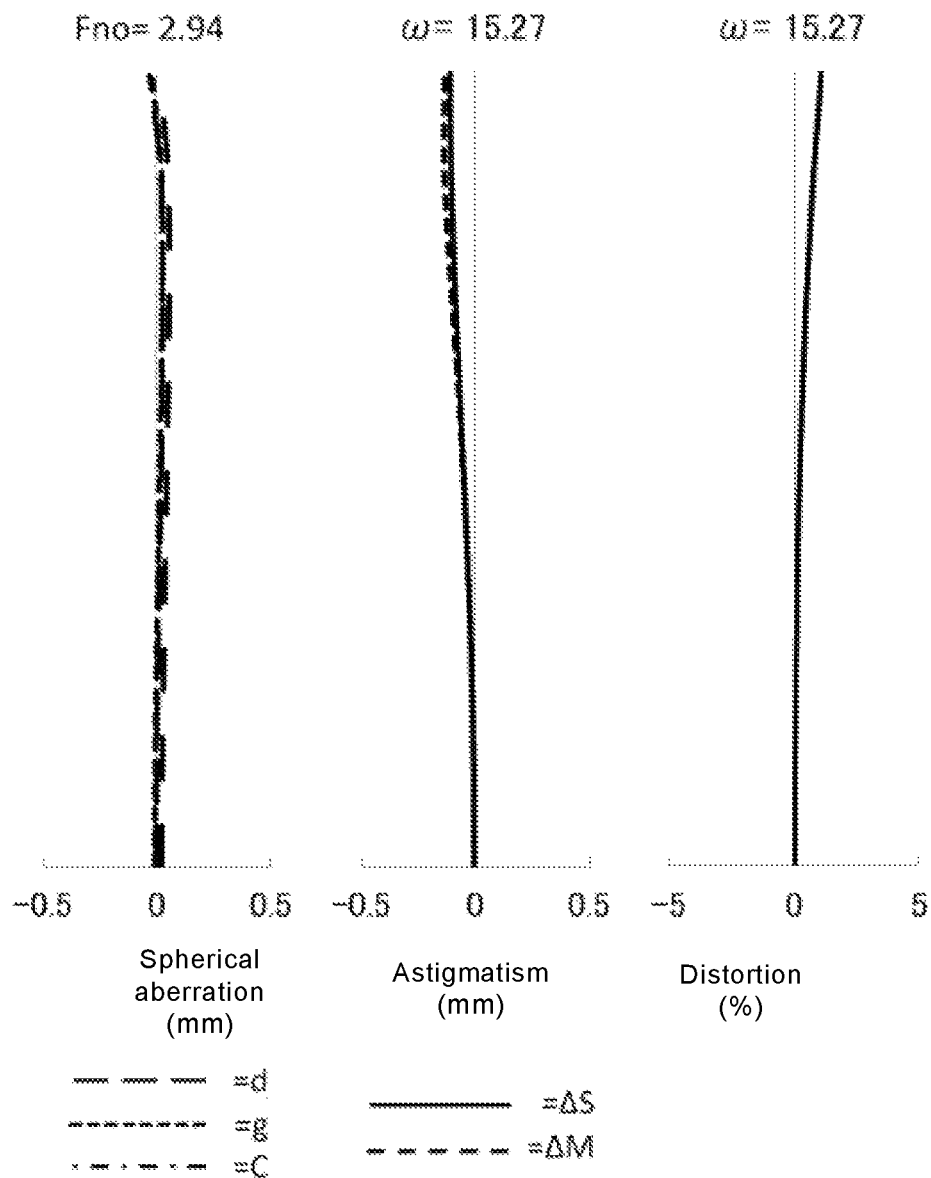
FIG. 37 is a longitudinal aberration diagram at an object distance of 2209 mm at the wide-angle end of the imaging optical system of Example 3.
Figure 38:
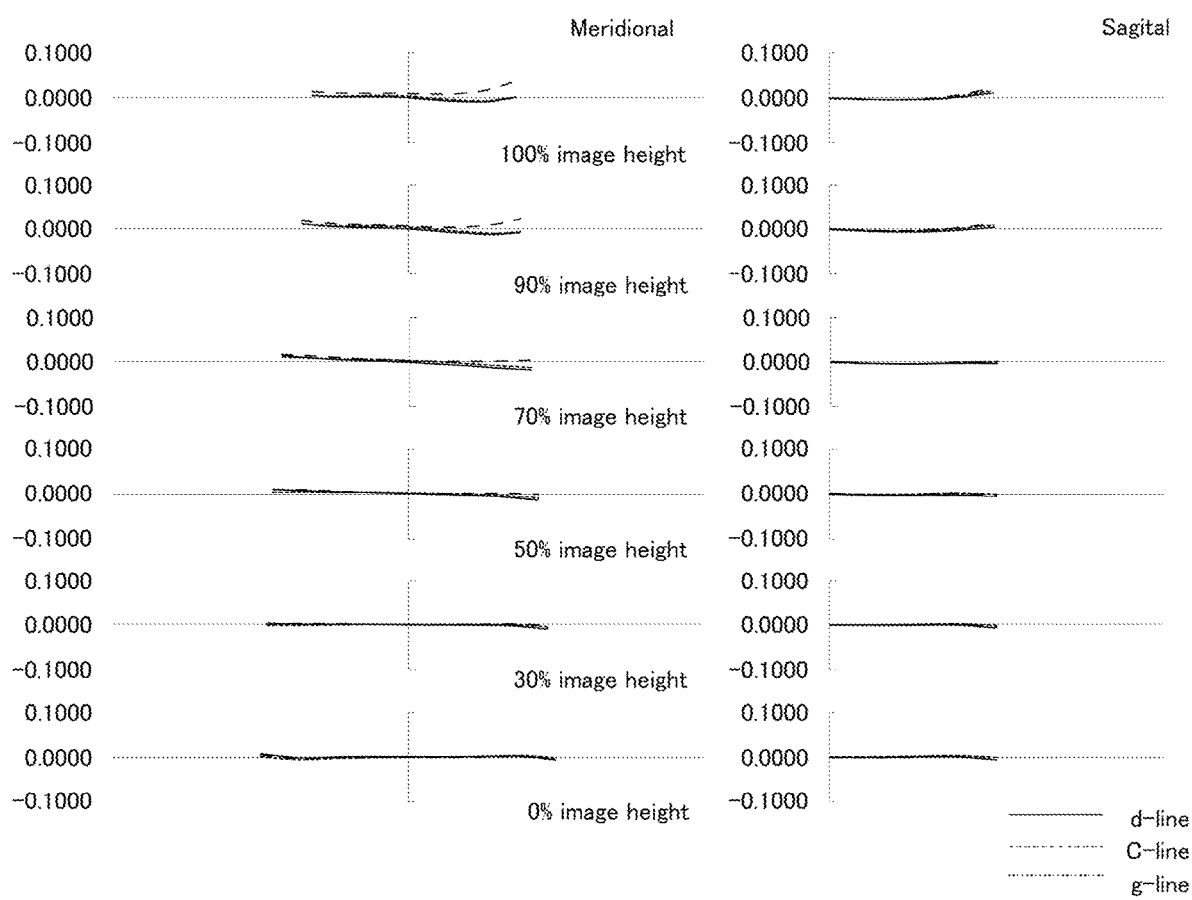
FIG. 38 is a lateral aberration diagram at an object distance of 2209 mm at the wide-angle end of the imaging optical system of Example 3.
Figure 39:
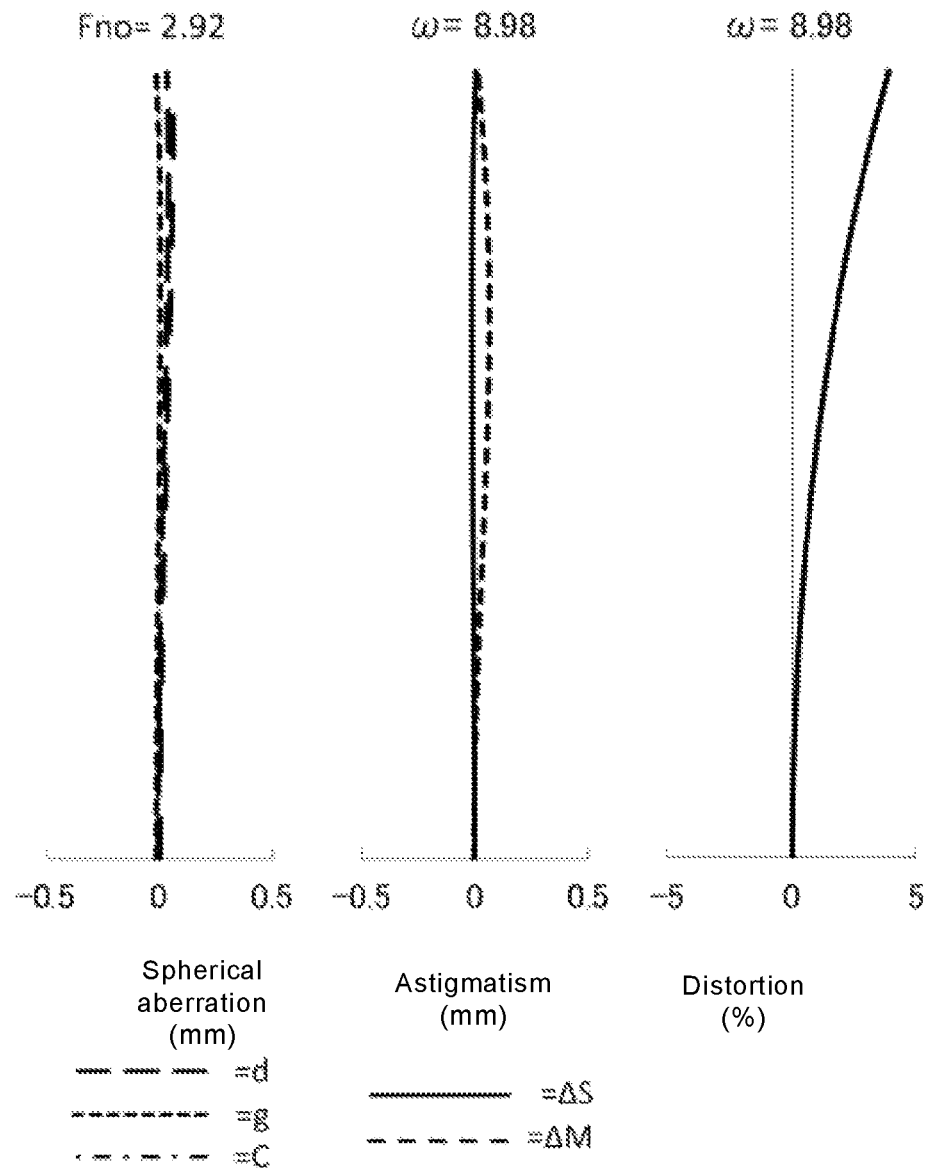
FIG. 39 is a longitudinal aberration diagram at the infinite photographing distance at the zoom center of the imaging optical system of Example 3.
Figure 40:
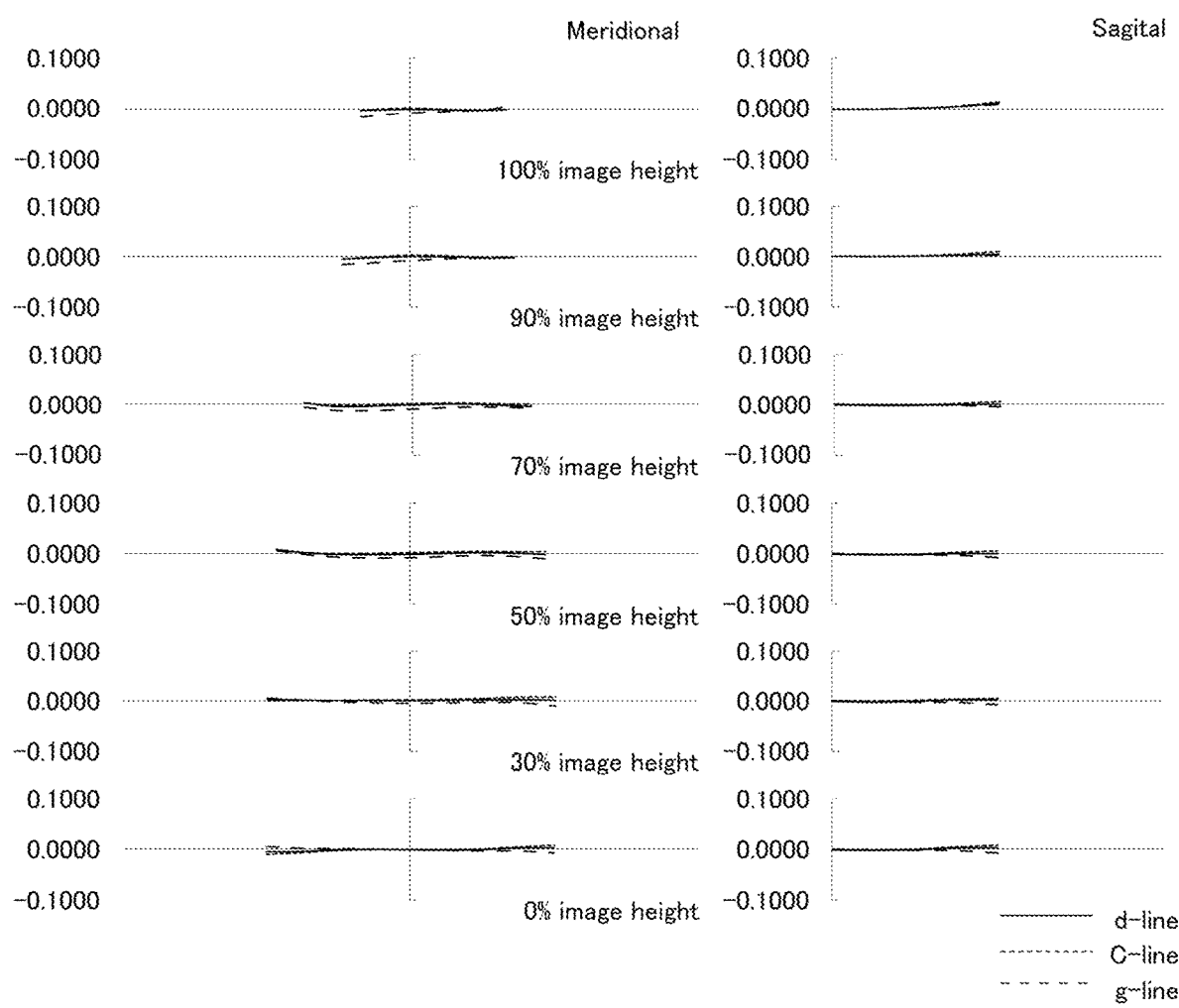
FIG. 40 is a lateral aberration diagram at the infinite photographing distance at the zoom center of the imaging optical system of Example 3.
Figure 41:
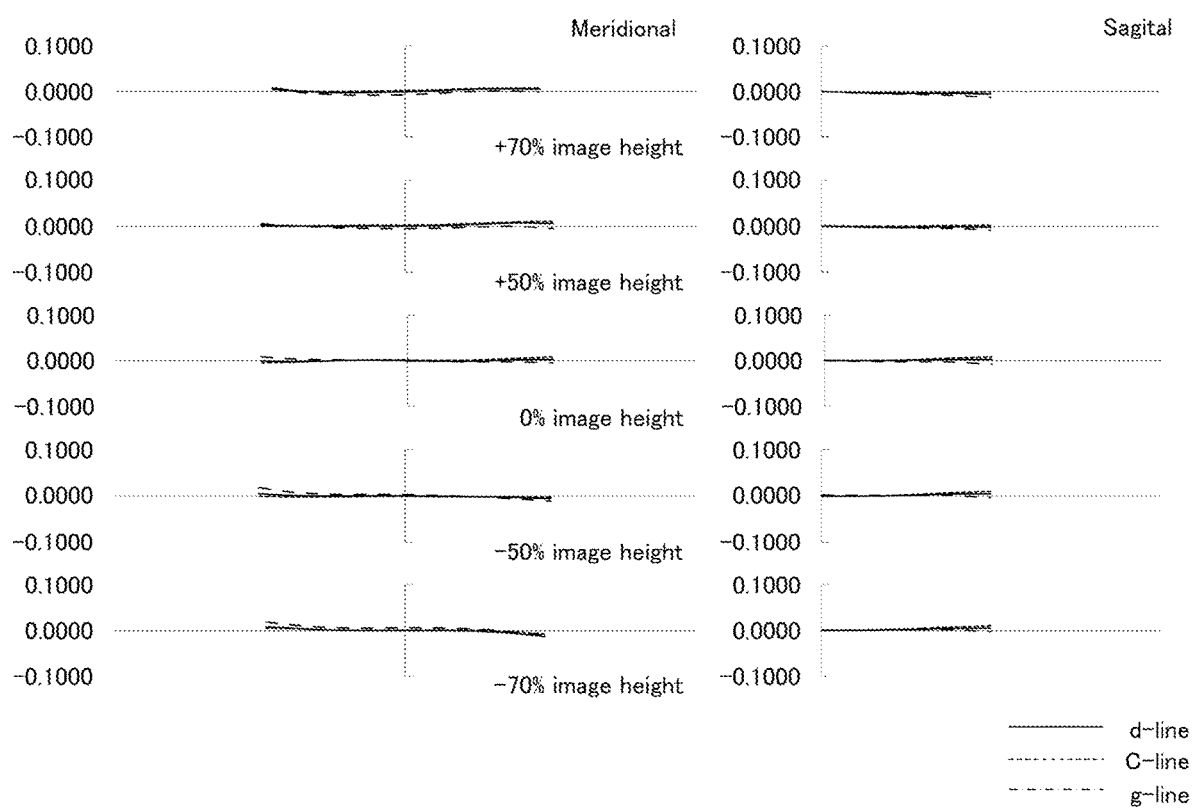
FIG. 41 is a lateral aberration diagram at the time of 0.3° vibration reduction at the infinite photographing distance at the zoom center of the imaging optical system of Example 3.
Figure 42:
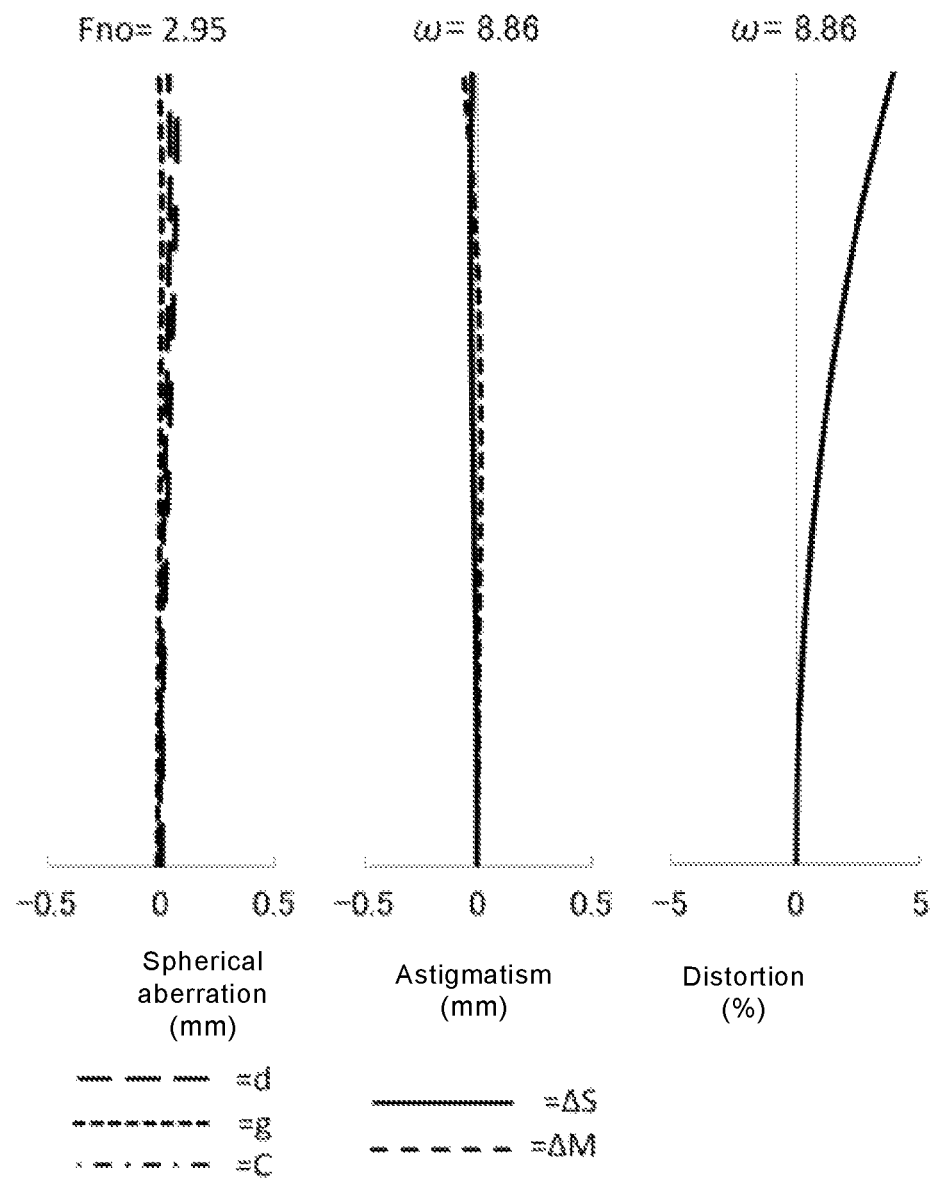
FIG. 42 is a longitudinal aberration diagram at an object distance of 3524 mm at the zoom center of the imaging optical system of Example 3.
Figure 43:
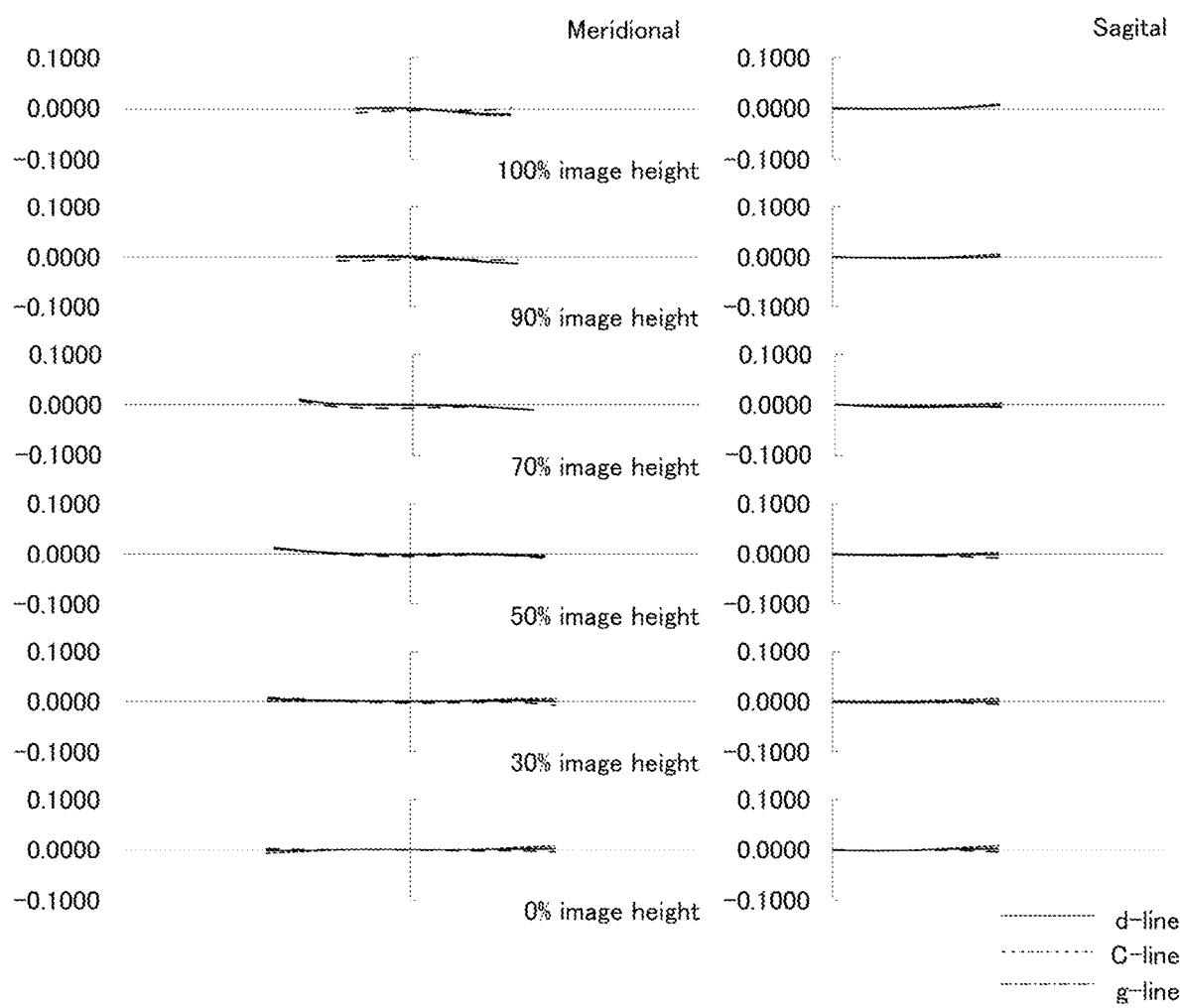
FIG. 43 is a lateral aberration diagram at an object distance of 3524 mm at the zoom center of the imaging optical system of Example 3.
Figure 44:
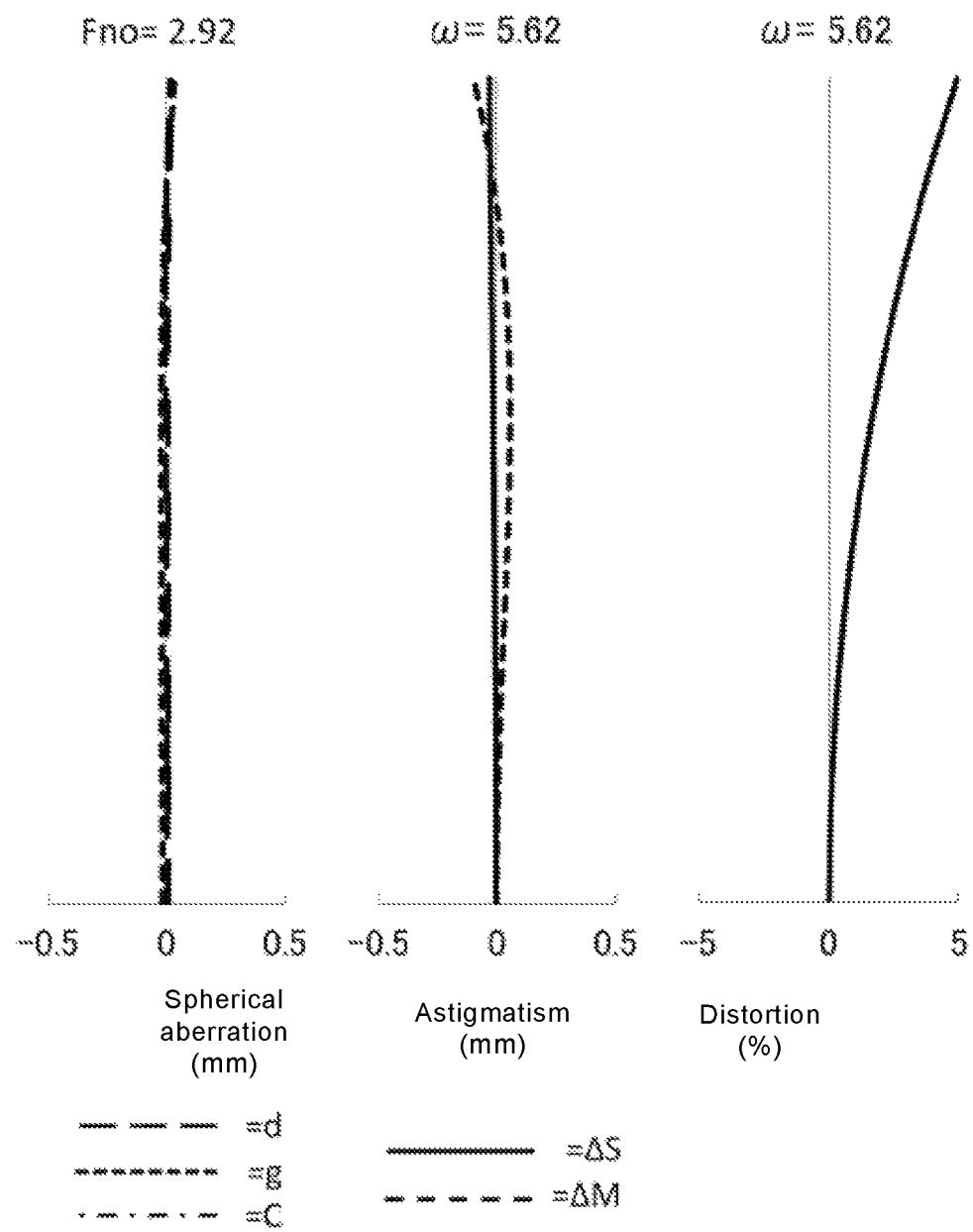
FIG. 44 is a longitudinal aberration diagram at the infinite photographing distance at the telephoto end of the imaging optical system of Example 3.
Figure 45:
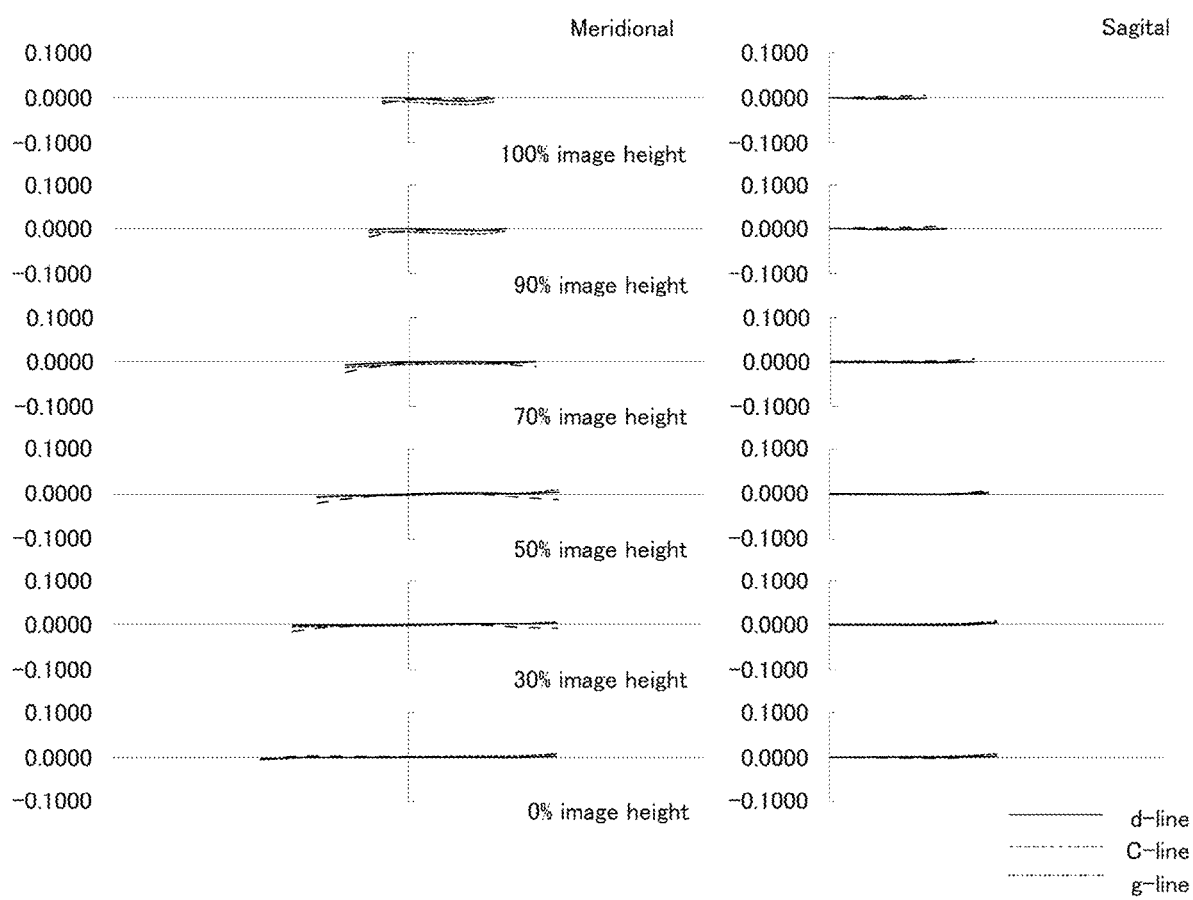
FIG. 45 is a lateral aberration diagram at the infinite photographing distance at the telephoto end of the imaging optical system of Example 3.
Figure 46:
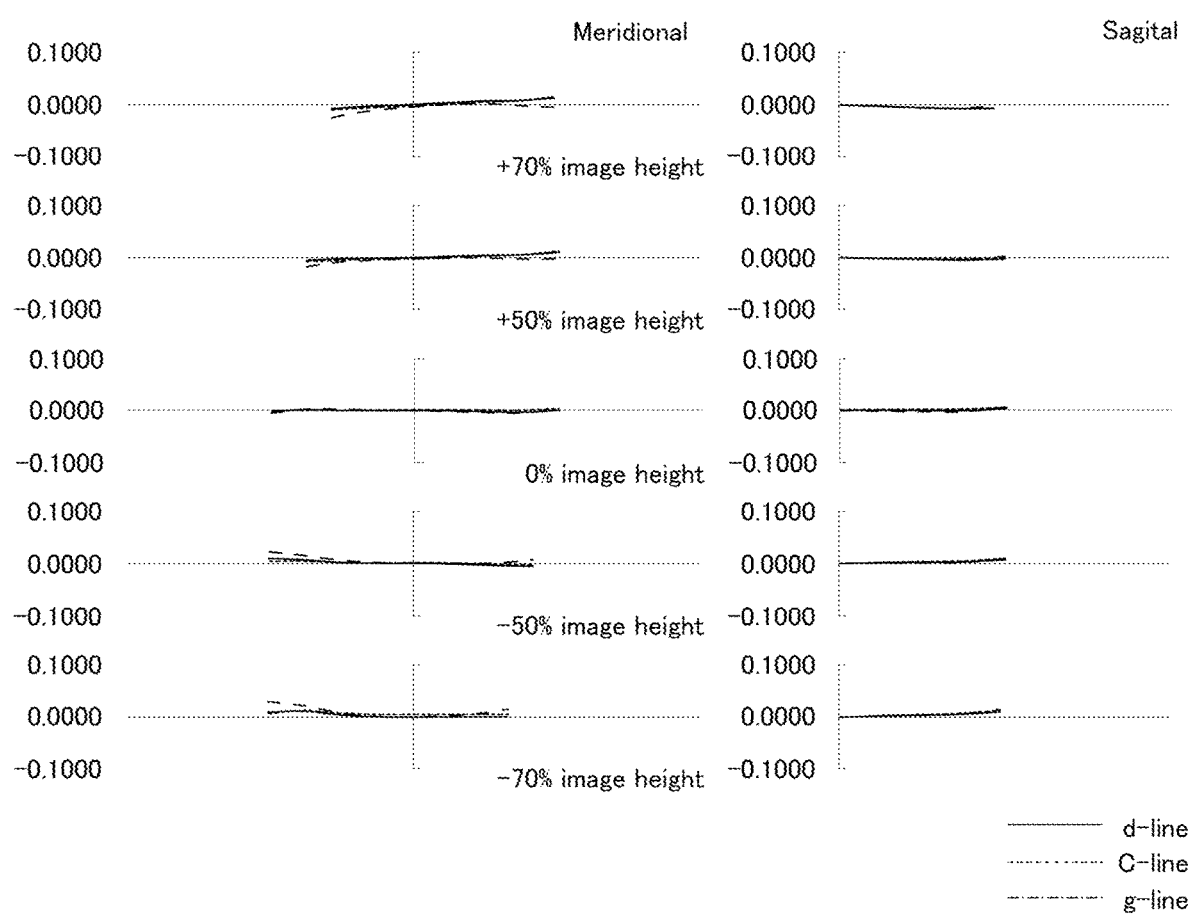
FIG. 46 is a lateral aberration diagram at the time of 0.3° vibration reduction system of Example 3.
Figure 47:
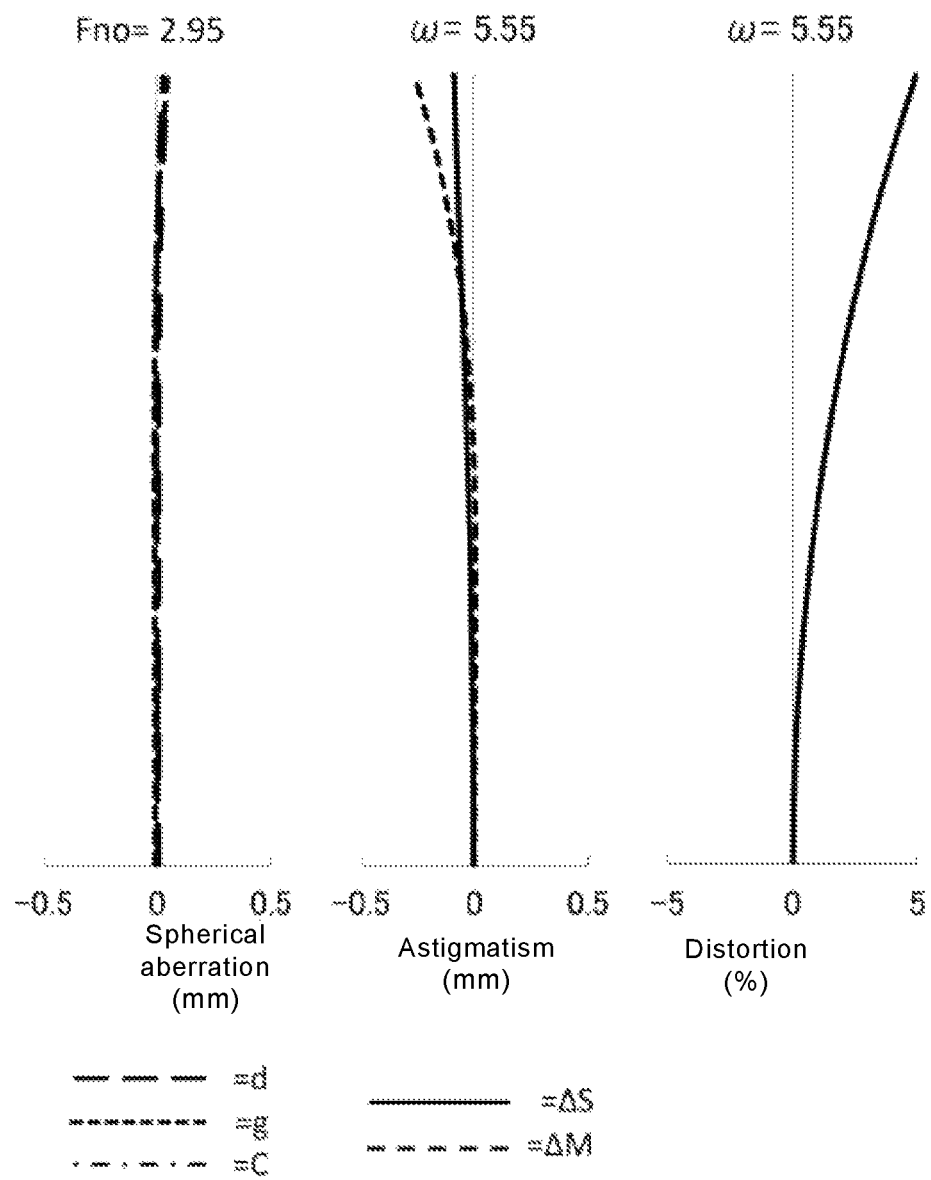
FIG. 47 is a longitudinal aberration diagram at an object distance of 5583 mm at the telephoto end of the imaging optical system of Example 3.
Figure 48:
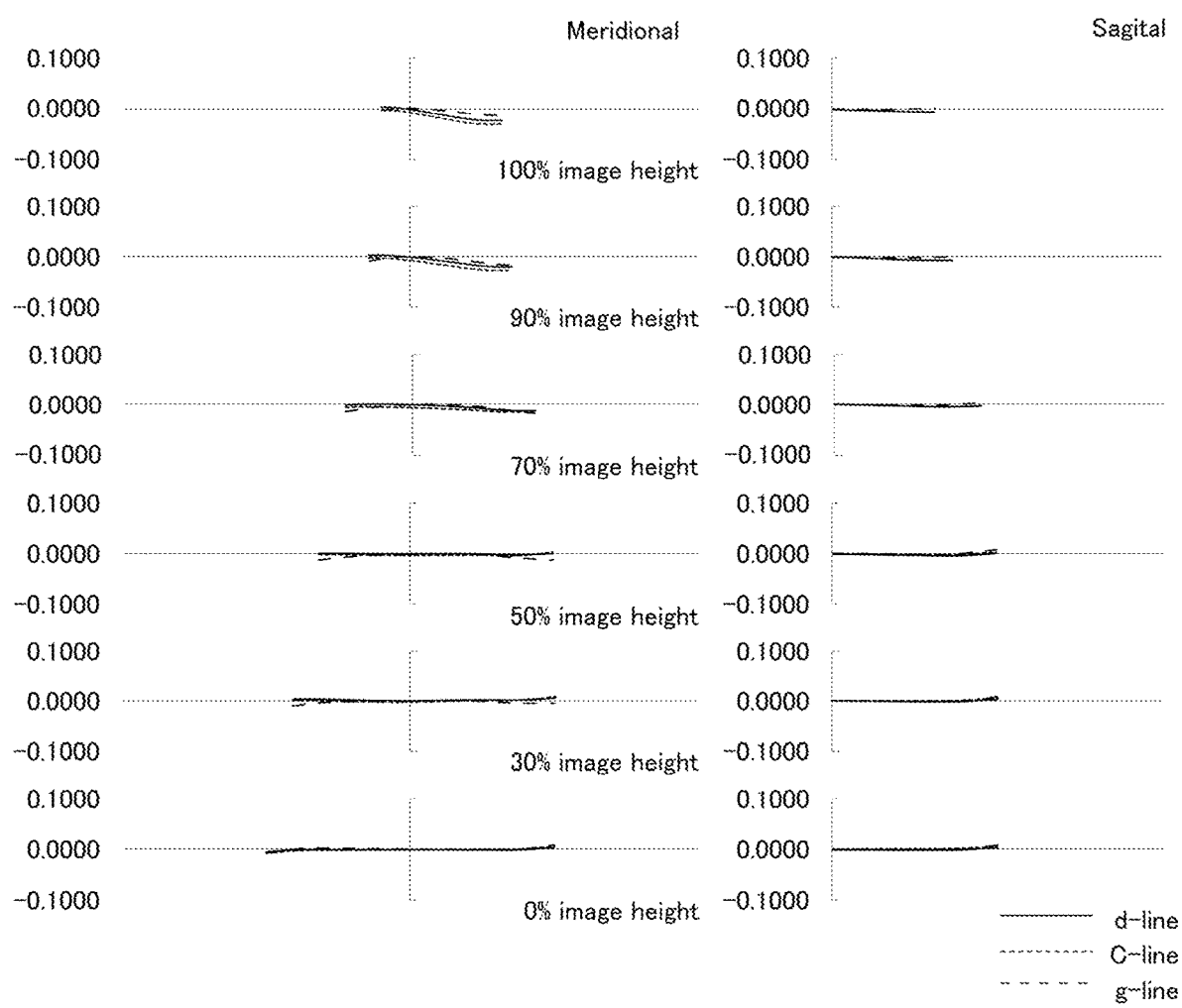
FIG. 48 is a lateral aberration diagram at an object distance of 5583 mm at the telephoto end of the imaging optical system of Example 3.

FIG. 33 is a lens block view of an imaging optical system of Example 3 of the present invention.

The imaging optical system of Example 3 includes a first lens group G1 having a positive refractive power, a second lens group G2 having a negative refractive power, a third lens group G3 having a positive refractive power, a fourth lens group G4 having a positive refractive power, a fifth lens group G5 having a positive refractive power, and a sixth lens group G6 having a negative refractive power. The aperture stop S is positioned in the fourth lens group G4. For zooming from the wide-angle end to the telephoto end, the distance between the first lens group G1 and the second lens group G2 increases, the distance between the second lens group G2 and the third lens group G3 decreases, the distance between the third lens group G3 and the fourth lens group G4 decreases, the distance between the fourth lens group G4 and the fifth lens group G5 increases, and the distance between the fifth lens group G5 and the sixth lens group G6 decreases, the first lens group G1 monotonously moves to the object side, and the fourth lens group G4 and the sixth lens group G6 are fixed with respect to the image plane I.

The front lens group GF corresponds to the second lens group G2, the rear lens group GR corresponds to the third lens group G3, the fourth lens group G4, the fifth lens group G5, and the sixth lens group G6. The object side lens group GO corresponds to the third lens group G3, and the final lens group GL corresponds to the sixth lens group G6.

The fifth lens group G5 is a focusing lens group GFcs, and moves along the optical axis for focusing from the infinite distance object to the close distance object.

The first lens group G1 includes a cemented lens of a negative meniscus lens L1 with the convex surface pointing to the object side and a double convex lens L2, and a positive meniscus lens L3 with the convex surface pointing to the object side.

The second lens group G2 includes a negative meniscus lens L4 with the convex surface pointing to the object side, a double concave lens L5, a double convex lens L6, and a double concave lens L7.

The third lens group G3 includes a double convex lens L8 with both the R1 surface and R2 surface being aspherical surfaces.

The fourth lens group G4 includes a double convex lens L9, a positive meniscus lens L10 with the convex surface pointing to the object side, an aperture stop S, a double concave lens L11, and a positive meniscus lens L12 with the convex surface pointing to the image plane side.

The fifth lens group G5 includes a cemented lens of a negative meniscus lens L13 with the convex surface pointing to the object side and a positive meniscus lens L14 with the convex surface pointing to the object side.

The sixth lens group G6 includes a cemented lens of a positive meniscus lens L15 with the convex surface pointing to the image plane side and a double concave lens L16 with the R2 surface being an aspherical surface, and a double convex lens L17. The cemented lens of L15 and L16 is a vibration reduction lens group GS, and moves including a perpendicular component at the optical axis for vibration reduction.

Below, the specification values of an optical system in accordance with Example 3 will be shown.

Numerical Value Example 3

Unit: mm

[Surface data]

| Surface number | r | d | nd | vd | PgF |
|---|---|---|---|---|---|
| Object surface | ∞ | (d0) | | | |
| 1 | 105.2785 | 1.8000 | 1.77047 | 29.74 | 0.5951 |
| 2 | 64.3162 | 6.9874 | 1.49700 | 81.61 | 0.5389 |
| 3 | −399.3190 | 0.1500 | | | |
| 4 | 54.1632 | 6.1609 | 1.43700 | 95.10 | 0.5336 |
| 5 | 397.9567 | (d5) | | | |
| 6 | 1271.4610 | 0.9000 | 1.77250 | 49.63 | 0.5504 |
| 7 | 25.3690 | 3.9960 | | | |
| 8 | −43.3814 | 0.9000 | 1.55032 | 75.50 | 0.5401 |
| 9 | 350.5870 | 0.1500 | | | |
| 10 | 46.1248 | 3.1439 | 1.92119 | 23.96 | 0.6202 |
| 11 | −270.4890 | 1.5674 | | | |
| 12 | −43.0197 | 0.9000 | 1.77250 | 49.63 | 0.5504 |
| 13 | 254.3148 | (d13) | | | |
| 14* | 30.1953 | 4.5715 | 1.55332 | 71.69 | 0.5404 |
| 15* | −171.0580 | (d15) | | | |
| 16 | 40.8986 | 4.3056 | 1.59282 | 68.62 | 0.5440 |
| 17 | −102.5480 | 0.1500 | | | |
| 18 | 86.3297 | 2.2810 | 1.55032 | 75.50 | 0.5401 |
| 19 | 1116.6830 | 1.5610 | | | |
| 20 (stop) | ∞ | 1.2234 | | | |
| 21 | −257.7980 | 0.9000 | 1.73037 | 32.23 | 0.5899 |
| 22 | 22.0510 | 3.1096 | | | |
| 23 | −138.9600 | 2.7156 | 1.49700 | 81.61 | 0.5389 |
| 24 | −33.5734 | (d24) | | | |
| 25 | 25.2922 | 0.9000 | 1.73037 | 32.23 | 0.5899 |
| 26 | 19.0764 | 3.4995 | 1.61997 | 63.88 | 0.5426 |
| 27 | 78.5849 | (d27) | | | |
| 28 | −152.9980 | 2.4754 | 1.77047 | 29.74 | 0.5951 |
| 29 | −37.6723 | 0.9000 | 1.59201 | 67.02 | 0.5358 |
| 30* | 24.1827 | 2.5703 | | | |
| 31 | 88.8971 | 2.9492 | 1.48749 | 70.44 | 0.5306 |
| 32 | −58.5852 | (BF) | | | |
| Image plane | ∞ | | | | |

[Aspherical surface data]

| | Surface 14 | Surface 15 | Surface 30 |
|---|---|---|---|
| K | 0.0000 | 0.0000 | 0.0000 |
| A4 | −3.77793E−06 | 8.92318E−06 | −7.29476E−07 |
| A6 | −2.16177E−09 | −2.09760E−09 | −2.19744E−08 |
| A8 | 1.94118E−11 | 2.39209E−11 | 8.77000E−11 |
| A10 | 0.00000E+00 | 0.00000E+00 | 0.00000E+00 |

[Various data]
Zoom ratio 2.69

| | Wide-angle | Center | Telephoto |
|---|---|---|---|
| focal length | 51.00 | 86.49 | 137.40 |
| F number | 2.92 | 2.92 | 2.92 |
| Whole angle of view 2ω | 30.84 | 17.96 | 11.24 |
| Image height Y | 14.20 | 14.20 | 14.20 |
| Lens full length | 125.00 | 145.30 | 150.00 |

-continued

Unit: mm

[Variable distance data]

| | Wide-angle | Center | Telephoto |
|---|---|---|---|
| d0 | ∞ | ∞ | ∞ |
| d5 | 1.7317 | 28.5482 | 41.1913 |
| d13 | 12.6738 | 9.1723 | 1.3000 |
| d15 | 4.5835 | 1.5647 | 1.5000 |
| d24 | 3.4683 | 8.6585 | 13.9783 |
| d27 | 12.3091 | 7.1190 | 1.7991 |
| BF | 29.4658 | 29.4659 | 29.4659 |
| d0 | 2084.0638 | 3378.2126 | 5432.7395 |
| d5 | 1.7317 | 28.5482 | 41.1913 |
| d13 | 12.6738 | 9.1723 | 1.3000 |
| d15 | 4.5835 | 1.5647 | 1.5000 |
| d24 | 2.7541 | 7.3200 | 11.6873 |
| d27 | 13.0233 | 8.4574 | 4.0901 |
| BF | 29.4659 | 29.4659 | 29.4659 |

[Lens group data]

| Group | Initial surface | Focal length |
|---|---|---|
| G1 | 1 | 89.40 |
| G2 | 6 | −22.51 |
| G3 | 14 | 46.76 |
| G4 | 16 | 186.72 |
| G5 | 25 | 63.29 |
| G6 | 28 | −101.84 |

Example 4

Figure 49:
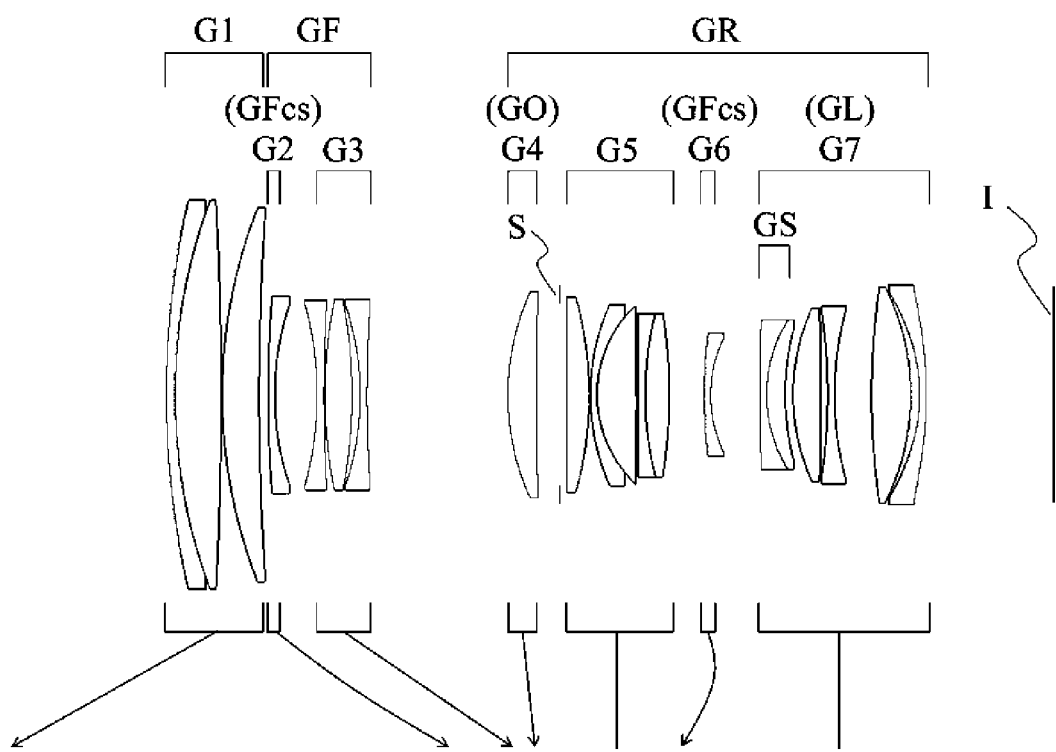
FIG. 49 is a lens block view at the infinite photographing distance at the wide-angle end in accordance with Example 4 of an imaging optical system of the present invention.
Figure 50:
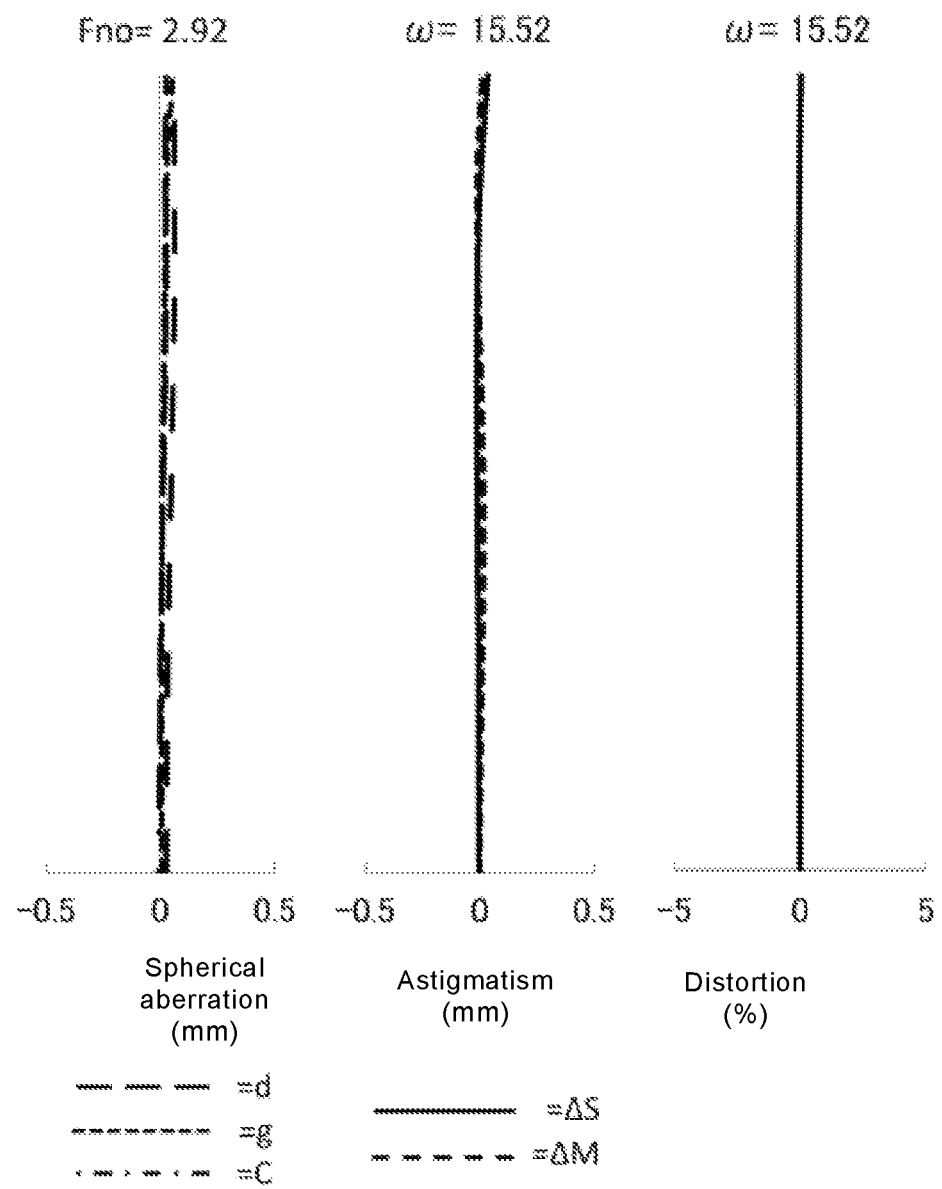
FIG. 50 is a longitudinal aberration diagram at the infinite photographing distance at the wide-angle end of the imaging optical system of Example 4.
Figure 51:
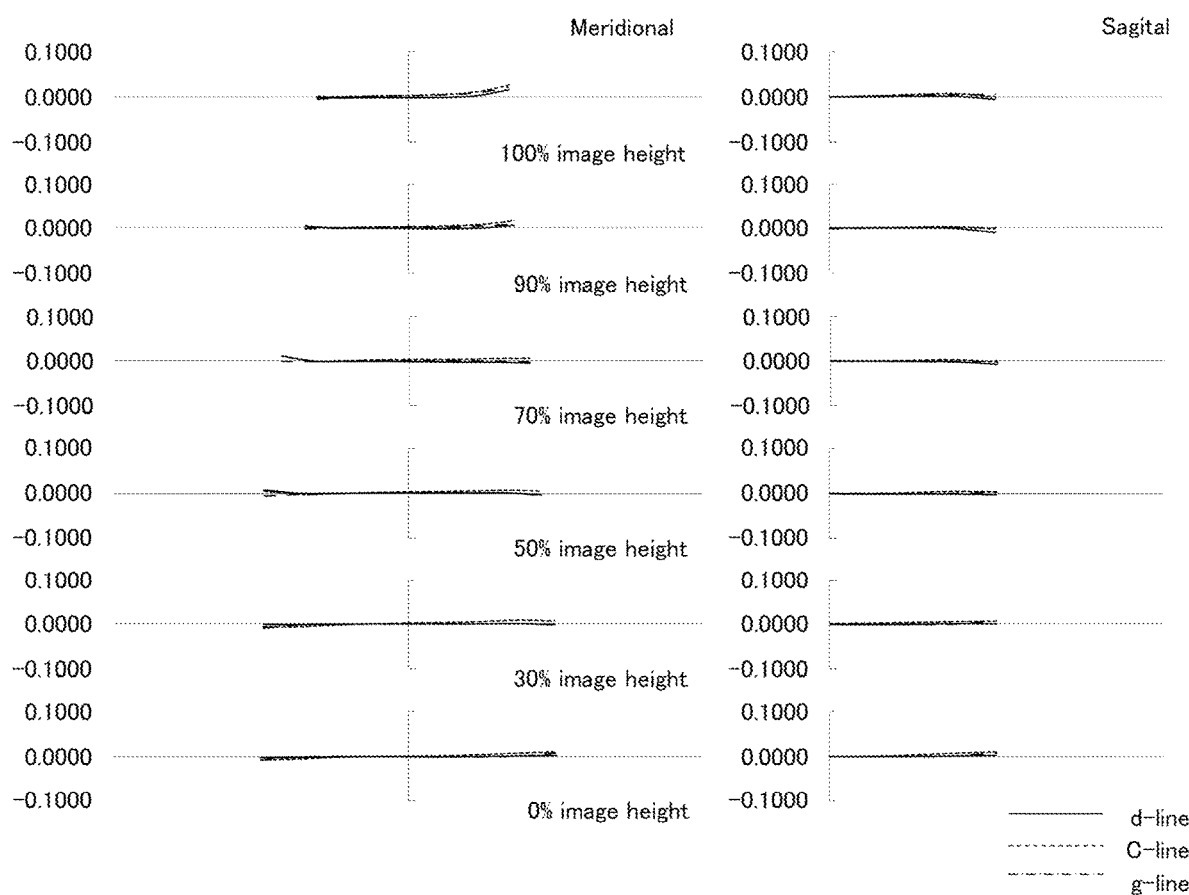
FIG. 51 is a lateral aberration diagram at the infinite photographing distance at the wide-angle end of the imaging optical system of Example 4.
Figure 52:
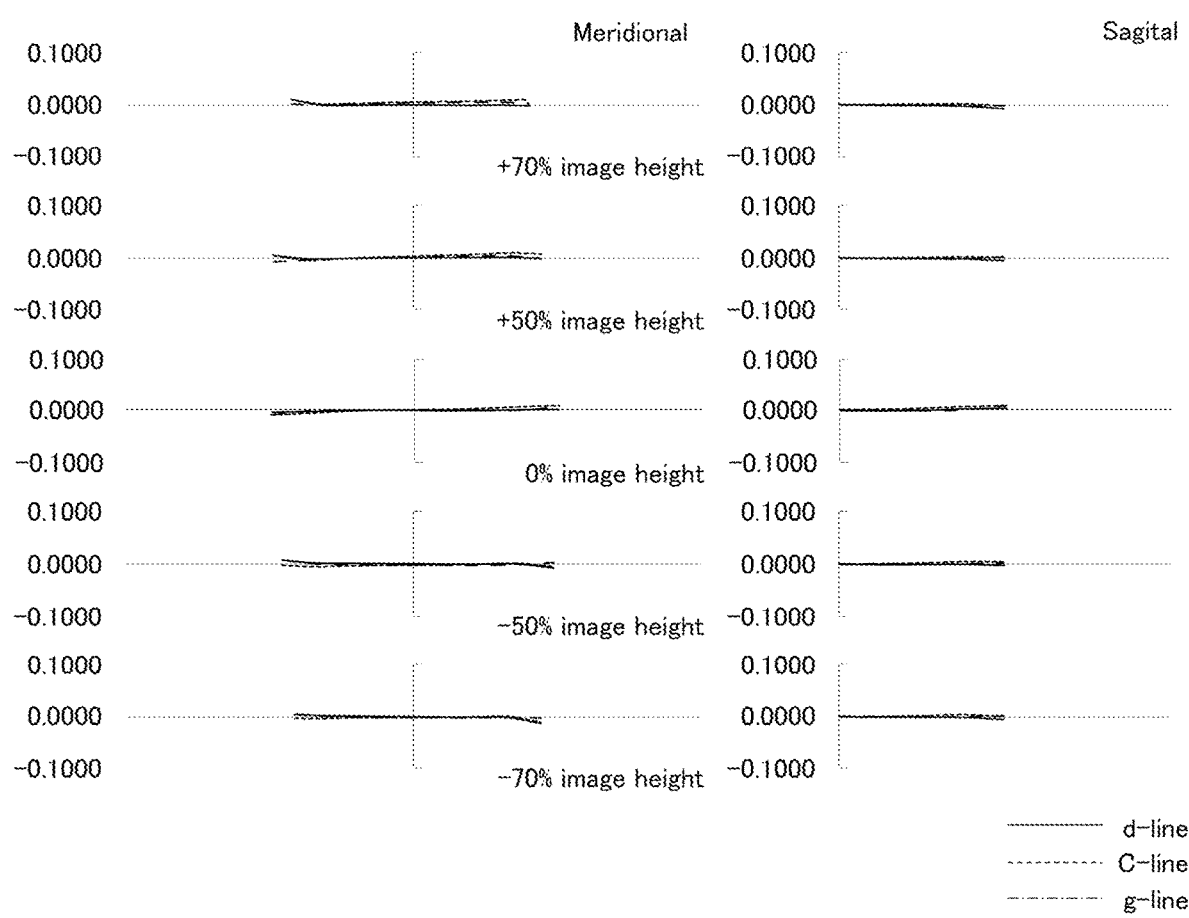
FIG. 52 is a lateral aberration diagram at the time of 0.3° vibration reduction at the infinite photographing distance at the wide-angle end of the imaging optical system of Example 4.
Figure 53:
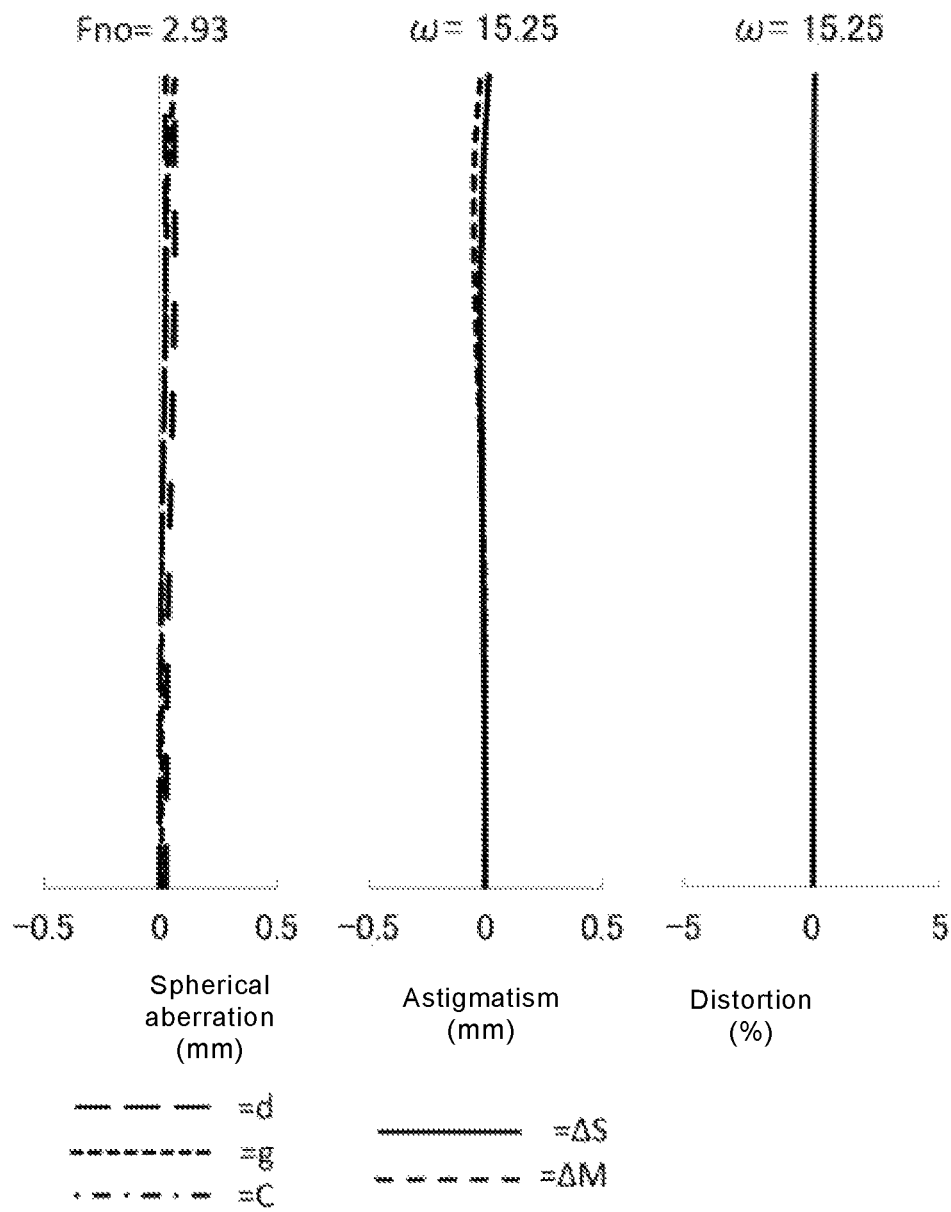
FIG. 53 is a longitudinal aberration diagram at an object distance of 2168 mm at the wide-angle end of the imaging optical system of Example 4.
Figure 54:
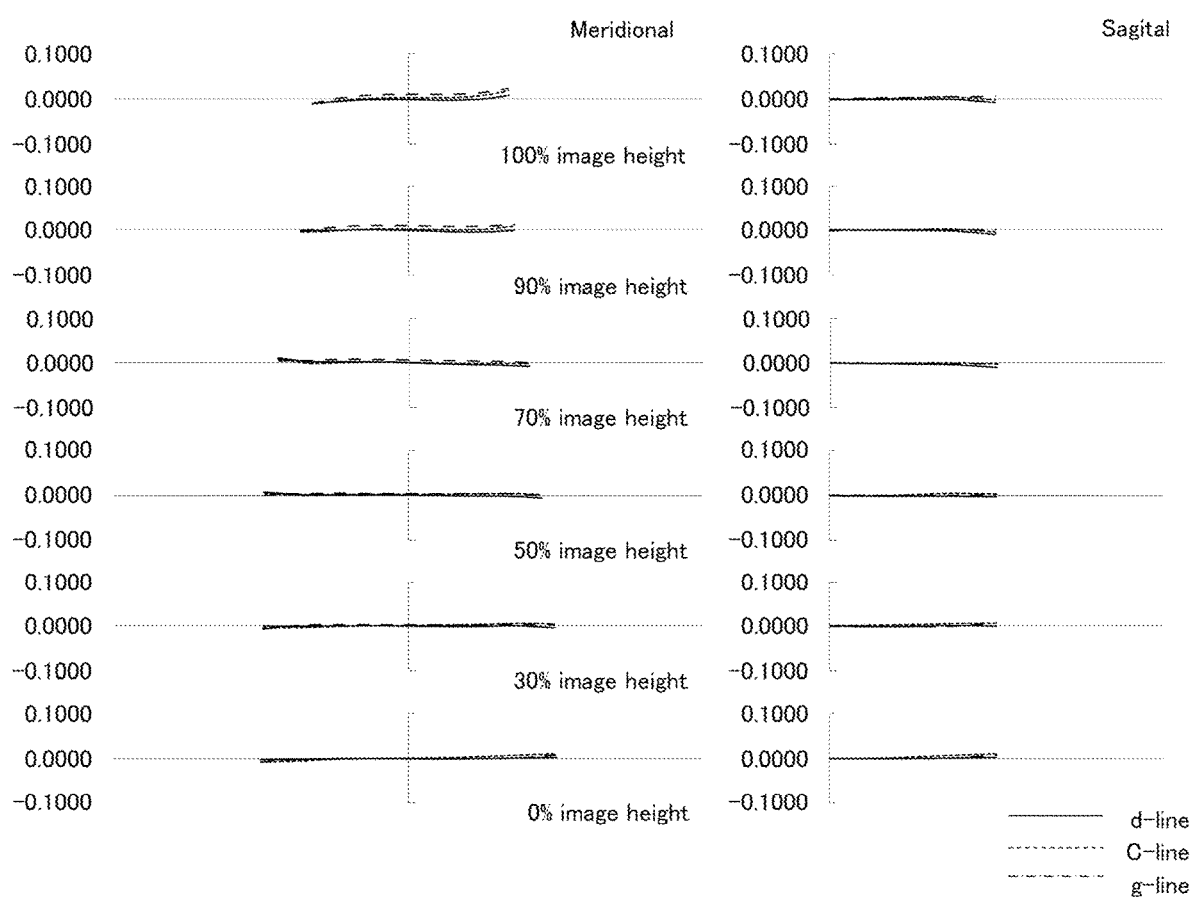
FIG. 54 is a lateral aberration diagram at an object distance of 2168 mm at the wide-angle end of the imaging optical system of Example 4.
Figure 55:
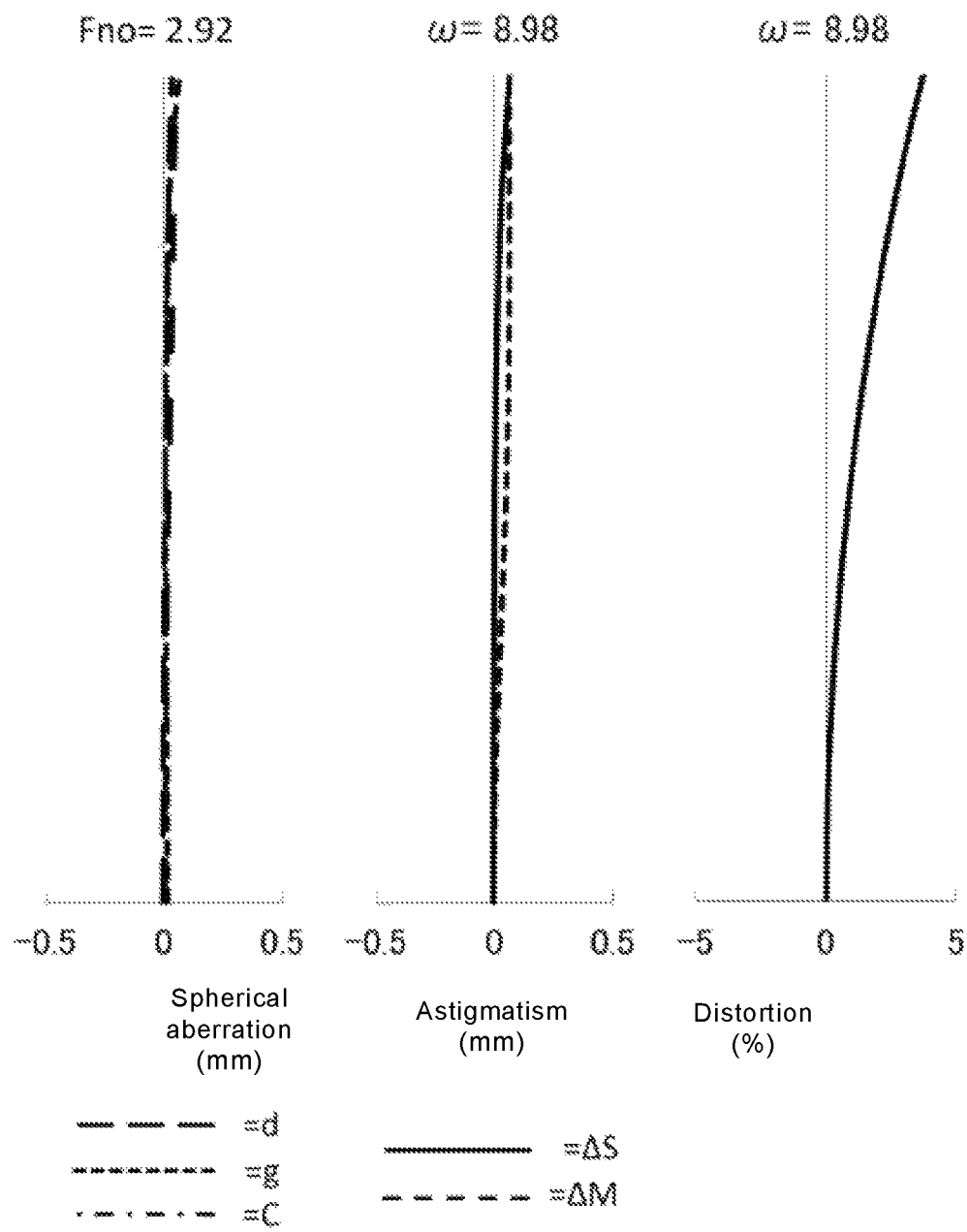
FIG. 55 is a longitudinal aberration diagram at the infinite photographing distance at the zoom center of the imaging optical system of Example 4.
Figure 56:
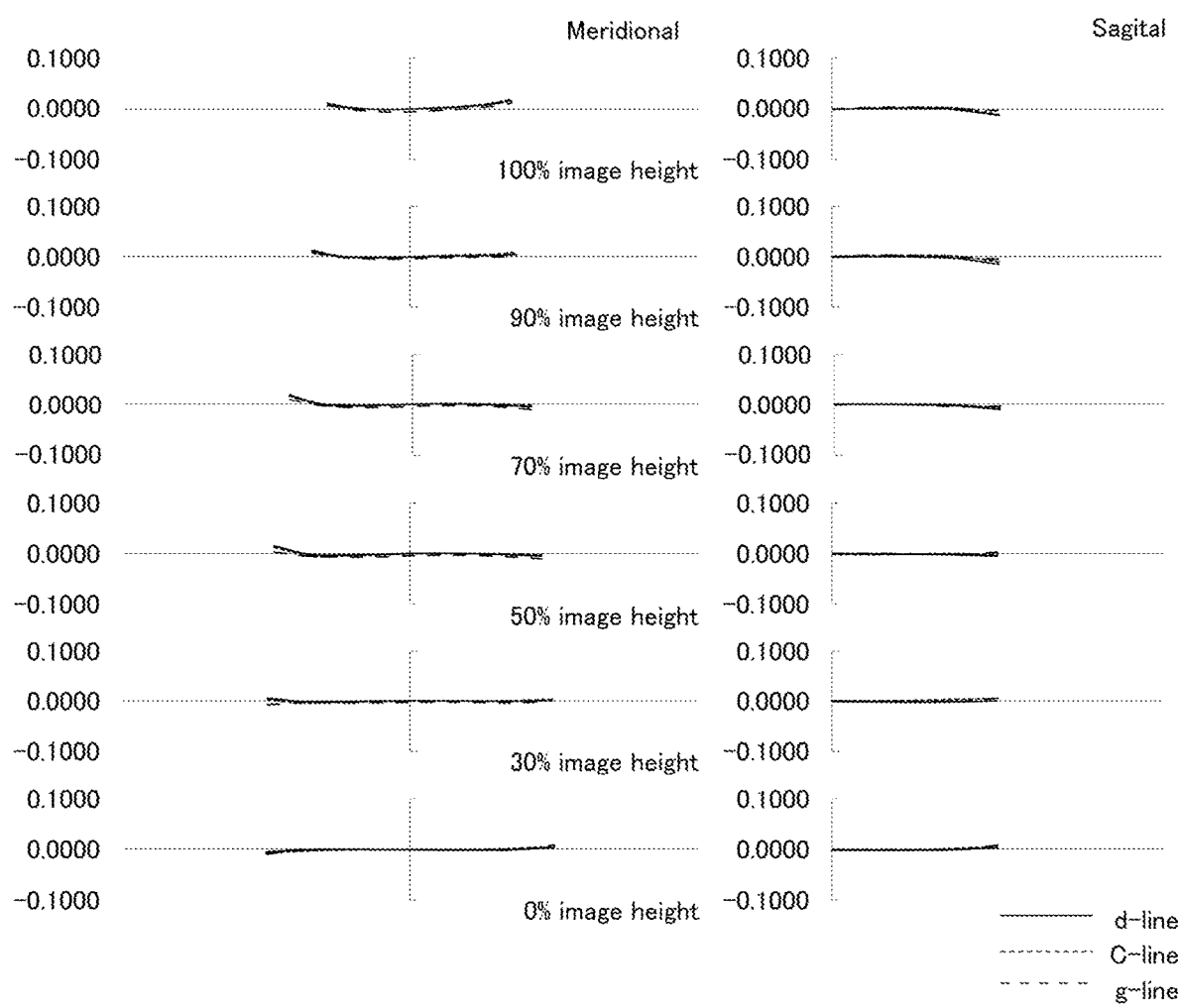
FIG. 56 is a lateral aberration diagram at the infinite photographing distance at the zoom center of the imaging optical system of Example 4.
Figure 57:
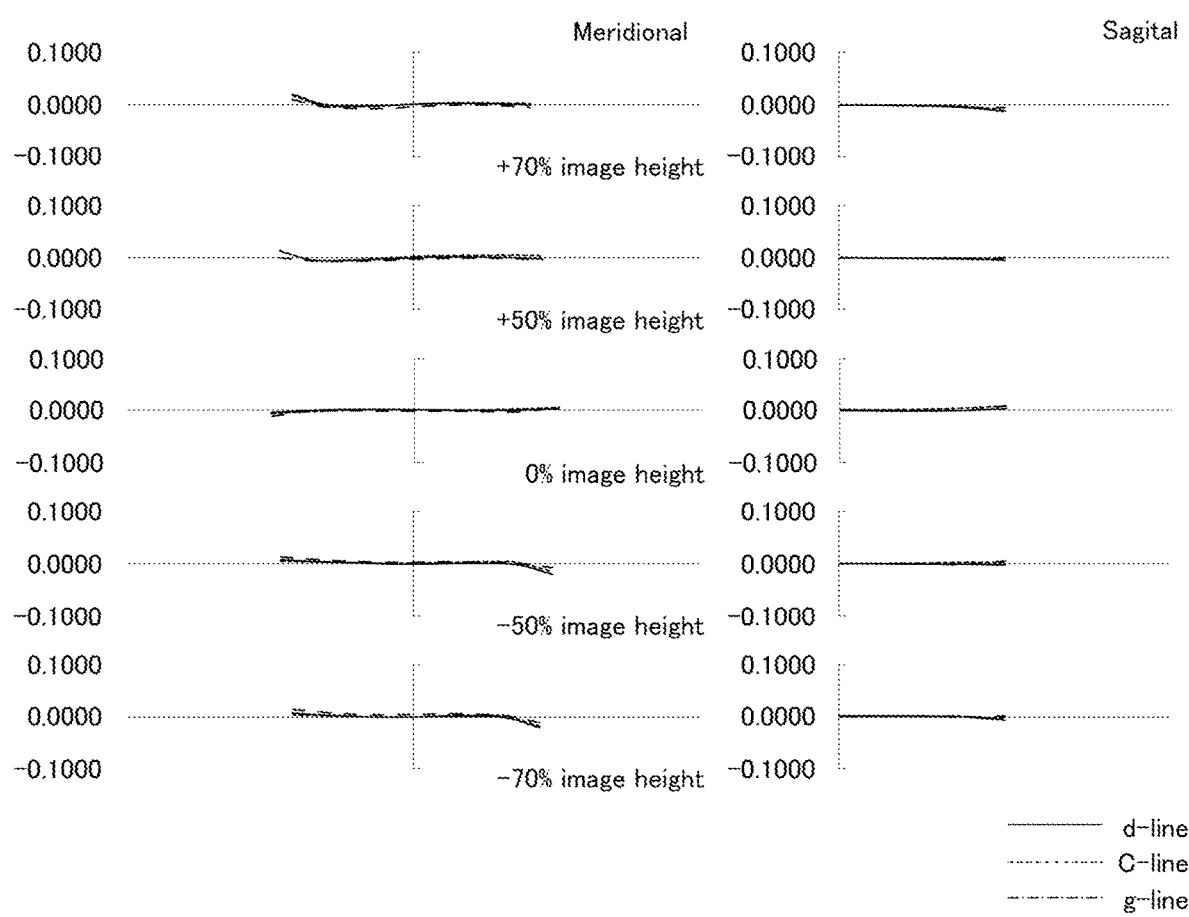
FIG. 57 is a lateral aberration diagram at the time of 0.3° vibration reduction at the infinite photographing distance at the zoom center of the imaging optical system of Example 4.
Figure 58:
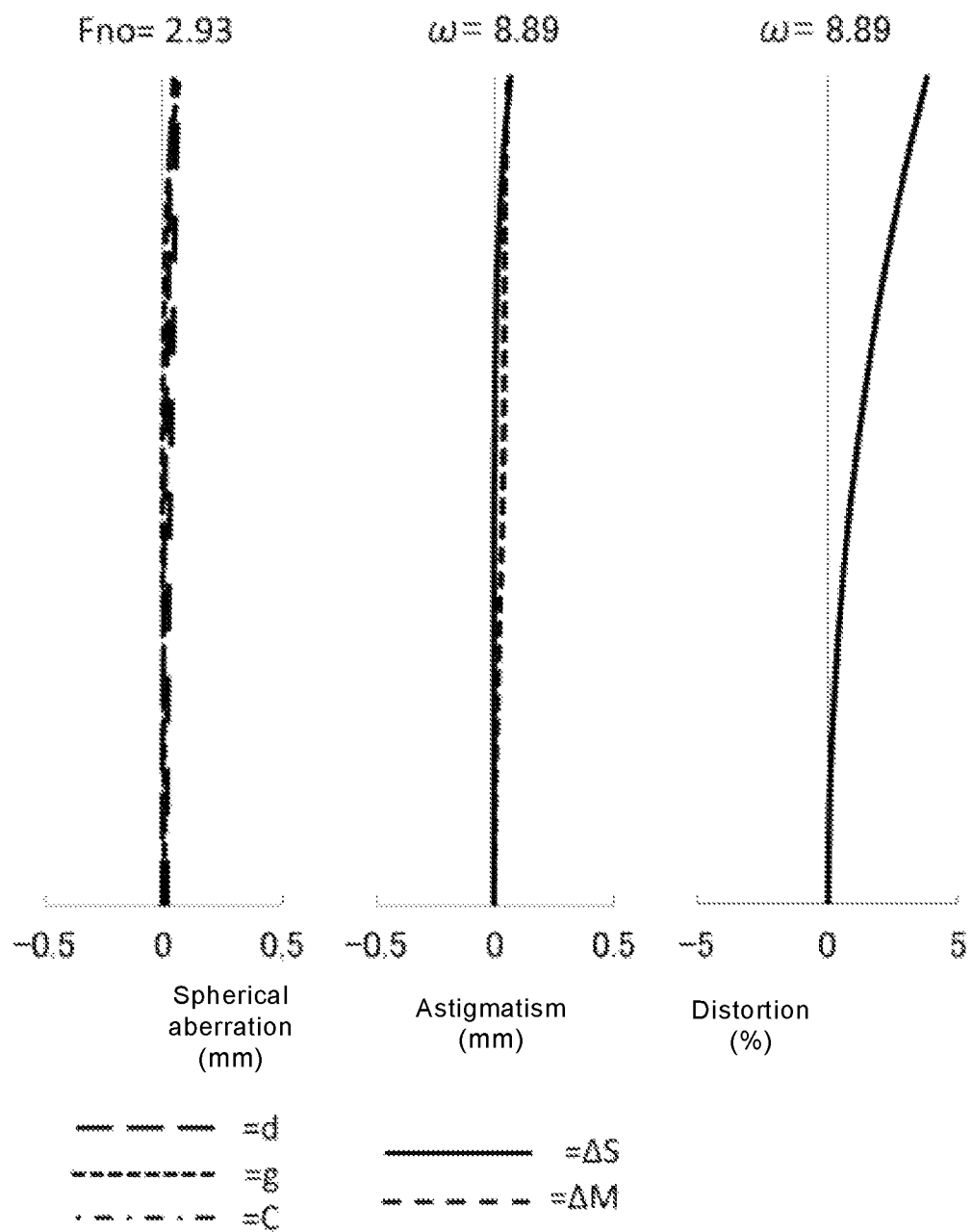
FIG. 58 is a longitudinal aberration diagram at an object distance of 3535 mm at the zoom center of the imaging optical system of Example 4.
Figure 59:
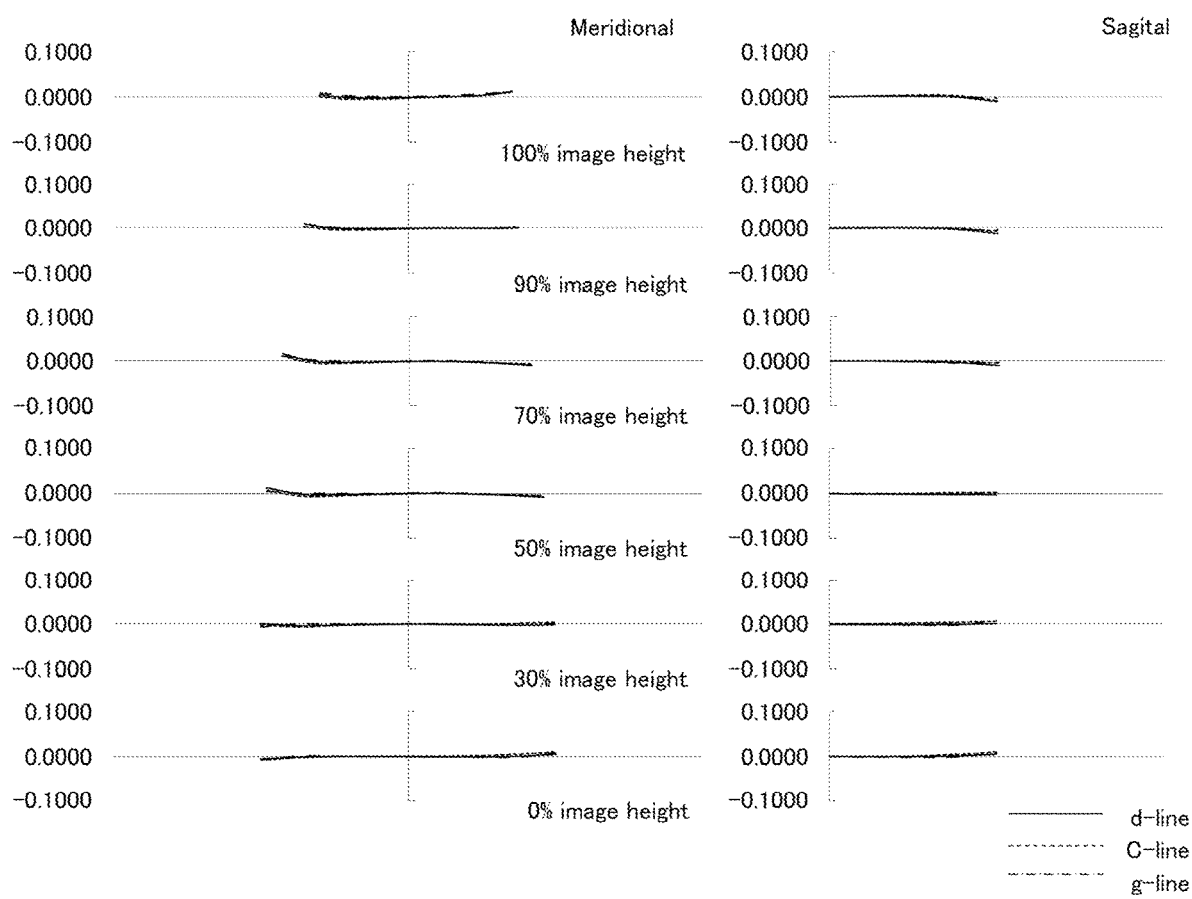
FIG. 59 is a lateral aberration diagram at an object distance of 3535 mm at the zoom center of the imaging optical system of Example 4.
Figure 60:
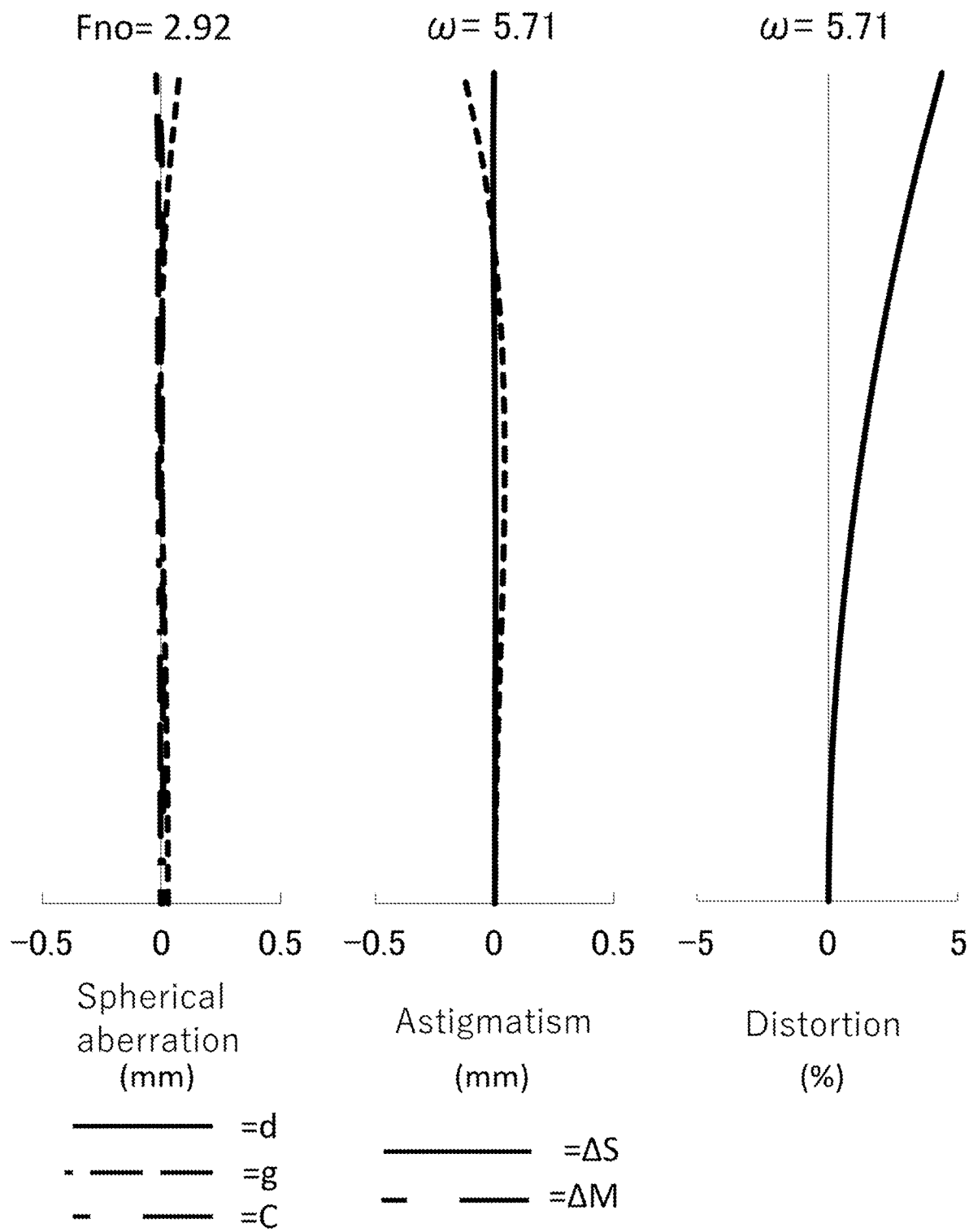
FIG. 60 is a longitudinal aberration diagram at the infinite photographing distance at the telephoto end of the imaging optical system of Example 4.
Figure 61:
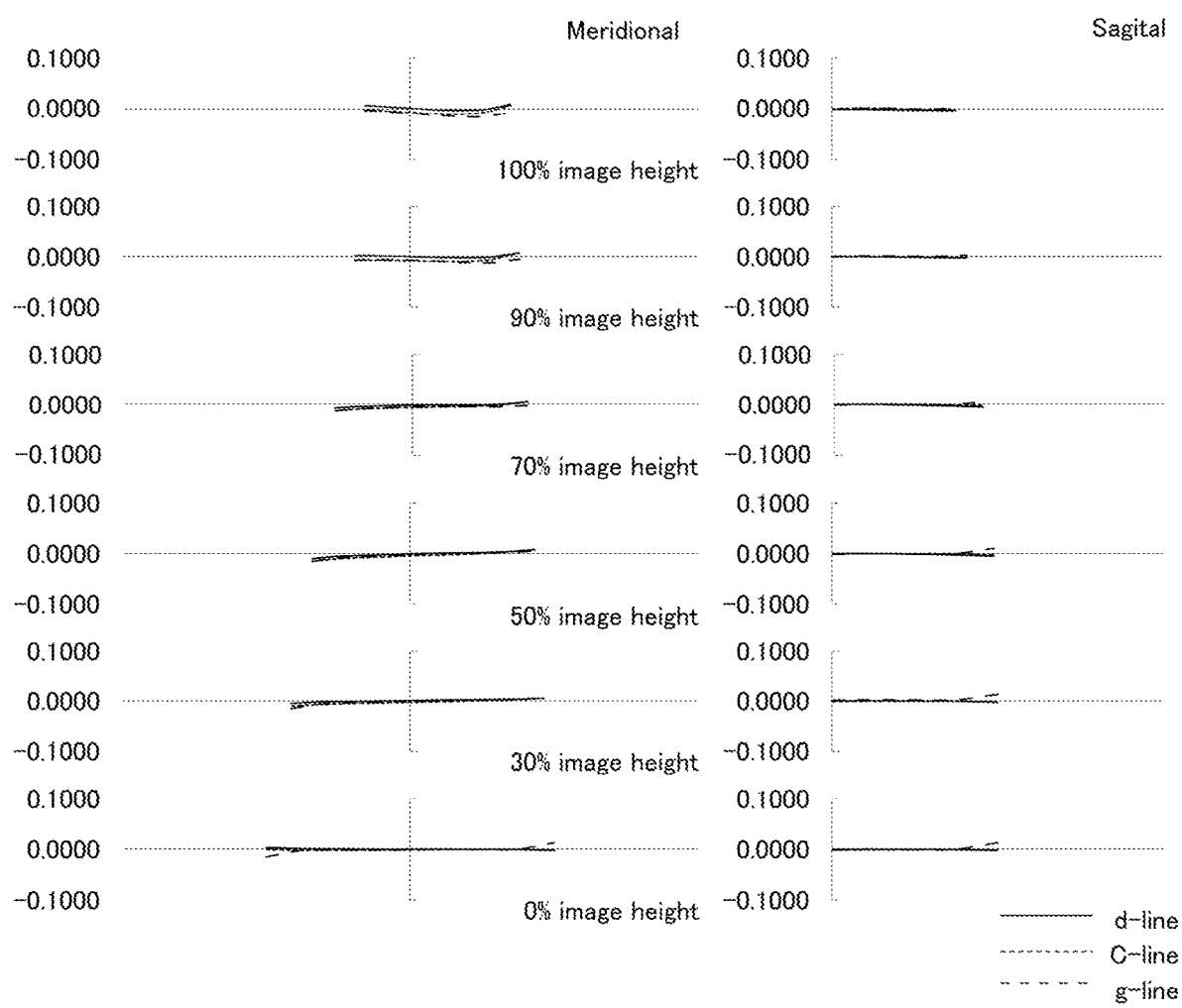
FIG. 61 is a lateral aberration diagram at the infinite photographing distance at the telephoto end of the imaging optical system of Example 4.
Figure 62:
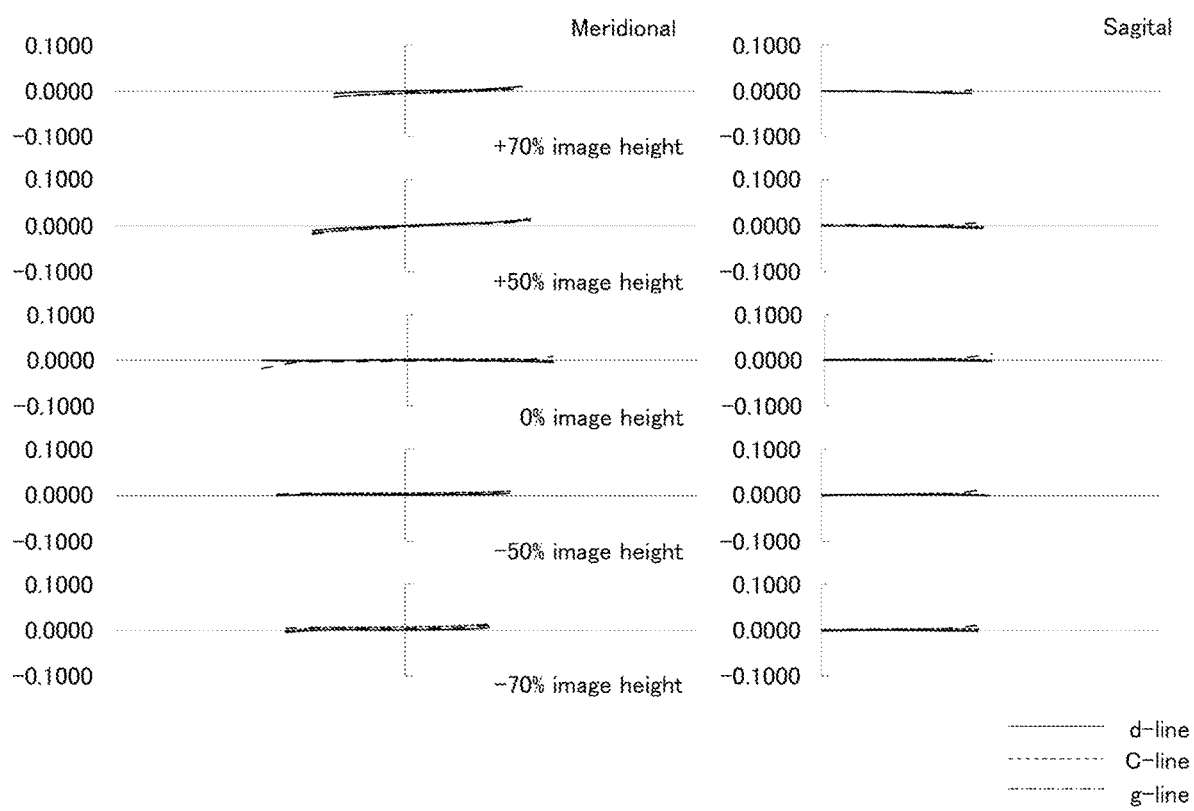
FIG. 62 is a lateral aberration diagram at the time of 0.3° vibration reduction system of Example 4.
Figure 63:
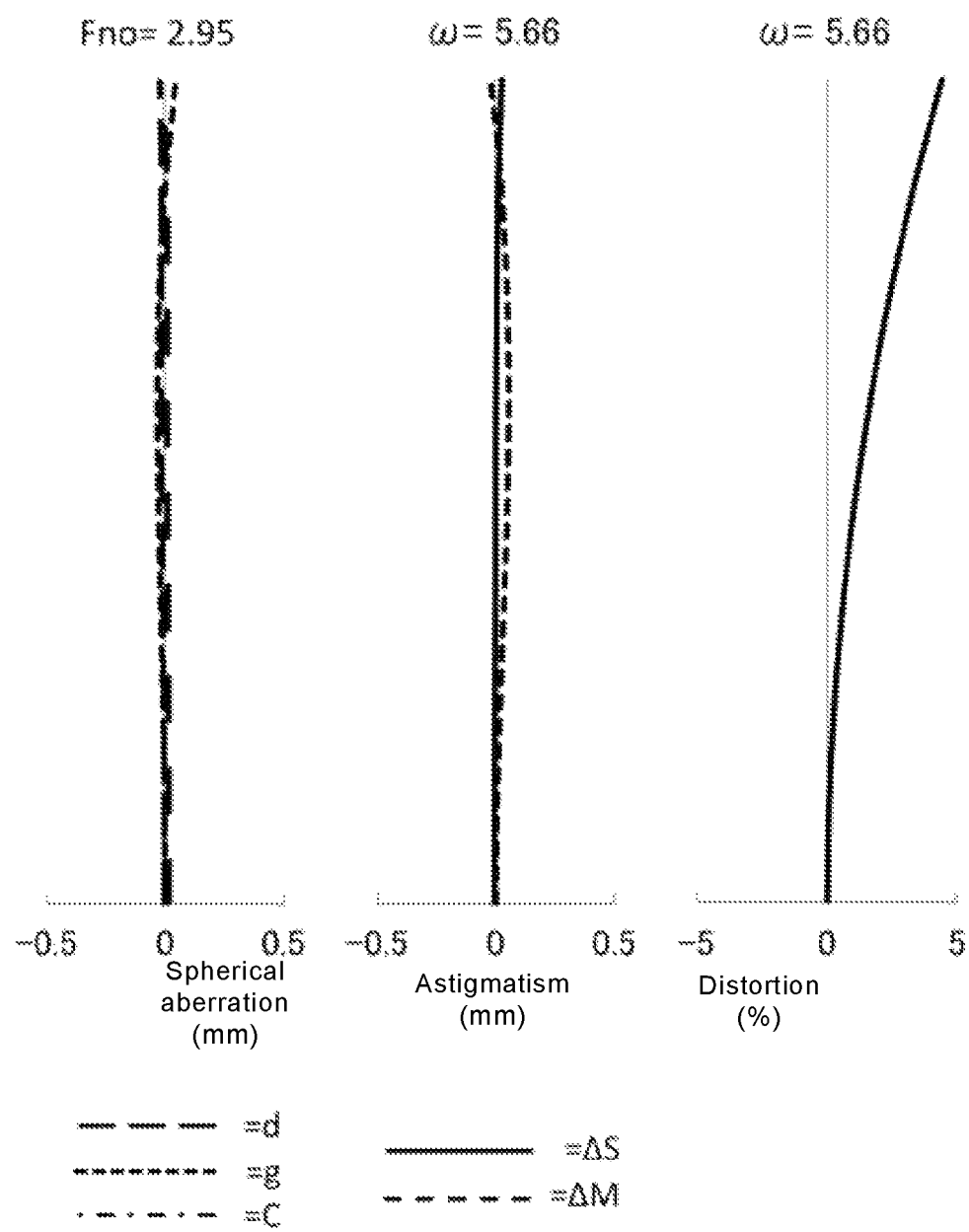
FIG. 63 is a longitudinal aberration diagram at an object distance of 5488 mm at the telephoto end of the imaging optical system of Example 4.
Figure 64:
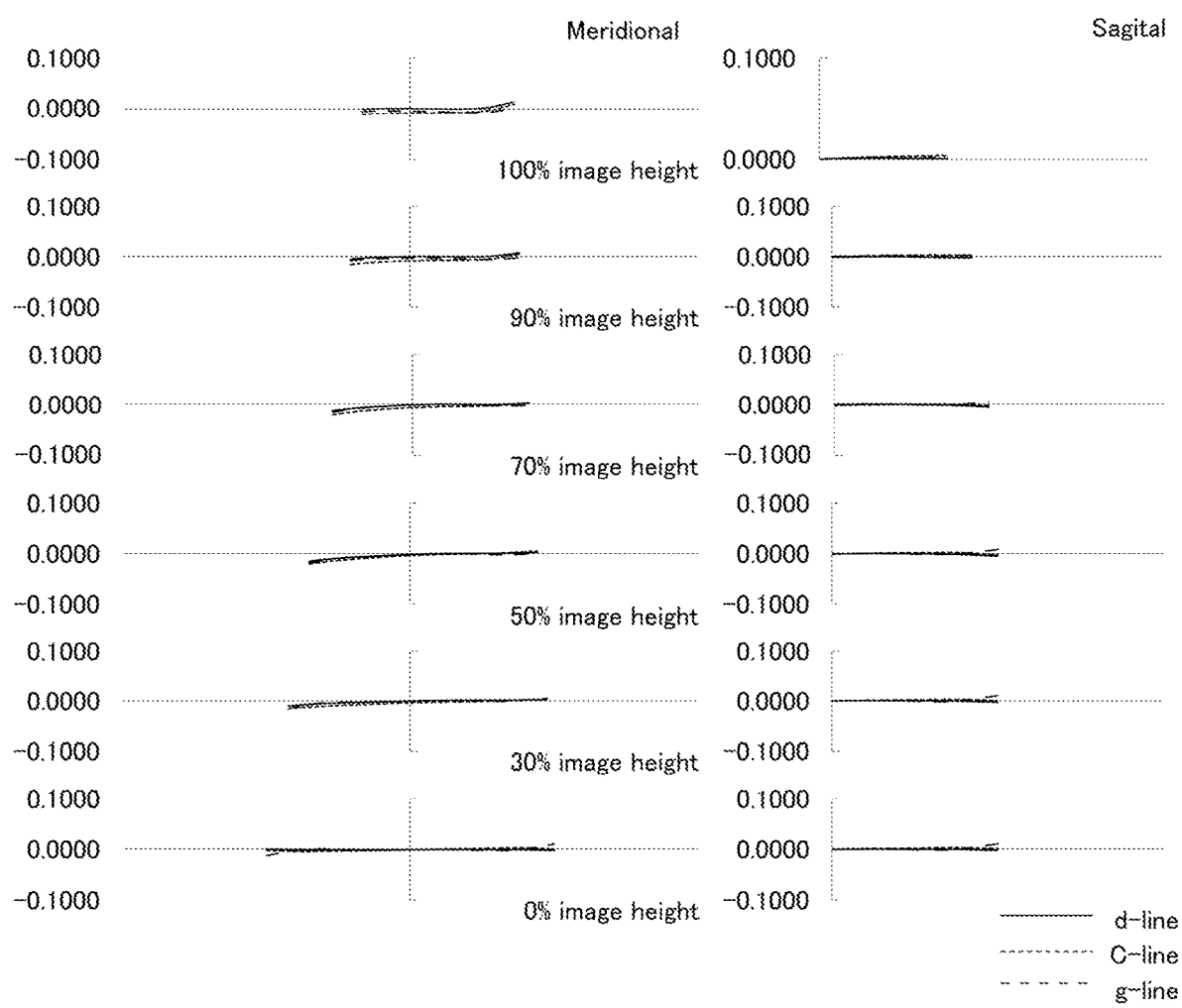
FIG. 64 is a lateral aberration diagram at an object distance of 5488 mm at the telephoto end of the imaging optical system of Example 4.

FIG. 49 is a lens block view of an imaging optical system of Example 4 of the present invention.

The imaging optical system of Example 4 includes a first lens group G1 having a positive refractive power, a second lens group G2 having a negative refractive power, a third lens group G3 having a negative refractive power, a fourth lens group G4 having a positive refractive power, an aperture stop S, a fifth lens group G5 having a positive refractive power, a sixth lens group G6 having a negative refractive power, and a seventh lens group G7 having a positive refractive power. For zooming from the wide-angle end to the telephoto end, the distance between the first lens group G1 and the second lens group G2 increases, the distance between the second lens group G2 and the third lens group G3 is changed, the distance between the third lens group G3 and the fourth lens group G4 decreases, the distance between the fourth lens group G4 and the fifth lens group G5 decreases, the distance between the fifth lens group G5 and the sixth lens group G6 is changed, the distance between the sixth lens group G6 and the seventh lens group G7 is changed, the first lens group G1 monotonously moves to the object side, and the fifth lens group G5 and the seventh lens group G7 are fixed with respect to the image plane I.

The front lens group GF corresponds to the second lens group G2 and the third lens group G3, the rear lens group GR corresponds to the fourth lens group G4, the fifth lens group G5, the sixth lens group G6, and the seventh lens group G7, the object side lens group GO corresponds to the fourth lens group G4, and the final lens group GL corresponds to the seventh lens group G7.

The second lens group G2 and the sixth lens group G6 are each the focusing lens group GFcs, and move along the optical axis for focusing from the infinite distance object to the close distance object.

The first lens group G1 includes a cemented lens of a negative meniscus lens L1 with the convex surface pointing to the object side and the double convex lens L2, and a positive meniscus lens L3 with the convex surface pointing to the object side.

The second lens group G2 includes a negative meniscus lens L4 with the convex surface pointing to the object side, and with both the R1 surface and the R2 surface being aspherical surfaces.

The third lens group G3 includes a double concave lens L5, a double convex lens L6, and a double concave lens L7.

The fourth lens group G4 includes a double convex lens L8 with both the R1 surface and R2 surface being aspherical surfaces.

The fifth lens group G5 includes a planoconvex lens L9 with the flat surface pointing to the object side, a cemented lens of a negative meniscus lens L10 with the convex surface pointing to the object side and a double convex lens L11, and a cemented lens of a double concave lens L12 and a double convex lens L13.

The sixth lens group G6 includes a negative meniscus lens L14 with the convex surface pointing to the image plane side.

The seventh lens group G7 includes a cemented lens of a negative meniscus lens L15 with the convex surface pointing to the object side and a positive meniscus lens L16 with the convex surface pointing to the object side, a double convex lens L17, a double concave lens L18, a double convex lens L19, and a negative meniscus lens L20 with the convex surface pointing to the image plane side, and with the R1 surface and the R2 surface being aspherical surfaces. The cemented lens of L15 and L16 is the vibration reduction lens group GS, and moves including a perpendicular component at the optical axis for vibration reduction.

Below, specification values of an optical system in accordance with Example 4 will be shown.

Numerical Value Example 4

| Unit: mm | | | | | |
|---|---|---|---|---|---|
| [Surface data] | | | | | |
| Surface number | r | d | nd | vd | PgF |
| Object surface | ∞ | (d0) | | | |
| 1 | 110.8865 | 1.2000 | 1.75000 | 28.95 | 0.5948 |
| 2 | 71.7917 | 6.2404 | 1.49700 | 81.61 | 0.5389 |
| 3 | −468.1850 | 0.1500 | | | |
| 4 | 66.3984 | 4.9658 | 1.43700 | 95.10 | 0.5336 |
| 5 | 354.5132 | (d5) | | | |
| 6* | 206.4825 | 0.9000 | 1.80610 | 40.73 | 0.5694 |
| 7* | 38.1769 | (d7) | | | |
| 8 | −43.3166 | 0.9001 | 1.49700 | 81.61 | 0.5389 |
| 9 | 206.7869 | 0.1500 | | | |
| 10 | 63.4714 | 3.6184 | 1.92119 | 23.96 | 0.6202 |
| 11 | −64.2933 | 1.1206 | | | |
| 12 | −36.2567 | 0.9000 | 1.87070 | 40.73 | 0.5682 |
| 13 | 171.7287 | (d13) | | | |
| 14* | 32.5749 | 3.9079 | 1.85135 | 40.10 | 0.5695 |
| 15* | −610.7880 | (d15) | | | |
| 16 (stop) | ∞ | 1.0000 | | | |
| 17 | ∞ | 3.0436 | 1.49700 | 81.61 | 0.5389 |
| 18 | −45.8068 | 0.1500 | | | |
| 19 | 28.7905 | 0.9000 | 1.90110 | 27.06 | 0.6072 |
| 20 | 15.9000 | 5.2729 | 1.49700 | 81.61 | 0.5389 |
| 21 | −780.1410 | 0.3133 | | | |
| 22 | −634.4430 | 0.9000 | 1.71736 | 29.50 | 0.6040 |
| 23 | 42.7268 | 3.2393 | 1.55032 | 75.50 | 0.5401 |
| 24 | −66.9993 | (d24) | | | |
| 25 | 60.5662 | 0.9000 | 1.72916 | 54.67 | 0.5453 |
| 26 | 17.1482 | (d26) | | | |
| 27 | 309.5050 | 0.9000 | 1.95375 | 32.32 | 0.5901 |
| 28 | 18.1151 | 2.5722 | 1.92286 | 20.88 | 0.6390 |
| 29 | 33.8199 | 1.0521 | | | |
| 30 | 27.1822 | 3.7032 | 1.87070 | 40.73 | 0.5682 |
| 31 | −503.3710 | 0.9679 | | | |
| 32 | −71.3834 | 0.9000 | 1.92286 | 20.88 | 0.6390 |
| 33 | 41.2602 | 5.0126 | | | |
| 34 | 99.5610 | 5.2778 | 2.00069 | 25.46 | 0.6136 |
| 35 | −30.9639 | 1.2587 | | | |
| 36* | −21.1606 | 0.8999 | 1.55332 | 71.69 | 0.5404 |
| 37* | −50.0557 | (BF) | | | |
| Image plane | ∞ | | | | |

| [Aspherical surface data] | | | | |
|---|---|---|---|---|
| | Surface 6 | Surface 7 | Surface 14 | Surface 15 |
| K | 0.0000 | 0.0000 | 0.0000 | 0.0000 |
| A4 | 5.60046E−06 | 4.09101E−06 | −5.70420E−07 | 1.17204E−05 |
| A6 | −2.06304E−10 | 1.49883E−10 | 7.97332E−09 | 7.15638E−09 |
| A8 | 2.21510E−11 | 2.73090E−11 | 5.79324E−12 | 4.89953E−12 |
| A10 | 0.00000E+00 | 0.00000E+00 | 0.00000E+00 | 0.00000E+00 |

-continued

Unit: mm

| | Surface 36 | Surface 37 |
|---|---|---|
| K | 0.0000 | 0.0000 |
| A4 | 1.49273E−05 | 3.82329E−06 |
| A6 | 5.01494E−08 | 2.70391E−08 |
| A8 | −4.63894E−11 | −3.30174E−11 |
| A10 | 0.00000E+00 | 0.00000E+00 |

[Various data]
Zoom ratio 2.66

| | Wide-angle | Center | Telephoto |
|---|---|---|---|
| Focal length | 51.12 | 86.61 | 136.00 |
| F number | 2.92 | 2.92 | 2.92 |
| Whole angle of view 2ω | 31.04 | 17.96 | 11.43 |
| Image height Y | 14.20 | 14.20 | 14.20 |
| Lens full length | 120.00 | 135.68 | 144.00 |

[Variable distance data]

| | Wide-angle | Center | Telephoto |
|---|---|---|---|
| d0 | ∞ | ∞ | ∞ |
| d5 | 1.2000 | 27.4112 | 46.0389 |
| d7 | 5.7801 | 6.3376 | 4.5795 |
| d13 | 19.0905 | 8.9233 | 1.0000 |
| d15 | 3.0531 | 2.1335 | 1.5054 |
| d24 | 4.7209 | 4.8103 | 1.2002 |
| d26 | 6.6389 | 6.5496 | 10.1597 |
| BF | 17.2000 | 17.2000 | 17.2000 |
| d0 | 2048.3036 | 3399.3582 | 5343.6304 |
| d5 | 1.9740 | 27.6345 | 45.9889 |
| d7 | 5.0062 | 6.1142 | 4.6295 |
| d13 | 19.0905 | 8.9233 | 1.0000 |
| d15 | 3.0531 | 2.1335 | 1.5054 |
| d24 | 5.0572 | 5.3909 | 2.0724 |
| d26 | 6.3027 | 5.9690 | 9.2875 |
| BF | 17.2000 | 17.2000 | 17.2000 |

[Lens group data]

| Group | Initial surface | Focal length |
|---|---|---|
| G1 | 1 | 104.25 |
| G2 | 6 | −58.24 |
| G3 | 8 | −73.29 |
| G4 | 14 | 36.43 |
| G5 | 16 | 48.75 |
| G6 | 25 | −33.10 |
| G7 | 27 | 181.16 |

Example 5

Figure 65:
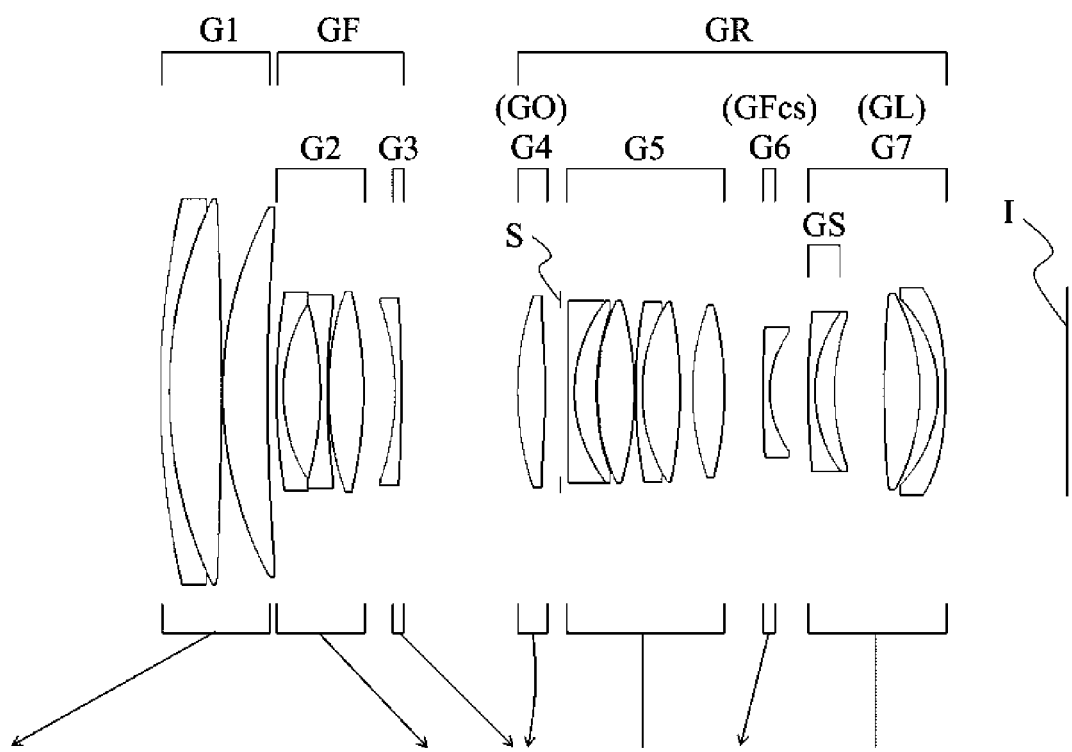
FIG. 65 is a lens block view at the infinite photographing distance at the wide-angle end in accordance with Example 5 of an imaging optical system of the present invention.
Figure 66:
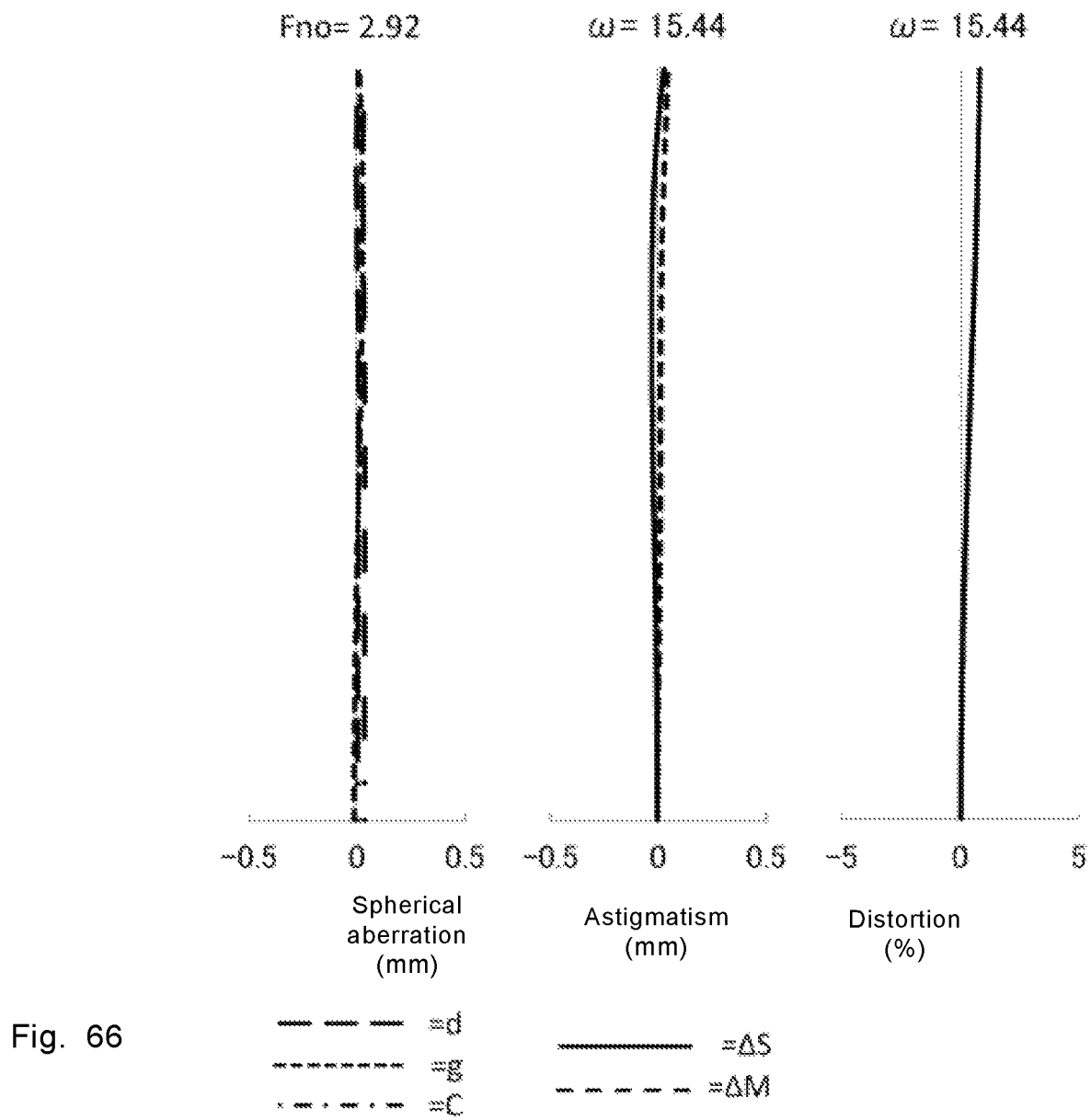
FIG. 66 is a longitudinal aberration diagram at the infinite photographing distance at the wide-angle end of the imaging optical system of Example 5.
Figure 67:
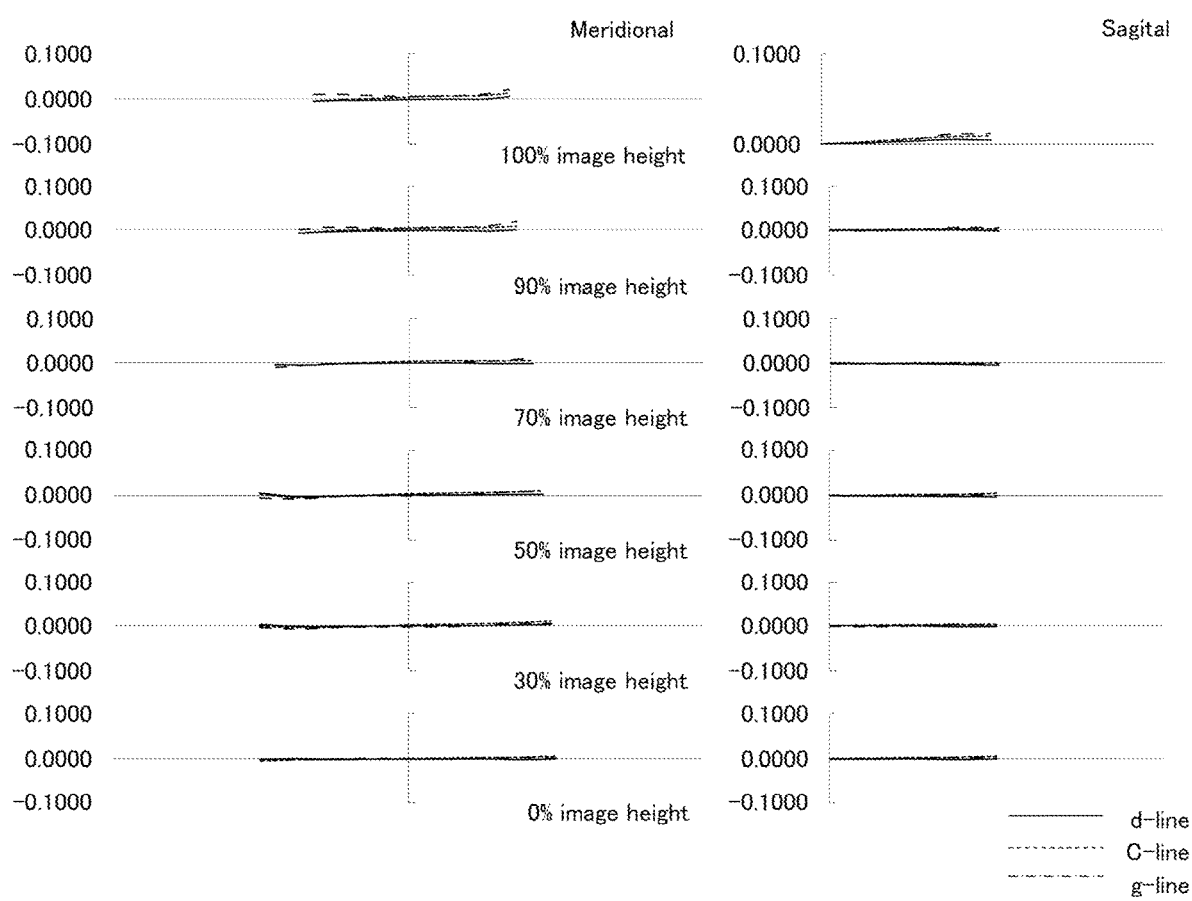
FIG. 67 is a lateral aberration diagram at the infinite photographing distance at the wide-angle end of the imaging optical system of Example 5.
Figure 68:
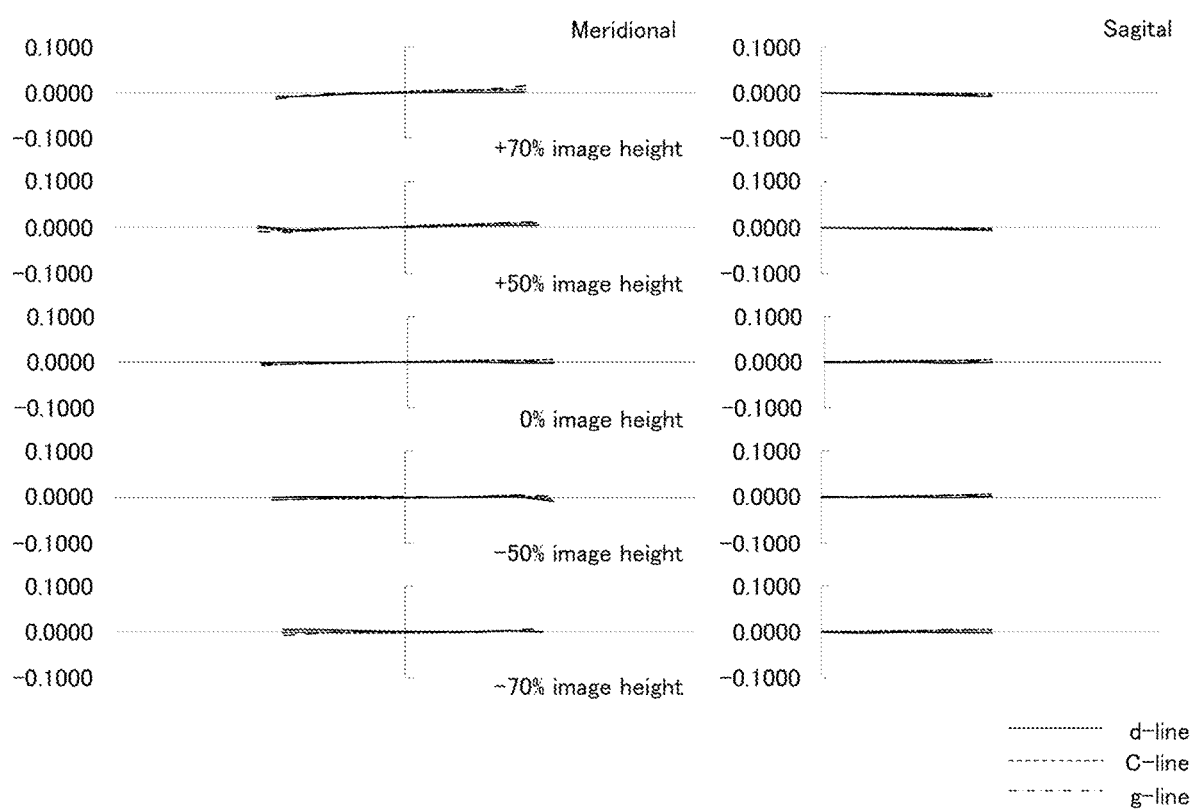
FIG. 68 is a lateral aberration diagram at the time of 0.3° vibration reduction at the infinite photographing distance at the wide-angle end of the imaging optical system of Example 5.
Figure 69:
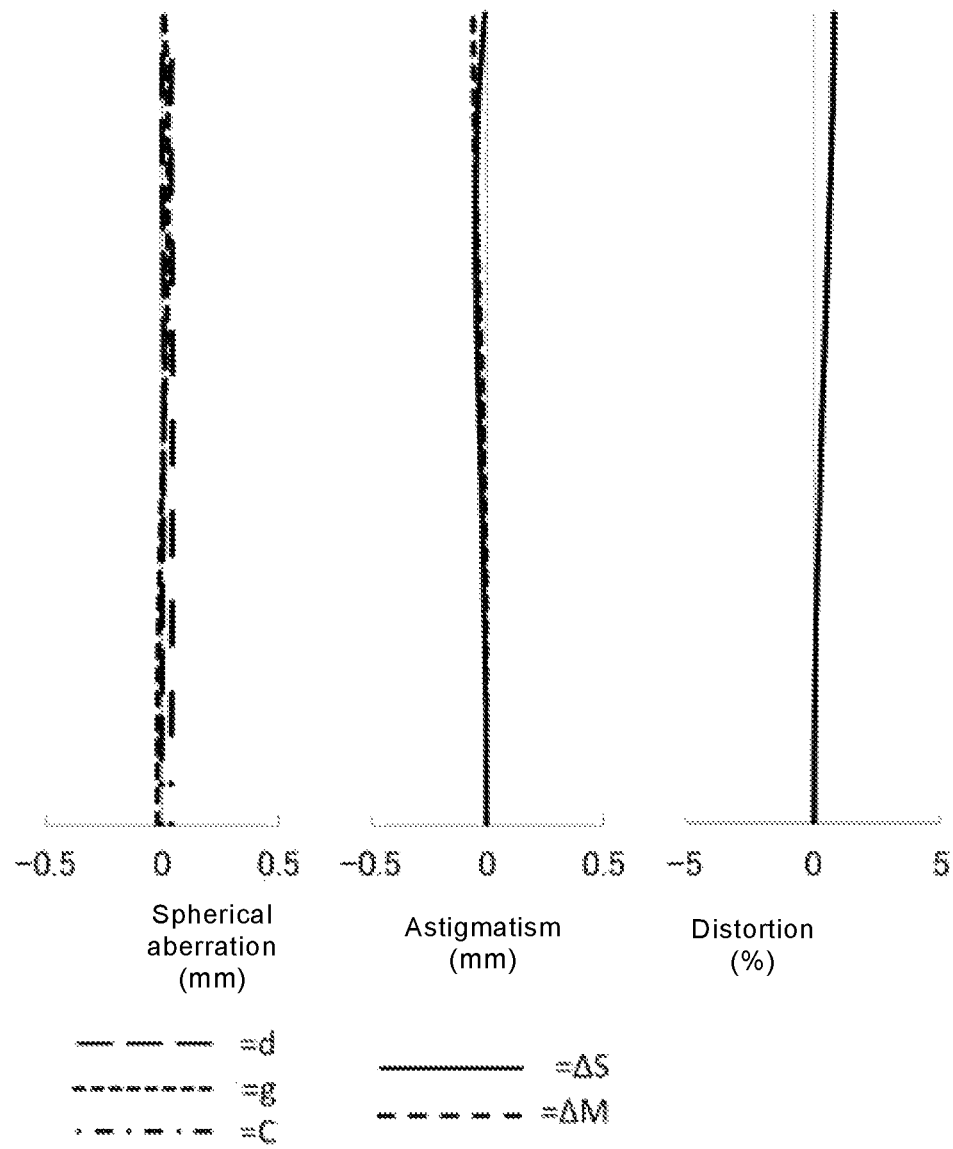
FIG. 69 is a longitudinal aberration diagram at an object distance of 2138 mm at the wide-angle end of the imaging optical system of Example 5.
Figure 70:
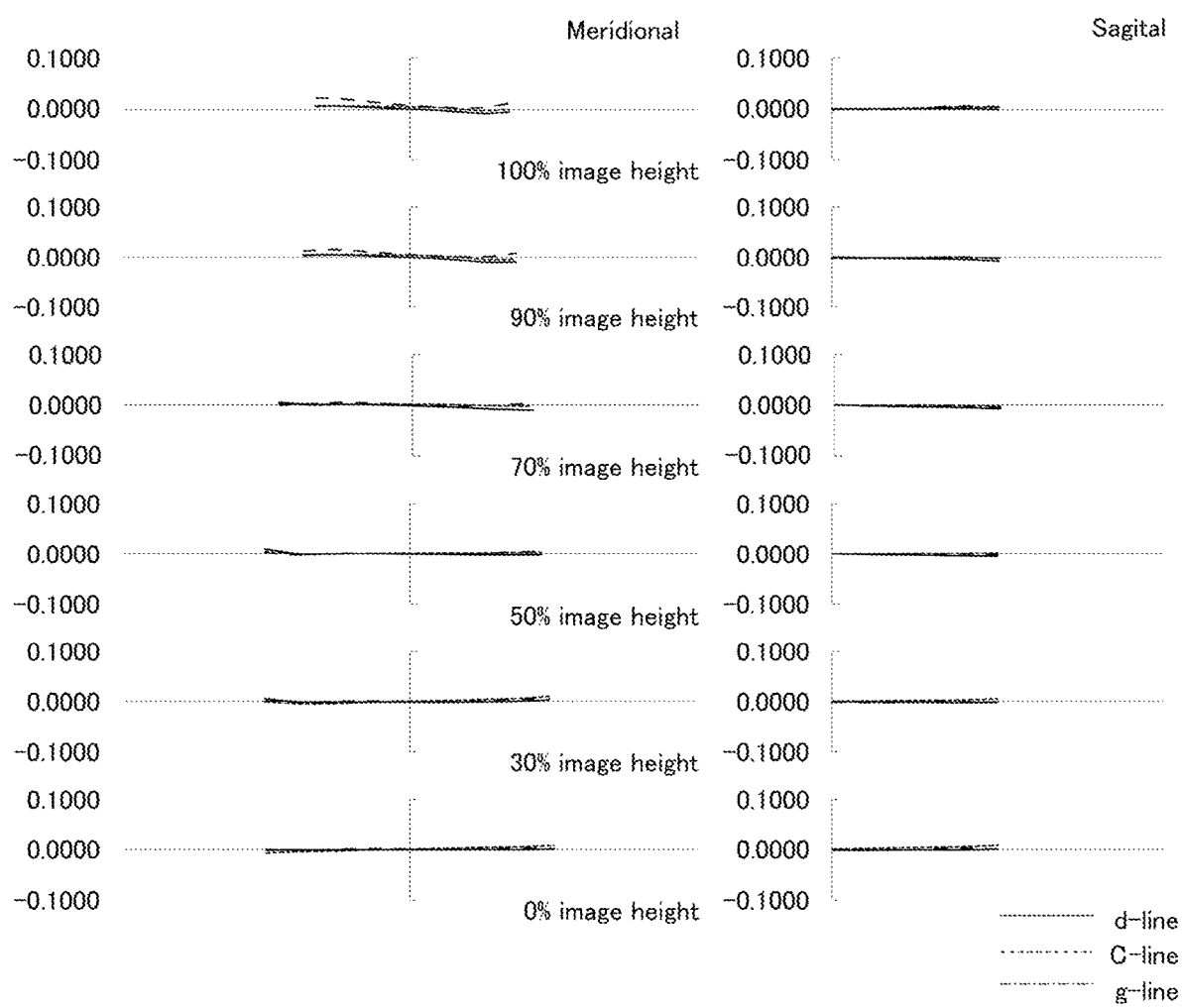
FIG. 70 is a lateral aberration diagram at an object distance of 2138 mm at the wide-angle end of the imaging optical system of Example 5.
Figure 71:
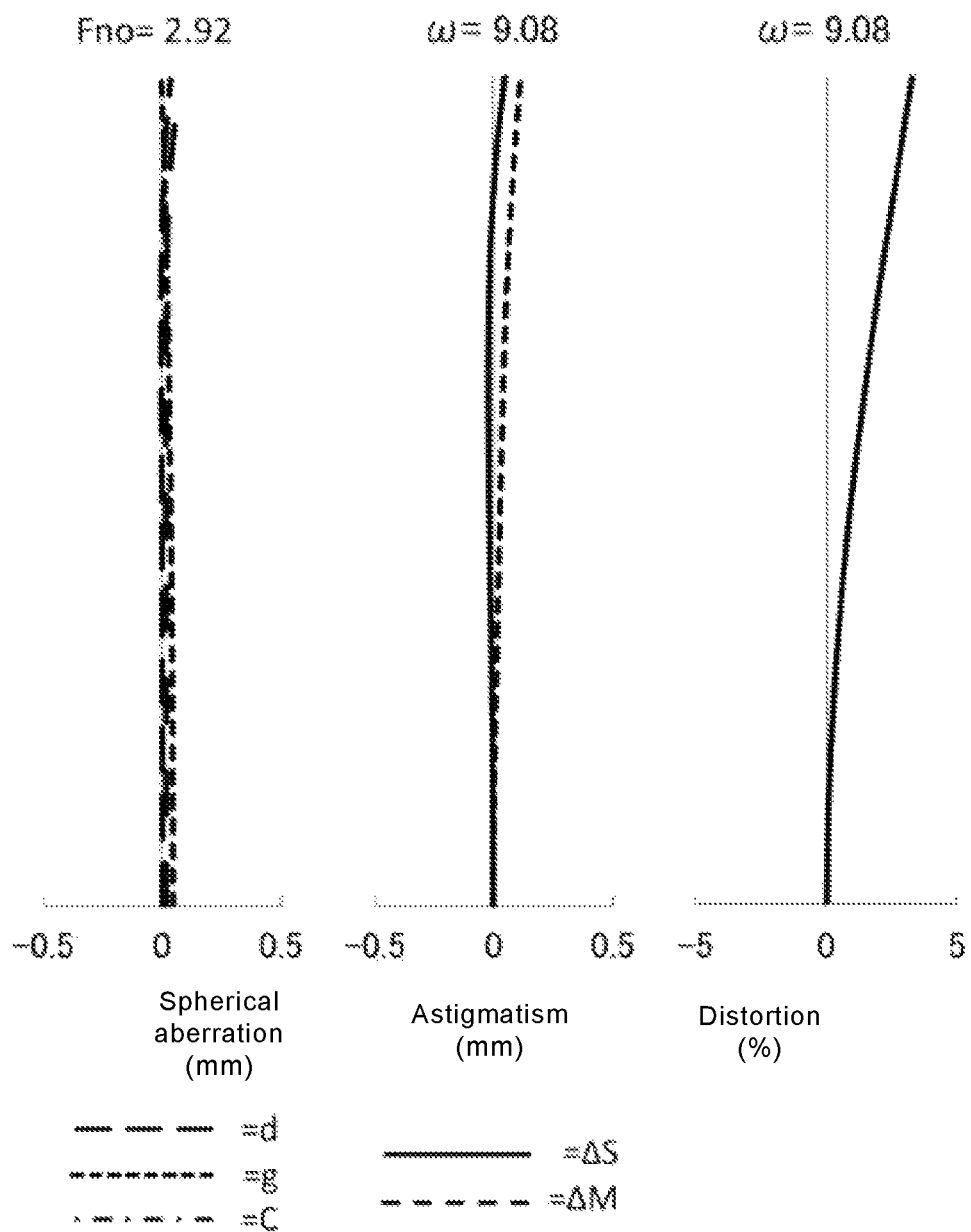
FIG. 71 is a longitudinal aberration diagram at the infinite photographing distance at the zoom center of the imaging optical system of Example 5.
Figure 72:
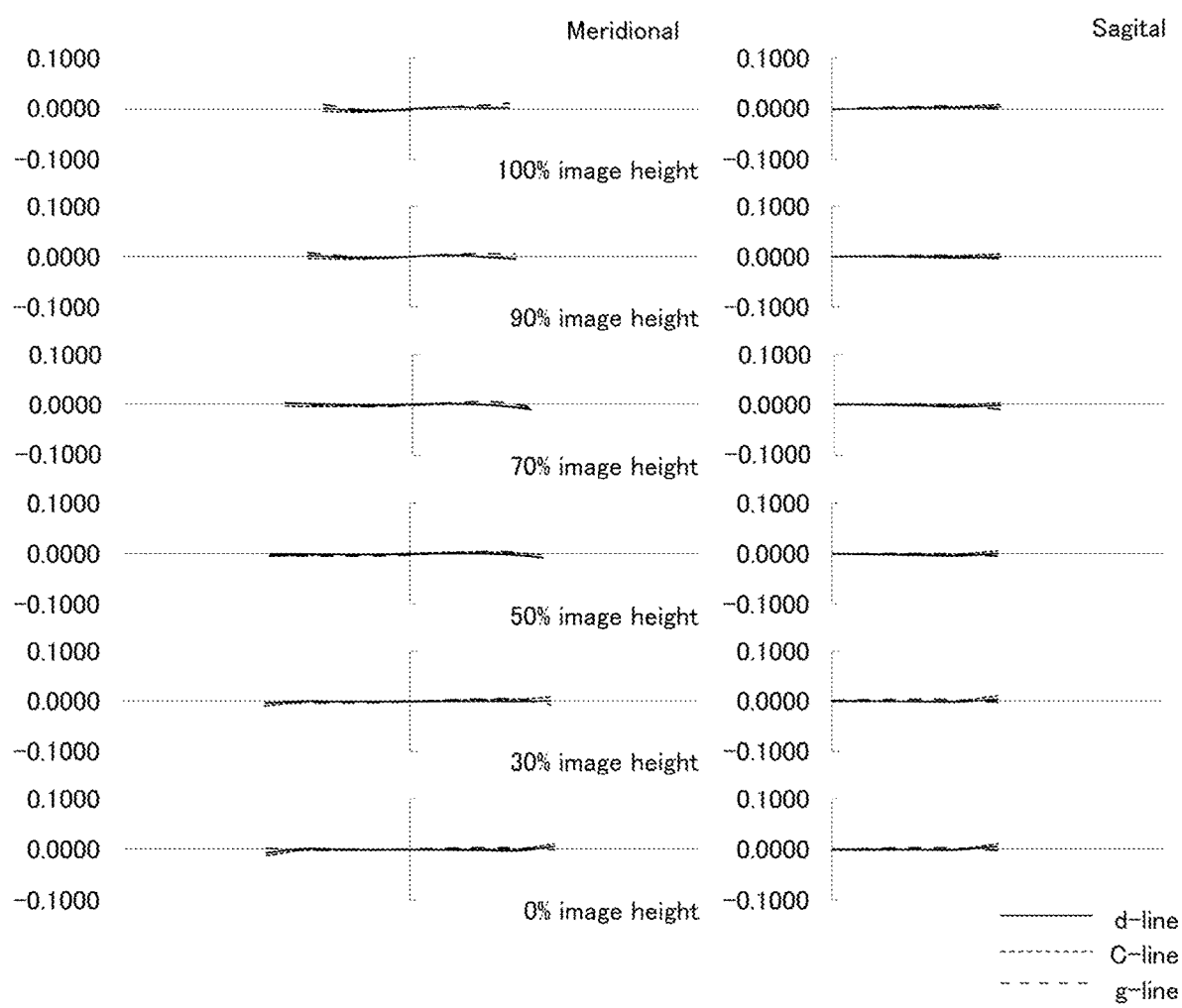
FIG. 72 is a lateral aberration diagram at the infinite photographing distance at the zoom center of the imaging optical system of Example 5.
Figure 73:
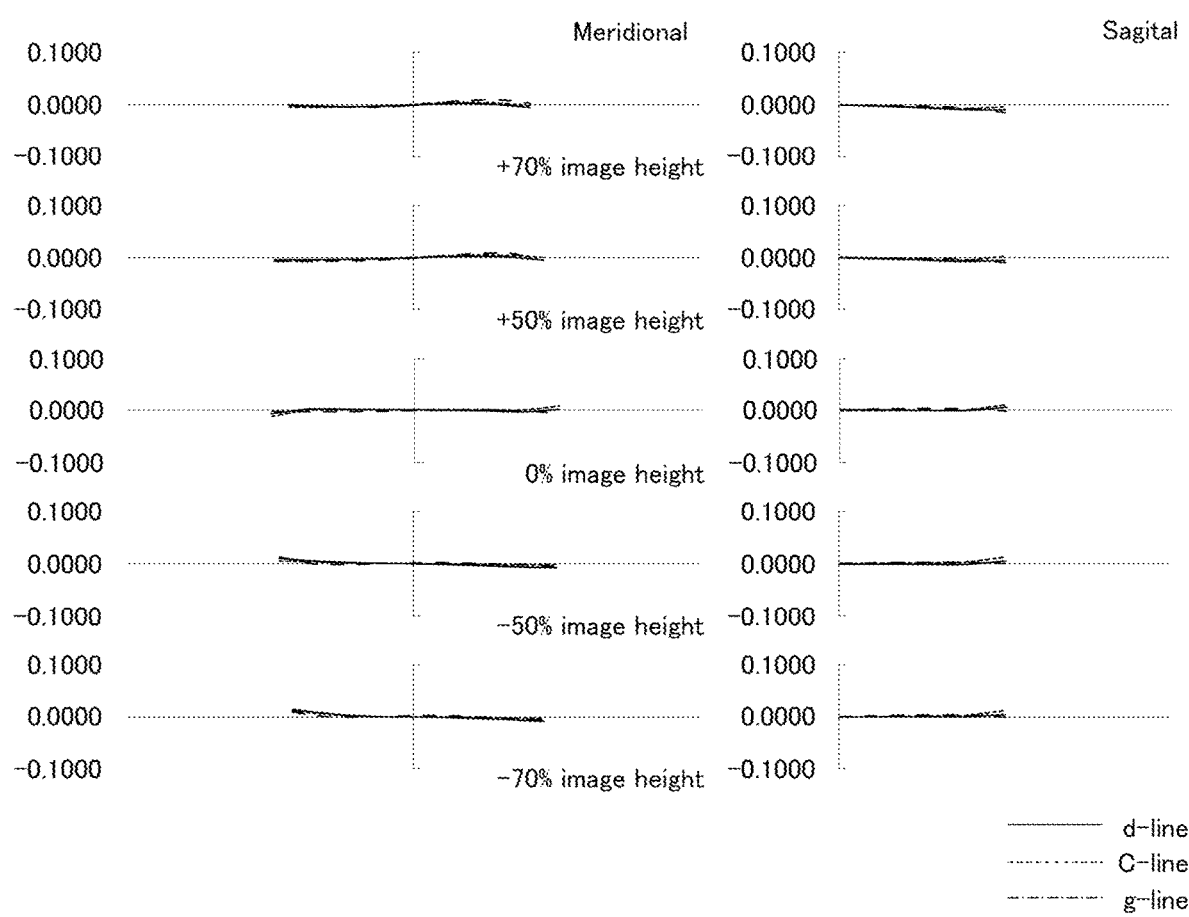
FIG. 73 is a lateral aberration diagram at the time of 0.3° vibration reduction at the infinite photographing distance at the zoom center of the imaging optical system of Example 5.
Figure 74:
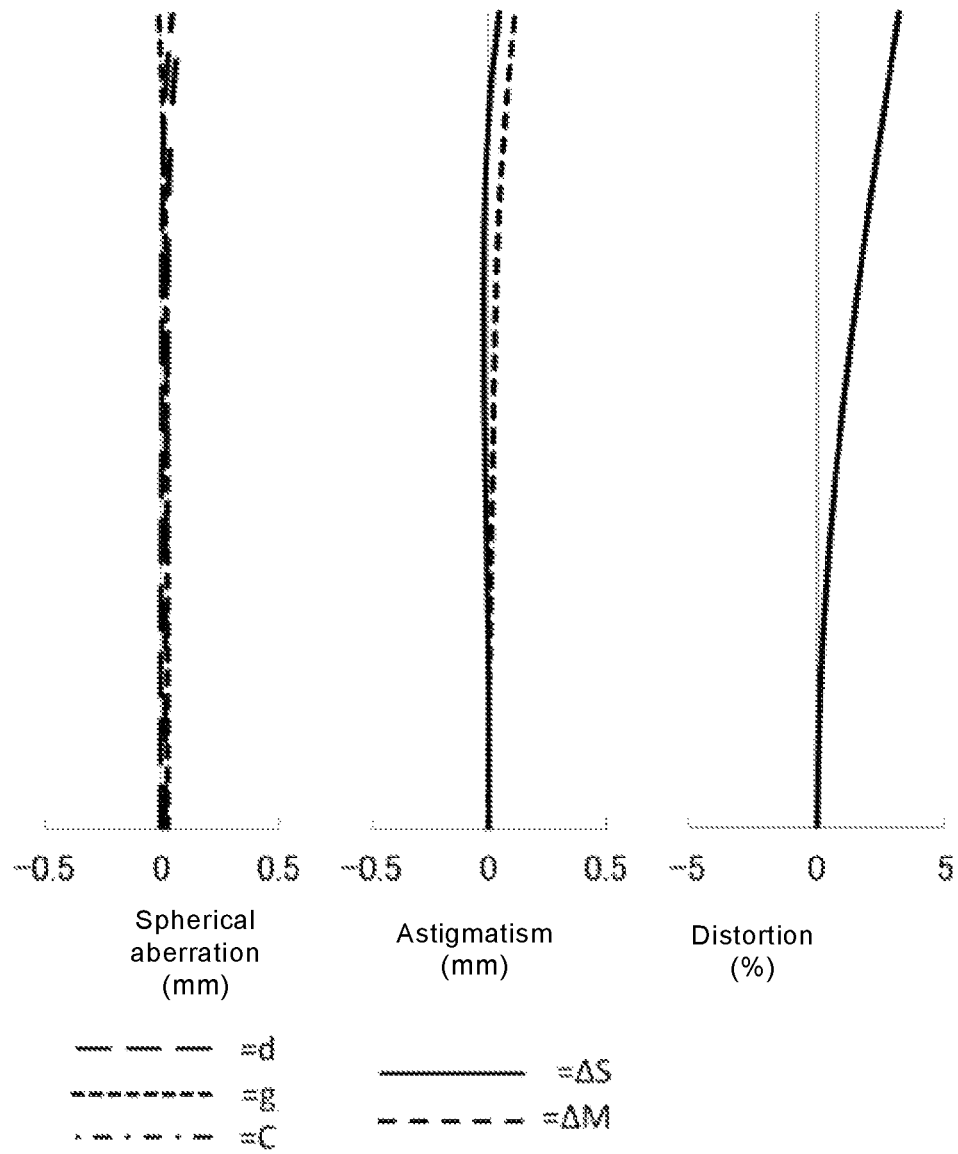
FIG. 74 is a longitudinal aberration diagram at an object distance of 3481 mm at the zoom center of the imaging optical system of Example 5.
Figure 75:
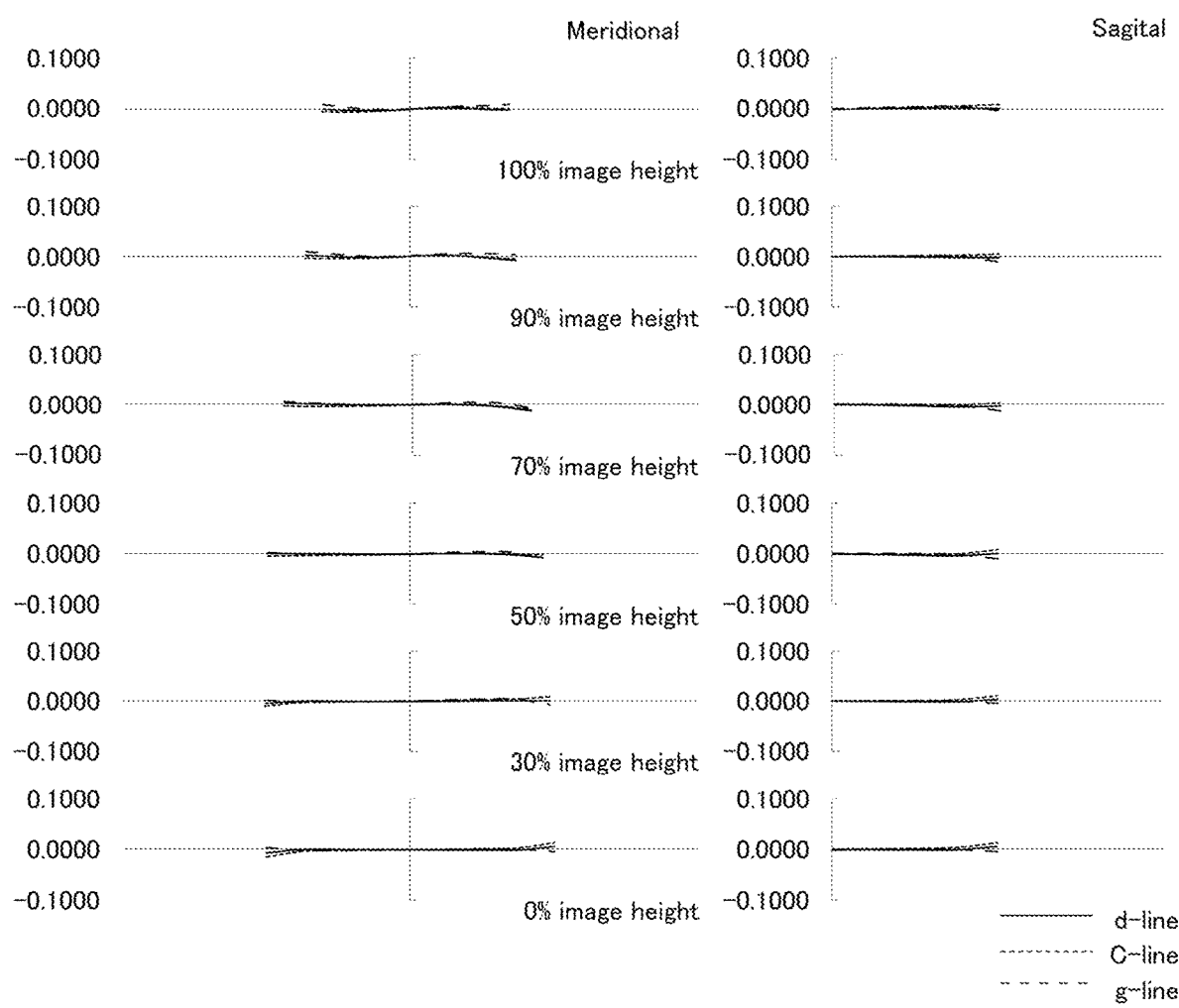
FIG. 75 is a lateral aberration diagram at an object distance of 3481 mm at the zoom center of the imaging optical system of Example 5.
Figure 76:
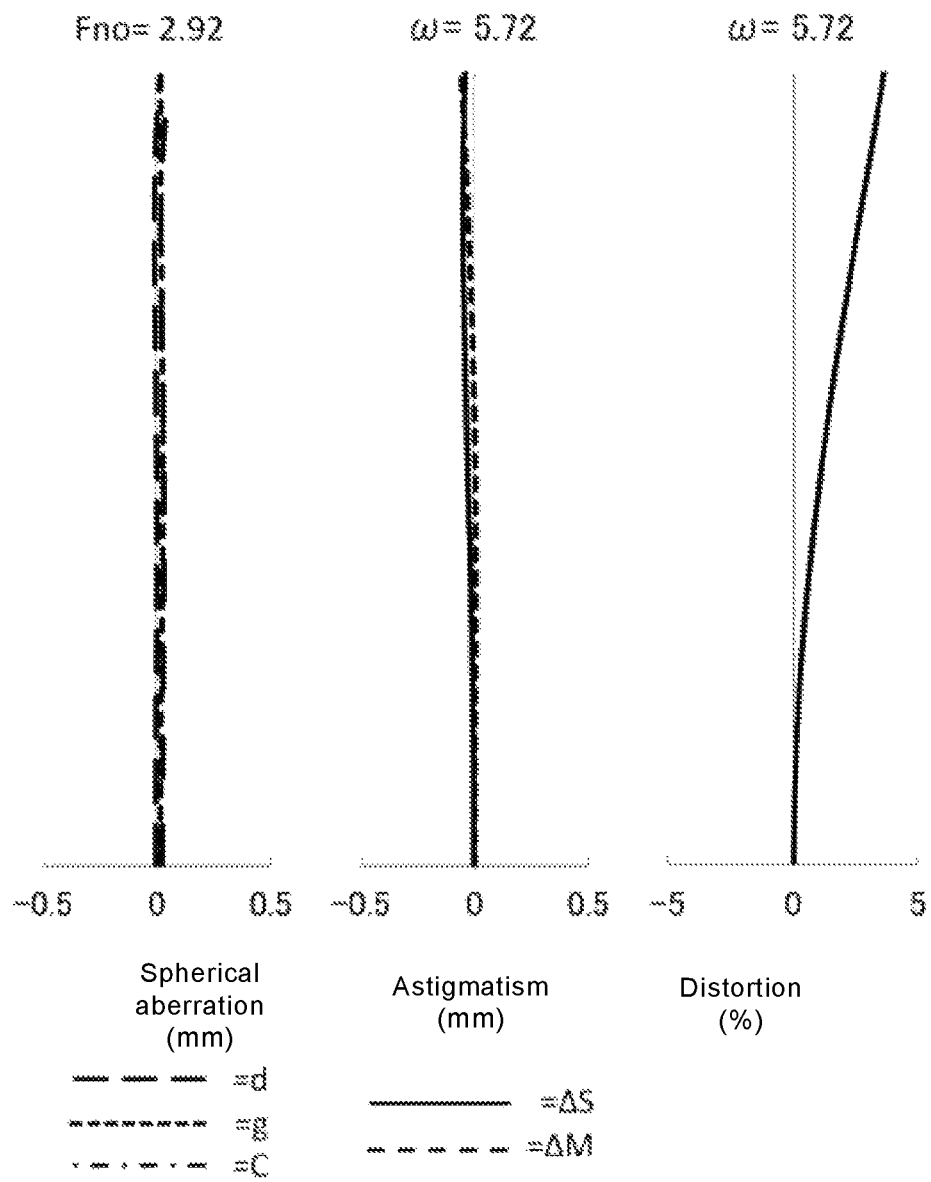
FIG. 76 is a longitudinal aberration diagram at the infinite photographing distance at the telephoto end of the imaging optical system of Example 5.
Figure 77:
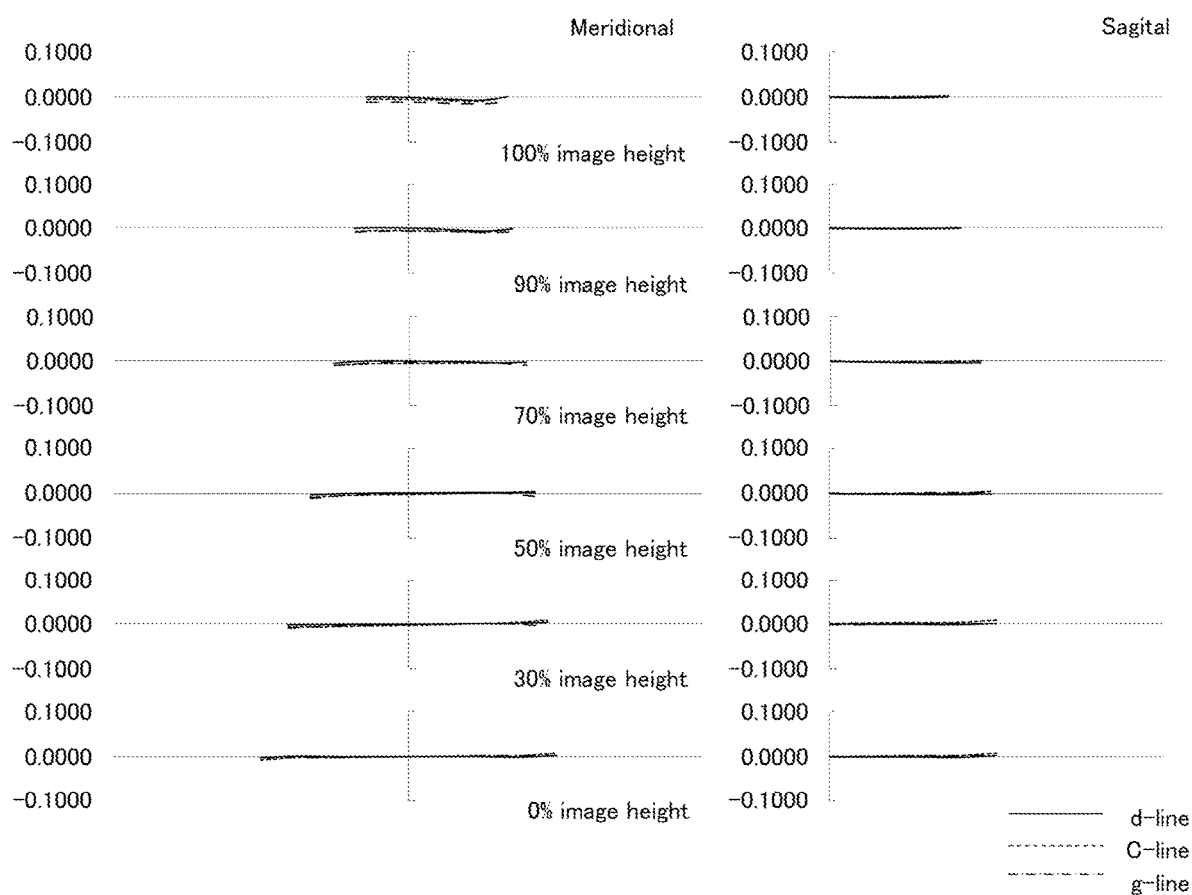
FIG. 77 is a lateral aberration diagram at the infinite photographing distance at the telephoto end of the imaging optical system of Example 5.
Figure 78:
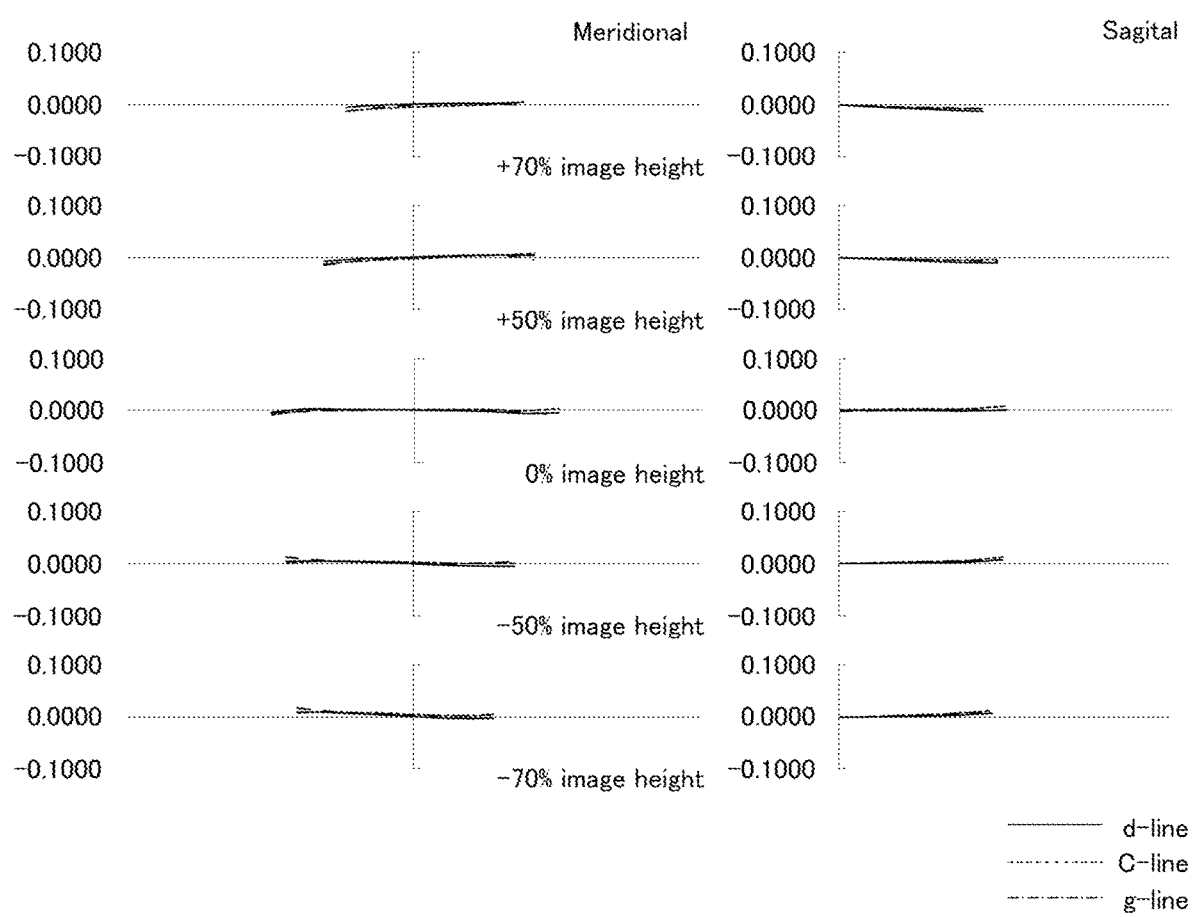
FIG. 78 is a lateral aberration diagram at the time of 0.3° vibration reduction system of Example 5.
Figure 79:
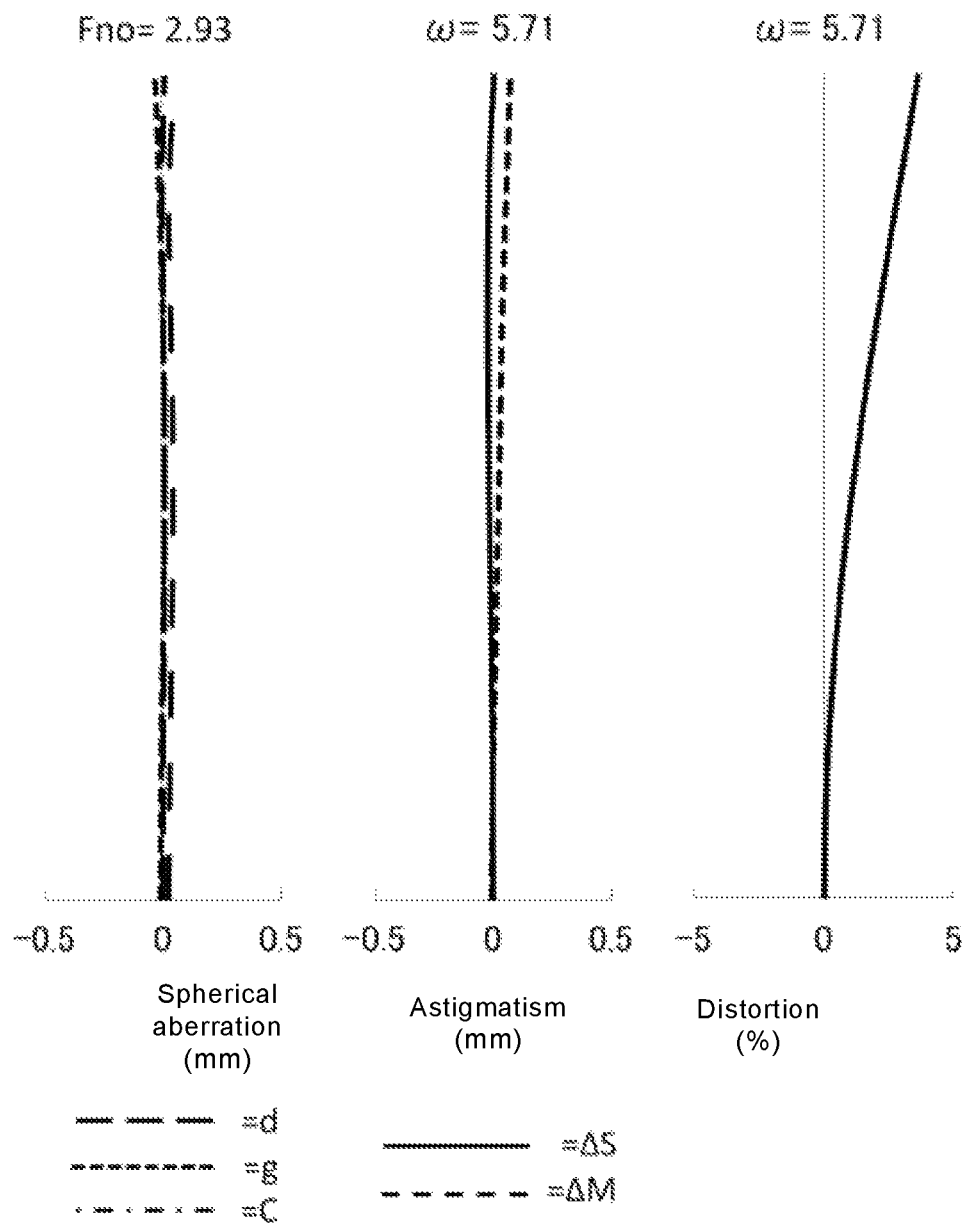
FIG. 79 is a longitudinal aberration diagram at an object distance of 5474 mm at the telephoto end of the imaging optical system of Example 5.
Figure 80:
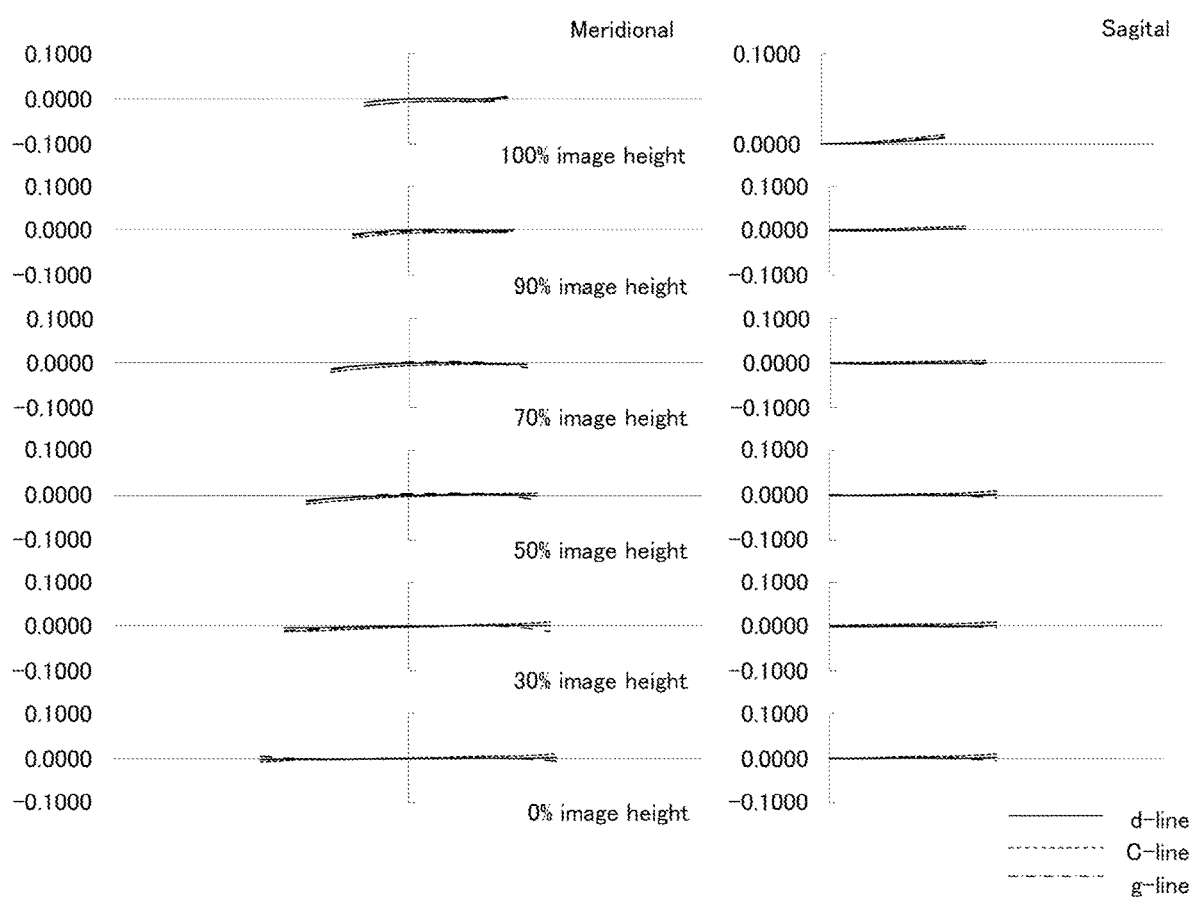
FIG. 80 is a lateral aberration diagram at an object distance of 5474 mm at the telephoto end of the imaging optical system of Example 5.

FIG. 65 is a lens block view of an imaging optical system of Example 5 of the present invention.

The imaging optical system of Example 5 includes a first lens group G1 having a positive refractive power, a second lens group G2 having a negative refractive power, a third lens group G3 having a negative refractive power, a fourth lens group G4 having a positive refractive power, an aperture stop S, a fifth lens group G5 having a positive refractive power, a sixth lens group G6 having a negative refractive power, and a seventh lens group G7 having a negative refractive power. For zooming from the wide-angle end to the telephoto end, the distance between the first lens group G1 and the second lens group G2 increases, the distance between the second lens group G2 and the third lens group G3 increases, the distance between the third lens group G3 and the fourth lens group G4 decreases, the distance between the fourth lens group G4 and the fifth lens group G5 is changed, the distance between the fifth lens group G5 and the sixth lens group G6 decreases, the distance between the sixth lens group G6 and the seventh lens group G7 increases, the first lens group G1 monotonously moves to the object side, and the fifth lens group G5 and the seventh lens group G7 are fixed with respect to the image plane I.

The front lens group GF corresponds to the second lens group G2 and the third lens group G3, the rear lens group GR corresponds to the fourth lens group G4, the fifth lens group G5, the sixth lens group G6, and the seventh lens group G7, the object side lens group GO corresponds to the fourth lens group G4, and the final lens group GL corresponds to the seventh lens group G7.

The sixth lens group G6 is the focusing lens group GFcs, and moves along the optical axis for focusing from the infinite distance object to the close distance object.

The first lens group G1 includes a cemented lens of a negative meniscus lens L1 with the convex surface pointing to the object side and a double convex lens L2, and a positive meniscus lens L3 with the convex surface pointing to the object side.

The second lens group G2 includes a negative meniscus lens L4 with the convex surface pointing to the object side, a double concave lens L5, and a double convex lens L6.

The third lens group G3 includes a negative meniscus lens L7 with the convex surface pointing to the image plane side.

The fourth lens group G4 includes a double convex lens L8 with both the R1 surface and R2 surface being aspherical surfaces.

The fifth lens group G5 includes a cemented lens of a planoconcave lens L9 with the flat surface pointing to the object side and a positive meniscus lens L10 with the convex surface pointing to the object side, a double convex lens L11, a cemented lens of a negative meniscus lens L12 with the convex surface pointing to the object side and a double convex lens L13, and a double convex lens L14.

The sixth lens group G6 includes a negative meniscus lens L15 with the convex surface pointing to the object side, and with both the R1 surface and R2 surface being aspherical surfaces.

The seventh lens group G7 includes a cemented lens of a negative meniscus lens L16 with the convex surface pointing to the object side and a positive meniscus lens L17 with the convex surface pointing to the object side, a double convex lens L18, and a negative meniscus lens L19 with the convex surface pointing to the image plane side, and with the R1 surface and the R2 surface being aspherical surfaces. The cemented lens of L16 and L17 is a vibration reduction lens group GS, and moves including a perpendicular component at the optical axis for vibration reduction.

Below, specification values of an optical system in accordance with Example 5 will be shown.

Numerical Value Example 5

| | | Unit: mm | | | |
|---|---|---|---|---|---|
| | | [Surface data] | | | |
| Surface number | r | d | nd | vd | PgF |
| Object surface | ∞ | (d0) | | | |
| 1 | 115.2505 | 1.2000 | 1.71950 | 31.75 | 0.5887 |
| 2 | 59.5948 | 7.2300 | 1.49700 | 81.61 | 0.5389 |
| 3 | −456.0790 | 0.1500 | | | |
| 4 | 51.4474 | 6.1955 | 1.43700 | 95.10 | 0.5336 |
| 5 | 288.6756 | (d5) | | | |
| 6 | 81.0185 | 0.9000 | 1.76385 | 48.49 | 0.5589 |
| 7 | 22.2965 | 5.1548 | | | |
| 8 | −41.9688 | 0.9000 | 1.52841 | 76.46 | 0.5396 |
| 9 | 87.9551 | 0.1500 | | | |
| 10 | 39.5712 | 4.8931 | 1.83080 | 24.95 | 0.6072 |
| 11 | −56.0880 | (d11) | | | |
| 12 | −36.1968 | 0.9000 | 2.05090 | 26.94 | 0.6052 |
| 13 | −197.3260 | (d13) | | | |
| 14* | 40.4838 | 3.7842 | 1.73077 | 40.50 | 0.5715 |
| 15* | −88.7713 | (d15) | | | |
| 16 (stop) | ∞ | 1.0000 | | | |
| 17 | ∞ | 0.9000 | 1.95375 | 32.32 | 0.5901 |
| 18 | 19.5571 | 2.9544 | 1.92286 | 18.90 | 0.6495 |
| 19 | 31.7771 | 0.1500 | | | |
| 20 | 29.8000 | 5.1165 | 1.49700 | 81.61 | 0.5389 |
| 21 | −43.3814 | 0.1500 | | | |
| 22 | 63.6903 | 0.9000 | 1.89286 | 20.36 | 0.6393 |
| 23 | 22.5934 | 5.2321 | 1.49700 | 81.61 | 0.5389 |
| 24 | −60.1293 | 1.7570 | | | |
| 25 | 33.9787 | 4.3506 | 1.61340 | 44.27 | 0.5633 |
| 26 | −47.0434 | (d26) | | | |
| 27* | 130.1364 | 0.9000 | 1.58913 | 61.25 | 0.5374 |
| 28* | 12.8537 | (d28) | | | |
| 29 | 109.1863 | 0.9000 | 1.88300 | 40.81 | 0.5656 |
| 30 | 18.0034 | 2.6882 | 1.84666 | 23.78 | 0.6192 |
| 31 | 29.4960 | 6.8907 | | | |
| 32 | 136.3965 | 4.8732 | 1.83481 | 42.72 | 0.5647 |
| 33 | −27.2642 | 2.5677 | | | |
| 34* | −16.7437 | 0.9843 | 1.49710 | 81.56 | 0.5385 |
| 35* | −55.8353 | (BF) | | | |
| Image plane | ∞ | | | | |

| | [Aspherical surface data] | | | |
|---|---|---|---|---|
| | Surface 14 | Surface 15 | Surface 27 | Surface 28 |
| K | 0.0000 | 0.0000 | 0.0000 | 0.0000 |
| A4 | 2.95068E−08 | 1.64848E−05 | −2.20521E−06 | −1.29514E−05 |
| A6 | 1.62921E−08 | 6.90270E−09 | −5.02595E−08 | −1.37735E−07 |
| A8 | −2.64797E−11 | −2.05727E−11 | 2.45877E−10 | −8.14122E−10 |
| A10 | 0.00000E+00 | 0.00000E+00 | 0.00000E+00 | 0.00000E+00 |

| | Surface 34 | Surface 35 |
|---|---|---|
| K | 0.0000 | 0.0000 |
| A4 | 4.40735E−06 | −3.39E−05 |
| A6 | 1.31029E−07 | 5.23E−08 |

-continued

| Unit: mm | | |
|---|---|---|
| A8 | −3.39504E−10 | −3.54E−10 |
| A10 | 0.00000E+00 | 0.00000E+00 |

[Various data]
Zoom ratio 2.68

| | Wide-angle | Center | Telephoto |
|---|---|---|---|
| Focal length | 51.00 | 86.00 | 136.80 |
| F number | 2.92 | 2.92 | 2.92 |
| Whole angle of view 2ω | 30.87 | 18.17 | 11.44 |
| Image height Y | 14.20 | 14.20 | 14.20 |
| Lens full length | 125.00 | 138.43 | 150.00 |

[Variable distance data]

| | Wide-angle | Center | Telephoto |
|---|---|---|---|
| d0 | ∞ | ∞ | ∞ |
| d5 | 1.2000 | 23.9706 | 39.4864 |
| d11 | 4.3362 | 4.9316 | 5.5651 |
| d13 | 16.0073 | 6.4395 | 1.0000 |
| d15 | 2.1719 | 1.8023 | 2.6639 |
| d26 | 5.3486 | 4.7088 | 1.6793 |
| d28 | 5.3370 | 5.9768 | 9.0063 |
| BF | 16.8266 | 16.8266 | 16.8266 |
| d0 | 2012.8838 | 3342.2404 | 5323.5256 |
| d5 | 1.2000 | 23.9706 | 39.4864 |
| d11 | 4.3362 | 4.9316 | 5.5651 |
| d13 | 16.0073 | 6.4395 | 1.0000 |
| d15 | 2.1719 | 1.8023 | 2.6639 |
| d26 | 5.5744 | 5.0826 | 2.2003 |
| d28 | 5.1112 | 5.6030 | 8.4853 |
| BF | 16.8266 | 16.8266 | 16.8266 |

[Lens group data]

| Group | Initial surface | Focal length |
|---|---|---|
| G1 | 1 | 94.91 |
| G2 | 6 | −279.77 |
| G3 | 12 | −42.30 |
| G4 | 14 | 38.52 |
| G5 | 16 | 28.06 |
| G6 | 27 | −24.28 |
| G7 | 29 | −403.73 |

Below, the conditional expression corresponding values corresponding to respective Examples will be shown.
[Conditional Expression Corresponding Values]

| | Conditional expression/Examples | 1 | 2 | 3 | 4 | 5 |
|---|---|---|---|---|---|---|
| (1) | 0.30 < f1/fT < 1.50 | 0.86 | 0.73 | 0.65 | 0.77 | 0.69 |
| (2) | 0.80 < \|f1n\|/f1 < 4.00 | 1.65 | 2.51 | 2.45 | 2.64 | 0.00 |
| (3) | 20.0 < LTT × FnoT/Ymax < 50.0 | 31.7 | 29.7 | 30.8 | 29.6 | 30.8 |
| (4) | PgFFp + 0.0022 × vdFp < 0.678 | 0.673 | 0.660 | 0.673 | 0.673 | 0.662 |
| (5) | 0.658 < PgFLn + 0.0021 × vdLn | 0.686 | 0.683 | 0.677 | 0.683 | 0.710 |
| | | 0.677 | 0.710 | | 0.691 | |
| (6) | 2.50 < f1/\|fFW\| < 5.00 | 3.48 | 3.43 | 3.97 | 3.46 | 3.09 |
| (7) | L1/LTW < 0.17 | 0.10 | 0.11 | 0.12 | 0.10 | 0.12 |
| (8) | vd1n < 50.0 | 35.82 | 28.43 | 29.74 | 28.95 | 31.75 |
| (9) | PgF1n + 0.0024 × vd1n < 0.677 | 0.665 | 0.669 | 0.666 | 0.664 | 0.665 |
| (10) | 0.55 < \|fS\|/fW < 1.20 | 0.83 | 0.76 | 0.79 | 0.76 | 0.88 |
| (11) | BF/Ymax < 3.00 | 1.23 | 2.12 | 2.08 | 1.21 | 1.18 |

The respective Examples respectively show specific implementation examples of the present invention. The technical scope of the present invention is not limited to embodiments of respective Examples.

The present invention can be practiced by various modified examples other than respective Examples described above. The modified examples subjected to modification, correction, restriction, replacement, and addition of constituent elements or/and, change in numerical value, or/and restriction of the numerical value rage regarding the present invention are included in the technical scope of the present invention, or fall within the equivalent scope of the present invention. Further, the modified examples produce the effects of the present invention as with the respective Examples.

The present invention can also have the following respective configurations.

[Item 1]

An imaging optical system characterized by including: sequentially from an object side, a first lens group G1 having a positive refractive power, a front lens group GF having a negative refractive power, and a rear lens group GR having a positive refractive power, and characterized in that, for zooming from a wide-angle end to a telephoto end, a distance between the first lens group G1 and the front lens group GF increases, a distance between the front lens group GF and the rear lens group GR decreases, and the first lens group G1 monotonously moves to the object side, the first lens group G1 has at least one negative lens, the front lens group GF includes a lens group having a negative refractive power of 1 or more, the rear lens group GR has a final lens group GL arranged closest to an image plane side, and is fixed to an image plane I, and moreover, does not moving for zooming and focusing, the final lens group GL has a vibration reduction lens group GS movable in a direction including a perpendicular component with respect to an optical axis, and the imaging optical system satisfies following conditional expressions, $$0.30 < f1/fT < 1.50 \quad (1)$$

$$0.80 < |f1n|/f1 < 4.00 \quad (2)$$

$$20.0 < LTT \times FnoT/Ymax < 50.0 \quad (3)$$

where f1: focal length of the first lens group G1;

if: focal length at a time of focusing on infinity of the imaging optical system at the telephoto end;

f1n: focal length of at least one negative lens of negative lenses included in the first lens group G1;

LTT: total optical length of the imaging optical system at the telephoto end;

FnoT: open F number at a time of focusing on infinity of the imaging optical system at the telephoto end; and Ymax: maximum image height at the imaging optical system.

[Item 2]

The imaging optical system according to item 1, characterized in that the front lens group GF has positive lenses, and the positive lens positioned closest to the object side thereof satisfies a following conditional expression:

$$PgFFp + 0.0022 \times vdFp < 0.678 \quad (4)$$

where

PgFFp: a partial dispersion ratio regarding a g line and an F line of the positive lens positioned closest to the object side of the positive lenses included in the front lens group GF; and vdFp: an abbe number regarding a d line of the positive lens positioned closest to the object side of the positive lenses included in the front lens group GF.

[Item 3]

The imaging optical system according to the item 1 or the item 2, characterized in that the final lens group GL has negative lenses, and at least one negative lens thereof satisfies a following conditional expression:

$$0.658 < PgFLn + 0.0021 \times vdLn \quad (5)$$

where

PgFLn: a partial dispersion ratio regarding a g line and an F line of at least one negative lens of the negative lenses included in the final lens group GL; and vdLn: an abbe number regarding a d line of at least one negative lens of the negative lenses included in the final lens group GL.

[Item 4]

The imaging optical system according to items 1 to 3, characterized in that the rear lens group GR has an object side lens group GO having a positive refractive power closest to the object side, and has at least one focusing lens group GFcs moving, along the optical axis, for focusing from an infinite distance object to a close distance object closer to the image plane side than the object side lens group GO.

[Item 5]

The imaging optical system according to any of items 1 to 4, characterized in that the rear lens group GR has an aperture stop S, the aperture stop S is fixed to the image plane I for zooming from the wide-angle end to the telephoto end, and of the lens groups positioned closer to the image side than the aperture stop S, all the lens groups moving along the optical axis, for zooming from the wide-angle end to the telephoto end are the focusing lens groups GFcs moving along the optical axis, for focusing from the infinite distance object to the close distance object.

[Item 6]

The imaging optical system according to any of items 1 to 5, characterized by satisfying a following conditional expression:

$$2.50 < f1/|fFW| < 5.00 \quad (6)$$

where f1: focal length of the first lens group G1; and fFW: focal length of the front lens group GF at the wide-angle end.

[Item 7]

The imaging optical system according to any of items 1 to 6, characterized by satisfying a following conditional expression:

$$L1/LTW < 0.17 \quad (7)$$

where

L1: length on the optical axis from a lens surface closest to the object side to a lens surface closest to the image side of the first lens group G1; and LTW: total optical length of the imaging optical system at the wide-angle end.

[Item 8]

The imaging optical system according to any of items 1 to 7, characterized in that at least one negative lens of the negative lenses included in the first lens group G1 satisfies following conditional expressions:

$$vd1n < 50.0 \quad (8)$$

$$PgF1n + 0.0024 \times vd1n < 0.677 \quad (9)$$

where vd1n: an abbe number regarding a d line of at least one negative lens of the negative lenses included in the first lens group G1; and PgF1n: a partial dispersion ratio regarding a g line and an F line of at least one negative lens of the negative lenses included in the first lens group G1.

[Item 9]

The imaging optical system according to any of items 1 to 8, characterized by satisfying a following conditional expression:

$$0.55 < |fS|/fW < 1.20 \quad (10)$$

where fS: focal length of the vibration reduction lens group GS; and fW: focal length at a time of focusing on infinity of the imaging optical system at the wide-angle end.

[Item 10]

The imaging optical system according to any of items 1 to 9, characterized by satisfying a following conditional expression:

$$BF/Y\text{max} < 3.00 \quad (11)$$

where

BF: back focus at the imaging optical system; and

Ymax: maximum image height at the imaging optical system.

REFERENCE SIGNS LIST

G1 First lens group
GF Front lens group
GR Rear lens group
GL Final lens group
GS Vibration reduction lens group
GO Object side lens group
GFcs Focusing lens group
G2 Second lens group
G3 Third lens group
G4 Fourth lens group
G5 Fifth lens group
G6 Sixth lens group
G7 Seventh lens group
S Aperture stop
I Image plane

What is claimed is:

1. An imaging optical system comprising: sequentially from an object side, a first lens group G1 having a positive refractive power, a front lens group GF having a negative refractive power, and a rear lens group GR having a positive refractive power, wherein for zooming from a wide-angle end to a telephoto end, a distance between the first lens group G1 and the front lens group GF increases, a distance between the front lens group GF and the rear lens group GR decreases, and the first lens group G1 monotonously moves to the object side, the first lens group G1 has at least one negative lens, the front lens group GF includes a lens group having a negative refractive power of 1 or more, the rear lens group GR has a final lens group GL arranged closest to an image plane side, and is fixed to an image plane I, and moreover, does not move for zooming and focusing, and the final lens group GL has a vibration reduction lens group GS movable in a direction including a perpendicular component with respect to an optical axis, and the imaging optical system satisfies following conditional expressions, $$0.30 < f1/fT < 1.50 \quad (1)$$

$$0.80 < |f1n|/f1 < 4.00 \quad (2)$$

$$20.0 < LTT \times FnoT/Y\text{max} < 50.0 \quad (3)$$

where f1: focal length of the first lens group G1 fT: focal length at a time of focusing on infinity of the imaging optical system at the telephoto end;

f1n: focal length of at least one negative lens of negative lenses included in the first lens group G1;

LTT: total optical length of the imaging optical system at the telephoto end;

FnoT: open F number at a time of focusing on infinity of the imaging optical system at the telephoto end; and Ymax: maximum image height at the imaging optical system.

2. The imaging optical system according to claim 1, wherein the front lens group GF has positive lenses, and the positive lens positioned closest to the object side thereof satisfies a following conditional expression:

$$PgFFp + 0.0022 \times vdFp < 0.678 \quad (4)$$

where

PgFFp: a partial dispersion ratio regarding a g line and an F line of the positive lens positioned closest to the object side of the positive lenses included in the front lens group GF; and vdFp: an abbe number regarding a d line of the positive lens positioned closest to the object side of the positive lenses included in the front lens group GF.

3. The imaging optical system according to claim 1, wherein the final lens group GL has negative lenses, and at least one negative lens thereof satisfies a following conditional expression:

$$0.658 < PgFLn + 0.0021 \times vdLn \quad (5)$$

where

PgFLn: a partial dispersion ratio regarding a g line and an F line of at least one negative lens of the negative lenses included in the final lens group GL; and vdLn: an abbe number regarding a d line of at least one negative lens of the negative lenses included in the final lens group GL.

4. The imaging optical system according to claim 1, wherein the rear lens group GR has an object side lens group GO having a positive refractive power closest to the object side, and has at least one focusing lens group GFcs moving, along the optical axis, for focusing from an infinite distance object to a close distance object closer to the image plane side than the object side lens group GO.

5. The imaging optical system according to claim 4, wherein the rear lens group GR has an aperture stop S, the aperture stop S is fixed to the image plane I for zooming from the wide-angle end to the telephoto end, and of the lens groups positioned closer to the image side than the aperture stop S, all the lens groups moving along the optical axis, for zooming from the wide-angle end to the telephoto end are the focusing lens groups GFcs moving along the optical axis, for focusing from the infinite distance object to the close distance object.

6. The imaging optical system according to claim 1, satisfying a following conditional expression:

$$2.50 < f1/|fFW| < 5.00 \quad (6)$$

where f1: focal length of the first lens group G1; and fFW: focal length of the front lens group GF at the wide-angle end.

7. The imaging optical system according to claim 1, satisfying a following conditional expression:

$$L1/LTW < 0.17 \quad (7)$$

where
- L1: length on the optical axis from a lens surface closest to the object side to a lens surface closest to the image side of the first lens group G1; and
- LTW: total optical length of the imaging optical system at the wide-angle end.

8. The imaging optical system according to claim 1, wherein at least one negative lens of the negative lenses included in the first lens group G1 satisfies following conditional expressions:

$$vd1n < 50.0 \quad (8)$$

$$PgF1n + 0.0024 \times vd1n < 0.677 \quad (9)$$

where
- vd1n: an abbe number regarding a d line of at least one negative lens of the negative lenses included in the first lens group G1; and
- PgF1n: a partial dispersion ratio regarding a g line and an F line of at least one negative lens of the negative lenses included in the first lens group G1.

9. The imaging optical system according to claim 1, satisfying a following conditional expression:

$$0.55 < |fS|/fW < 1.20 \quad (10)$$

where
- fS: focal length of the vibration reduction lens group GS; and
- fW: focal length at a time of focusing on infinity of the imaging optical system at the wide-angle end.

10. The imaging optical system according to claim 1, satisfying a following conditional expression:

$$BF/Ymax < 3.00 \quad (11)$$

where
- BF: back focus at the imaging optical system; and
- Ymax: maximum image height at the imaging optical system.

\* \* \* \* \*